United States Patent
Suzuki

(10) Patent No.: US 9,520,817 B2
(45) Date of Patent: Dec. 13, 2016

(54) POWER CONVERSION APPARATUS AND ELECTRIC POWER STEERING APPARATUS HAVING THE SAME

(71) Applicant: DENSO CORPORATION, Kariya, Aichi-pref. (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 77 days.

(21) Appl. No.: 14/489,073

(22) Filed: Sep. 17, 2014

(65) Prior Publication Data

US 2015/0077025 A1 Mar. 19, 2015

(30) Foreign Application Priority Data

Sep. 18, 2013 (JP) ................................. 2013-193120

(51) Int. Cl.
*H02P 6/10* (2006.01)
*B62D 5/04* (2006.01)
(Continued)

(52) U.S. Cl.
CPC ................. *H02P 6/10* (2013.01); *B62D 5/046* (2013.01); *B62D 5/0463* (2013.01);
(Continued)

(58) Field of Classification Search
CPC ............. H02P 6/10; H02P 21/05; H02P 6/001; H02P 21/0035; H02M 7/53875; H02M 2007/53876; H02M 2001/385; B62D 5/046; B62D 5/0463
See application file for complete search history.

(56) References Cited

U.S. PATENT DOCUMENTS

| 5,955,862 A | 9/1999 | Nguyen Phuoc |
| 6,426,602 B1 * | 7/2002 | McCann ................ B62D 5/046 318/284 |

(Continued)

FOREIGN PATENT DOCUMENTS

| JP | 5-176551 | 7/1993 |
| JP | B2-2563226 | 9/1996 |

(Continued)

OTHER PUBLICATIONS

JP2002095263.*

(Continued)

*Primary Examiner* — Muhammad S Islam
(74) *Attorney, Agent, or Firm* — Nixon & Vanderhye P.C.

(57) ABSTRACT

A power conversion apparatus includes: an inverter unit having high and low potential-side switching elements corresponding to each phase of a winding of a rotating electrical machine; a current detecting unit; and a control unit controlling the switching elements based on a PWM reference signal and a duty instruction value. The control unit includes: a phase current computing device; and a voltage instruction value computing device. The control unit computes an active voltage vector interval in first and second half periods of one or multiple cycles of the PWM reference signal to be a predetermined period or longer, and computes first and second half duty instruction values to set first and second voltage vector intervals equal to or longer than minimum time to be in the first or second half period.

14 Claims, 28 Drawing Sheets

(51) Int. Cl.
    *H02P 21/05*     (2006.01)
    *H02M 7/5387*     (2007.01)
    *H02M 1/38*     (2007.01)

(52) U.S. Cl.
    CPC ........ *H02M 7/53875* (2013.01); *H02P 21/05* (2013.01); *H02M 2001/385* (2013.01); *H02M 2007/53876* (2013.01)

(56) References Cited

U.S. PATENT DOCUMENTS

| | | | | |
|---|---|---|---|---|
| 7,102,322 | B2* | 9/2006 | Suzuki | H02M 7/5387 318/599 |
| 2006/0006834 | A1* | 1/2006 | Suzuki | H02M 7/5387 318/801 |
| 2012/0049782 | A1* | 3/2012 | Suzuki | H02M 1/14 318/807 |
| 2012/0139461 | A1* | 6/2012 | Suzuki | H02P 27/085 318/400.02 |
| 2012/0194109 | A1* | 8/2012 | Uryu | B62D 5/046 318/400.15 |
| 2013/0106332 | A1* | 5/2013 | Williams | H02P 21/00 318/400.23 |
| 2013/0271047 | A1 | 10/2013 | Imamura et al. | |
| 2013/0334995 | A1* | 12/2013 | Kuroda | H02P 27/06 318/400.27 |
| 2015/0075898 | A1 | 3/2015 | Suzuki | |

FOREIGN PATENT DOCUMENTS

| | | |
|---|---|---|
| JP | B2-3610897 | 10/2004 |
| JP | B2-3664040 | 4/2005 |
| JP | 2013-38950 | 2/2013 |

OTHER PUBLICATIONS

JP5176551.*

Suzuki, U.S. Appl. No. 14/489,103, filed Sep. 17, 2014.

Office Action (3 pages) dated Jul. 2, 2015, issued in corresponding Japanese Application No. 2013-193120 and English translation (5 pages).

* cited by examiner

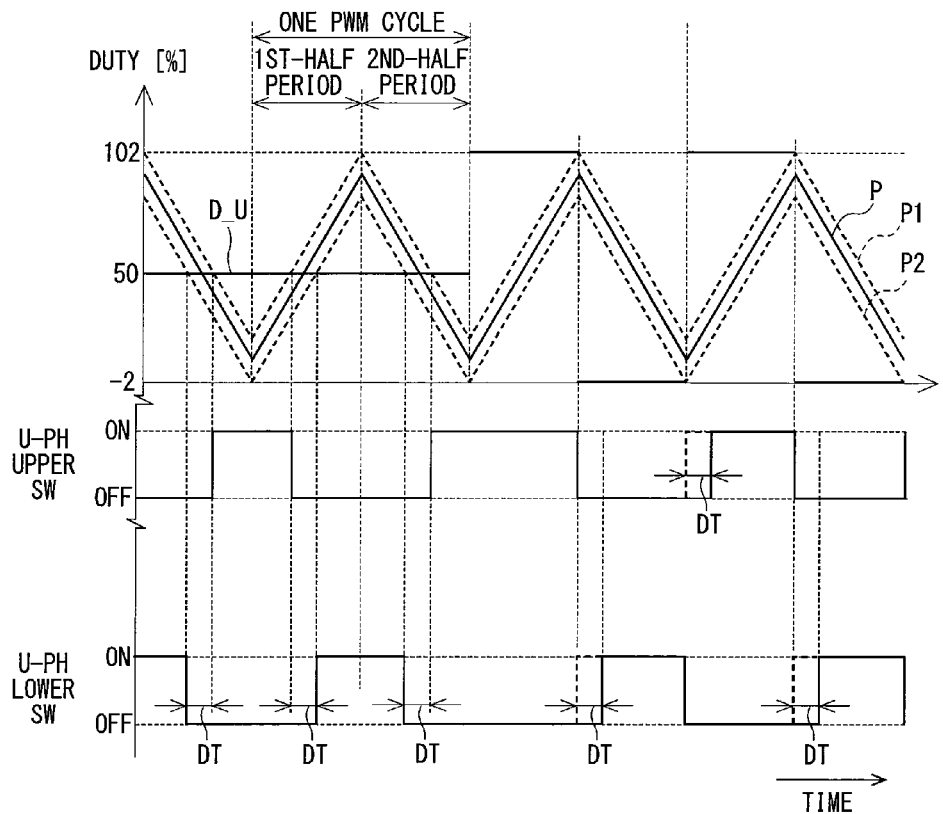

POWER CONVERSION APPARATUS AND ELECTRIC POWER STEERING APPARATUS HAVING THE SAME

CROSS REFERENCE TO RELATED APPLICATION

This application is based on Japanese Patent Application No. 2013-193120 filed on Sep. 18, 2013, the disclosure of which is incorporated herein by reference.

TECHNICAL FIELD

The present disclosure relates to a power conversion apparatus and an electric power steering apparatus having the same.

BACKGROUND

Conventionally, an inverter device for detecting current by current detecting device provided for a DC part in an inverter is known. For example, in Patent Literature 1, a control is performed to generate a zero voltage vector of one kind in each of a first-half period and a second-half period of a cycle in order to detect current at predetermined timings.

However, in the case of generating a zero voltage vector of one kind in each of the first-half period and the second-half period of a PWM cycle like in Patent Literature 1, for example, when the duty is close to 0% or 100%, an instruction voltage and the duty do not match due to the influence of dead time. Consequently, current waveform is distorted, and a torque ripple, sound, vibration, or the like occurs.
Patent Literature 1: Japanese Patent No. 3,610,897

SUMMARY

It is an object of the present disclosure to provide a power conversion apparatus realizing reduced distortion in current waveform and an electric power steering apparatus having the same.

According to an aspect of the present disclosure, a power conversion apparatus includes: an inverter unit having a plurality of high-potential-side switching elements disposed on a high-potential side and a plurality of low-potential-side switching elements disposed on a low-potential side, each of the high-potential-side switching elements and the low-potential-side switching elements corresponding to one of a plurality of phases of a winding of a rotating electrical machine; a current detecting unit connected between the inverter unit and a positive side or a negative side of a DC power supply; and a control unit controlling an on-operation and an off-operation of the high-potential-side switching elements and the low-potential-side switching elements based on a PWM reference signal and a duty instruction value. The control unit includes: a phase current computing device computing a phase current of each phase, which flows through one of phases of the winding, based on a current detection value detected by the current detecting unit; and a voltage instruction value computing device computing a voltage instruction value, which relates to a voltage applied to the winding, based on the phase current of each phase. The control unit computes an active voltage vector interval in both a first-half period and a second half period of predetermined one cycle or multiple cycles of the PWM reference signal to be longer or equal to a predetermined period required to obtain the current detection value. The control unit computes a first-half duty instruction value and a second-half duty instruction value as a duty instruction value based on the voltage instruction value in such a manner that a first voltage vector interval and a second voltage vector interval are equal to or longer than minimum time, and the first voltage vector interval and the second voltage vector interval are included in at least one of the first-half period and the second-half period. In the first voltage vector interval, the low-potential-side switching elements of all of the phases turn on. In the second voltage vector interval, the high-potential-side switching elements of all of the phases turn on. The minimum time is equal to or longer than a dead time period. In the dead time period, both one high-potential-side switching element and one low-potential-side switching element corresponding to a same phase of the winding are turned off.

In the present disclosure, the first and second voltage vector intervals V0 and V7 as zero voltage vectors are adjusted to become equal to or longer than minimum time determined from the dead time period. That is, in the disclosure, the PWM control is performed without using a duty in a range in which an instruction voltage and a duty do not match due to the influence of the dead time.

In addition, the duty is adjusted so that both of the first and second voltage vector intervals V0 and V7 are included in at least one of the first-half period and the second-half period. Consequently, even when the duty is changed between the first-half period and the second-half period of one PWM cycle, a pulse is not reduced in association with the switching of the duty.

Consequently, mismatch between the voltage instruction and the duty due to the influence of the dead time does not occur, and the current waveform is not distorted, so that a torque ripple, sound, and vibration can be reduced.

Since the duty conversion value is corrected so that the active voltage vector interval for performing current detection becomes equal to or longer than a predetermined period, the current detection value can be properly detected.

According to a second aspect of the present disclosure, an electric power steering apparatus includes: a power conversion apparatus according to the first aspect of the present disclosure; and the rotating electrical machine for outputting an auxiliary torque assisting a steering operation of a driver.

In the above apparatus, even when the duty is changed between the first-half period and the second-half period of one PWM cycle, a pulse is not reduced in association with the switching of the duty. Consequently, mismatch between the voltage instruction and the duty due to the influence of the dead time does not occur, and the current waveform is not distorted, so that a torque ripple, sound, and vibration can be reduced. Since the duty conversion value is corrected so that the active voltage vector interval for performing current detection becomes equal to or longer than a predetermined period, the current detection value can be properly detected.

BRIEF DESCRIPTION OF THE DRAWINGS

The above and other objects, features and advantages of the present disclosure will become more apparent from the following detailed description made with reference to the accompanying drawings. In the drawings:

FIG. 9 is an explanatory diagram for explaining dead time in the case of switching the duty between the first half and the second half of one PWM cycle.

FIG. 10 is an explanatory diagram illustrating the relation between the switching elements which are on and voltage vector patterns.

DETAILED DESCRIPTION

Figure 1:
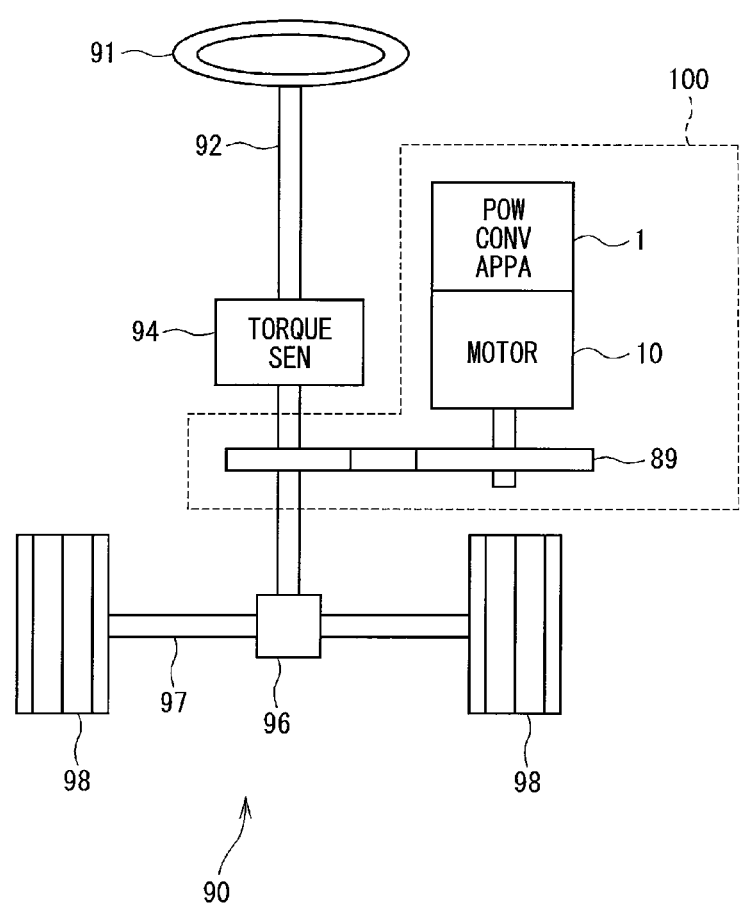
FIG. 1 is a schematic diagram illustrating an electric power steering apparatus according to a first embodiment of the present disclosure.

Hereinafter, a power conversion apparatus according to the present disclosure and an electric power steering apparatus using the same will be described with reference to the drawings.

First Embodiment

FIGS. 1 to 22 illustrate a power conversion apparatus according to a first embodiment of the present disclosure and an electric power steering apparatus using the same. Hereinafter, in a plurality of embodiments, the same reference numerals are designated to substantially the same configurations and their description will be repeated.

As illustrated in FIG. 1, a power conversion apparatus 1 is applied to, together with a motor 10 as a rotating electrical machine, for example, an electric power steering apparatus 100 for assisting steering operation of a vehicle.

FIG. 1 illustrates a general configuration of a steering system 90 having the electric power steering apparatus 100. The steering system 90 is constructed by a handle (steering wheel) 91, a steering shaft 92, a pinion gear 96, a rack shaft 97, wheels 98, the electric power steering apparatus 100, and the like.

The handle 91 is connected to the steering shaft 92. The steering shaft 92 is provided with a torque sensor 94 for detecting a steering torque which is supplied when the driver operates the handle 91. The pinion gear 96 is provided at the tip of the steering shaft 92, and the pinion gear 96 engages with the rack shaft 97. To both ends of the rack shaft 97, the pair of wheels 98 is coupled via tie rods or the like.

With the configuration, when the driver turns the handle 91, the steering shaft 92 connected to the handle 91 turns. The turning movement of the steering shaft 92 is converting to linear movement of the rack shaft 97 by the pinion gear 96, so that the pair of wheels 98 is steered at an angle according to the displacement amount of the rack shaft 97.

The electric power steering apparatus 100 includes the motor 10 which outputs an auxiliary torque assisting the steering of the handle 91 by the driver, the power conversion apparatus 1 used for controlling and driving the motor 10, a reduction gear 89 reducing the rotation of the motor 10 and transmitting the rotation to the steering shaft 92 or the rack shaft 97, and the like.

The motor 10 is driven when power is supplied from a battery 80 (refer to FIG. 2) to make the reduction gear 89 forward/reverse rotate.

The electric power steering apparatus 100 outputs the auxiliary torque for assisting the steering of the handle 91 from the motor 10 on the basis of signals from the torque sensor 94, a vehicle speed sensor for detecting vehicle speed, and the like and transmits it to the steering shaft 92 or the rack shaft 97.

Figure 2:
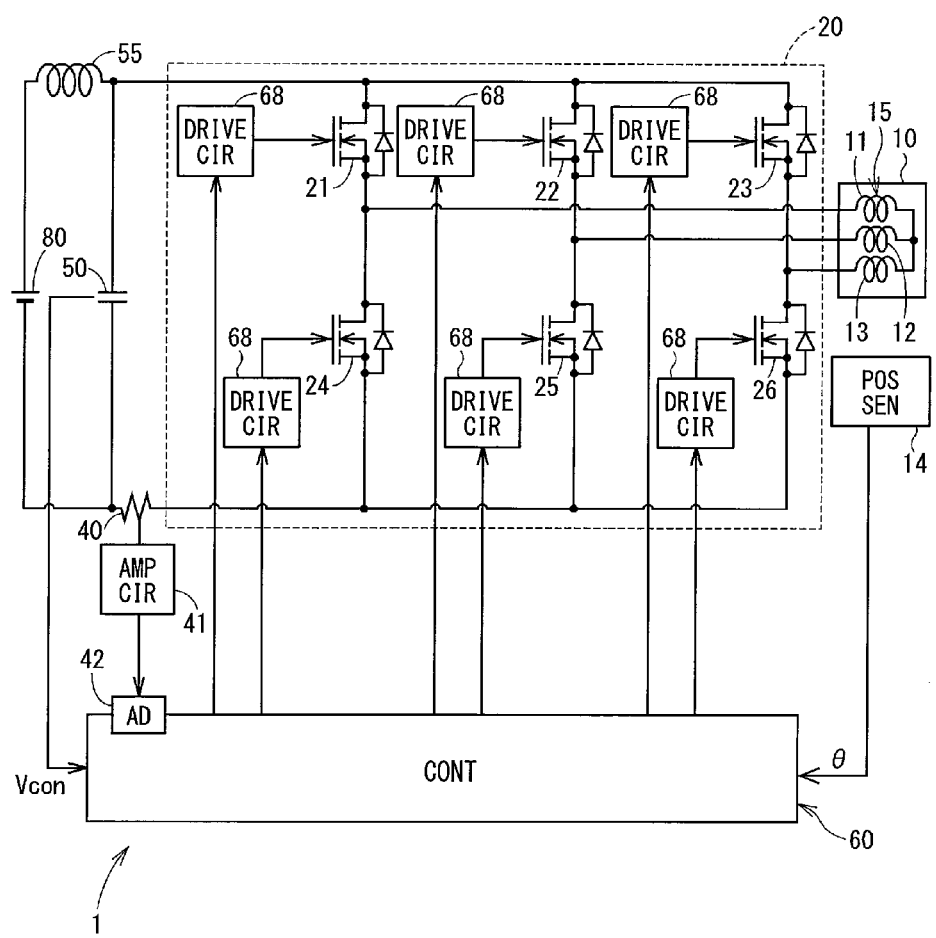
FIG. 2 is a schematic diagram illustrating the configuration of a power conversion apparatus according to the first embodiment of the disclosure.

The motor 10 is a three-phase brushless motor and has a rotor and a stator (which are not illustrated). The rotor is a cylindrical member. A permanent magnet is adhered to the surface of the motor and has a magnetic pole. The stator internally has the rotor so as to be relatively rotatable. The stator has projection parts which radially project every predetermined angle to the inside. Around the projections, a U-phase coil 11, a V-phase coil 12, and a W-phase coil 13 illustrated in FIG. 2 are wound. The U-phase coil 11, the V-phase coil 12, and the W-phase coil 13 construct a winding 15.

The motor 10 is also provided with a position sensor 14 for detecting an electric angle θ as the rotation position of the rotor.

As illustrated in FIG. 2, the power conversion apparatus 1 drives and controls the motor 10 by pulse width modulation (hereinbelow, called "PWM") and has an inverter unit 20, a shunt resistor 40 as a current detecting unit, an AD converter 42 as a current obtaining unit, a capacitor 50, a choke coil 55, a control unit 60, the battery 80 as a current power supply, and the like.

The inverter unit 20 is a three-phase inverter. Six switching elements 21 to 26 are bridge-connected to switch current application to the U-phase coil 11, the V-phase coil 12, and the W-phase coil 13. Although the switching elements 21 to 26 of the embodiment are MOSFETs (metal-oxide-semiconductor field-effect transistors) as a kind of the field-effect transistors, other transistors or the like may be also used. In the following, the switching elements 21 to 26 will be referred to as SW 21 to 26.

The drains of the three SW 21 to 23 are connected to the positive electrode side of the battery 80. The sources of the SW 21 to 23 are connected to the drains of the SW 24 to 26, respectively. The sources of the SW 24 to 26 are connected to the negative electrode side of the battery 80 via the shunt resistor 40.

The connection point of the SW 21 and the SW 24 as a pair is connected to one end of the U-phase coil 11. The connection point of the SW 22 and the SW 25 as a pair is connected to one end of the V-phase coil 12. The connection point of the SW 23 and the SW 26 as a pair is connected to one end of the W-phase coil 13.

Hereinafter, the SW 21 to 23 disposed on the high potential side will be properly referred to as "upper SW" and the SW 24 to 26 disposed on the low potential side will be properly referred to as "lower SW". As necessary, the corresponding phase is also written as "U upper SW 21". In the embodiment, the upper SW 21 to 23 correspond to "high-potential-side switching elements", and the lower SW 24 to 26 correspond to "low-potential-side switching elements".

The shunt resistor 40 is provided between the low potential side of the inverter unit 20 and the negative electrode of the battery 80 and detects bus current of the inverter unit 20. The voltage between both ends of the shunt resistor 40 is amplified by an amplification circuit 41 and the amplified voltage is output to the AD converter 42. The AD converter 42 samples and holds the voltage at predetermined sampling intervals and outputs an AD-converted current detection value Ic to a control unit 60.

The capacitor 50 and the choke coil 55 are provided between the battery 80 and the inverter unit 20 and construct a power filter. With the configuration, noise transmitted from other devices sharing the battery 80 is reduced. Noise transmitted from the inverter unit 20 side to the other devices sharing the battery 80 is also reduced. The capacitor 50 accumulates charges, thereby assisting power supply to the SW 21 to 26 and suppressing a noise component such as surge current. A voltage Vcon of the capacitor 50 is obtained by the control unit 60.

The control unit 60 controls the entire power conversion apparatus 1 and is constructed by a microcomputer executing various operations.

Figure 3:
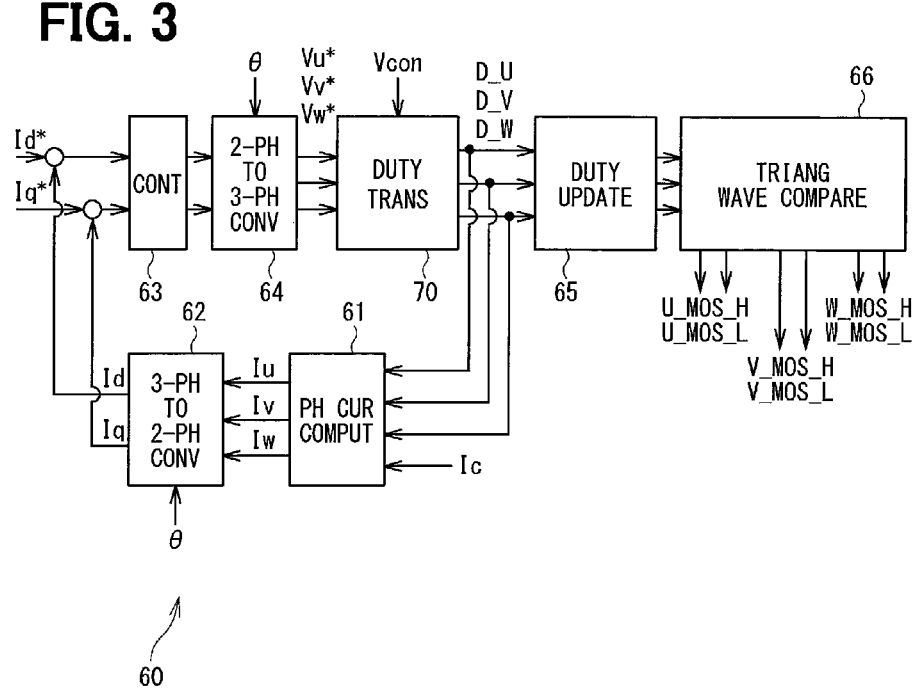
FIG. 3 is a block diagram illustrating the configuration of a control unit according to the first embodiment of the disclosure.

As illustrated in FIG. 3, the control unit 60 has a phase current computing unit 61, a three-phase to two-phase converting unit 62, a controller 63, a two-phase to three-phase converting unit 64, a duty transforming unit 70, a duty updating unit 65, a triangular wave comparing unit 66, and the like.

The phase current computing unit 61 computes a U-phase current Iu, a V-phase current Iv, and a W-phase current Iw on the basis of the current detection value Ic. Hereinafter, the U-phase current Iu, the V-phase current Iv, and the W-phase current Iw will be properly called three-phase currents Iu, Iv, and Iw.

The three-phase to two-phase converting unit 62 computes a d-axis current detection value Id and a q-axis current detection value Iq by dq conversion based on the three-phase currents Iu, Iv, and Iw and the electric angle θ.

The controller 63 performs current feedback operation based on a d-axis current instruction value Id*, a q-axis current instruction value Iq*, the d-axis current detection value Id, and the q-axis current detection value Iq to compute a d-axis voltage instruction value Vd* and a q-axis voltage instruction value Vq*. Specifically, a current deviation ΔId between the d-axis current instruction value Id* and the d-axis current detection value Id and a current deviation ΔIq between the q-axis current instruction value Iq* and the q-axis current detection value Iq are calculated, and the voltage instruction values Vd* and Vq* are computed so that the current deviations ΔId and ΔIq converge to zero in order to make the current detection values Id and Iq follow the current instruction values Id* and Iq*.

The two-phase to three-phase converting unit 64 computes a U-phase voltage instruction value Vu*, a V-phase voltage instruction value Vv*, and a W-phase voltage instruction value Vw* on the basis of the voltage instruction values Vd* and Vq* and the electric angle θ by inverse dq transformation. Hereinafter, the U-phase voltage instruction value Vu*, the V-phase voltage instruction value Vv*, and the W-phase voltage instruction value Vw* will be properly called voltage instruction values Vu*, Vv*, and Vw*, respectively.

The duty transforming unit 70 transforms the voltage instruction values Vu*, Vv*, and Vw* to a U-phase duty instruction value D_U, a V-phase duty instruction value D_V, and a W-phase duty instruction value D_W. Hereinafter, the U-phase duty instruction value D_U, the V-phase duty instruction value D_V, and the W-phase duty instruction value D_W will be properly called "duty instruction values D_U, D_V, and D_W" or simply called "duties".

Figure 4:
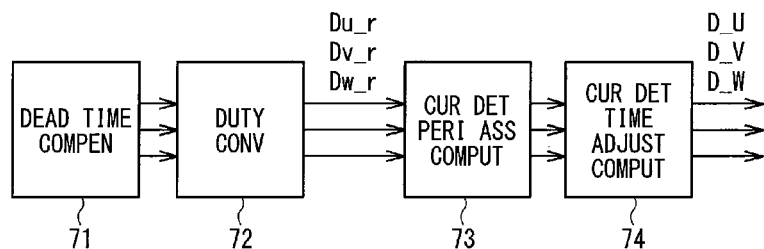
FIG. 4 is a block diagram illustrating the configuration of a duty converting unit according to the first embodiment of the disclosure.

As illustrated in FIG. 4, the duty transforming unit 70 is constructed by a dead time compensating unit 71, a duty converting unit 72, a current detection period assurance computing unit 73, and a current detection timing adjustment computing unit 74.

To avoid simultaneous turn-on of the upper SW 21 to 23 and the lower SW 24 to 26 as pairs, the dead time compensating unit 71 compensates the voltage instruction values Vu*, Vv*, and Vw* on the basis of a dead time compensation amount and computes dead time compensation values Vuc, Vvc, and Vwc so as to cancel out a change amount of the voltage applied to the coils 11 to 13 caused by the influence of the dead time.

The duty converting unit 72 converts the dead time compensation values Vuc, Vvc, and Vwc to duty conversion values Du_r, Dv_r, and Dw_r, respectively.

To assure time in which the current detection value Ic can be obtained, the current detection period assurance computing unit 73 corrects the duty conversion values Du_r, Dv_r, and Dw_r and computes first-half duty temporary values Du_at, Dv_at, and Dw_at and second-half duty temporary values Du_bt, Dv_bt, and Dw_bt.

The current detection timing adjustment computing unit 74 changes a neutral-point voltage and computes first-half duty instruction values Du_a, Dv_a, and Dw_a and second-half duty instruction values Du_b, Dv_b, and Dw_b so that the current detection value Ic can be detected at predetermined intervals. In the embodiment, the first-half duty instruction values Du_a, Dv_a, and Dw_a and the second-half duty instruction values Du_b, Dv_b, and Dw_b correspond to "duty instruction values D_U, D_V, and D_W".

The details of the computation in the current detection period assurance computing unit 73 and the current detection timing adjustment computing unit 74 will be described later.

Referring again to FIG. 3, the duty updating unit 65 sets and updates the duty instruction values D_U, D_V, and D_W computed by the duty transforming unit 70.

The triangular wave comparing unit 66 compares the duty instruction values D_U, D_V, and D_W with a PWM reference signal P as a triangular wave carrier signal and outputs a signal for switching the on/off state of the SW 21 to 26 to the drive circuit 68 (refer to FIG. 2). When a U_MOS_H signal is output, the upper SW 21 is turned on, and the lower SW 24 is turned off. When a U_MOS_L signal is output, the upper SW 21 is turned off, and the lower SW 24 is turned on. When a V_MOS_H signal is output, the upper SW 22 is turned on, and the lower SW 25 is turned off. When a V_MOS_L signal is output, the upper SW 22 is turned off, and the lower SW 25 is turned on. When a W_MOS_H signal is output, the upper SW 23 is turned on, and the lower SW 26 is turned off. When a W_MOS_L signal is output, the upper SW 23 is turned off, and the lower SW 26 is turned on.

In the embodiment, to avoid short-circuit which occurs when the upper SW 21 and the lower SW24, the upper SW 22 and the lower SW 25, and the upper SW 23 and the lower SW 26 as pairs are turned on at the same time, a dead time period in which both of the upper SW 21 and the lower SW24, the upper SW 22 and the lower SW 25, and the upper SW 23 and the lower SW 26 as pairs are turned off is provided.

Figure 5:
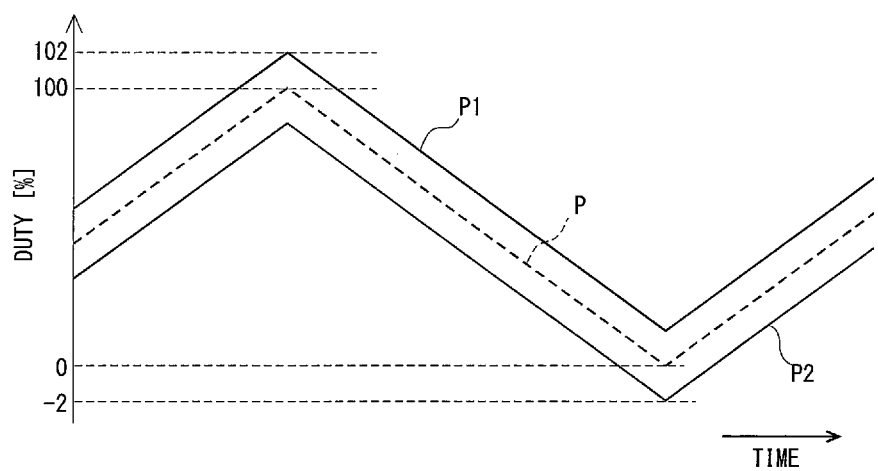
FIG. 5 is an explanatory diagram for explaining a PWM reference signal according to the first embodiment of the disclosure.

FIG. 5 illustrates a method of setting a dead time. The horizontal axis of FIG. 5 indicates time (which is not written in the diagram). In the embodiment, a triangular wave comparing method is employed. By comparing the duty instruction values D_U, D_V, and D_W calculated by the control unit 60 with the PWM reference signal P, the on/off operation of the SW 21 to 26 is controlled Concretely, when the duty exceeds the PWM reference signal P, the upper SW 21 to 23 are turned on. When the PWM reference signal P exceeds the duty, the lower SW 24 to 26 are turned on.

In the embodiment, a PWM reference signal P1 for upper SW obtained by shifting the PWM reference signal P having an amplitude of duty 0% to 100% to the upper direction and a PWM reference signal P2 for lower SW obtained by shifting the PWM reference signal to the lower direction are generated. By controlling the on/off state of the upper SW 21 to 23 on the basis of the PWM reference signal P1 for upper SW and the duty and controlling the on/off state of the lower SW 24 to 26 on the basis of the PWM reference signal p2 for lower SW and the duty, the dead time period is assured.

In the embodiment, the PWM reference signal P1 for upper SW is shifted by the amount of 2% in the upper direction from the PWM reference signal P. The PWM reference signal P2 for lower SW is shifted by the amount of 2% in the lower direction from the PWM reference signal P. Consequently, in the embodiment, for convenience, the range of duty is −2% to 102%. The duty corresponding to the dead time on the upper SW 21 to 23 side is the amount of 2%, and the duty corresponding to the dead time on the lower SW 24 to 26 side is the amount of 2%. In total, the duty corresponding to the dead time is 4%. Hereinafter, the duty corresponding to the dead time will be properly simply called "dead time". The length of the dead time can be properly set in consideration of the effective pulse width and other factors.

As illustrated in FIG. 5, in the case of providing the dead time by using the two PWM reference signals P1 and P2, a pulse smaller than the dead time cannot be output. Consequently, in a predetermined range from −2% as the lower limit of the duty and a predetermined range from 102% as the upper limit of the duty, the dead time at the time of output varies according to the duty.

A concrete example will be described with reference to FIGS. 6A and 6B and FIGS. 7A and 7B. In the description of FIGS. 6A and 6B and FIGS. 7A and 7B, in one cycle of the PWM reference signal P, the portion in which the upper SW 21 to 23 are on is called upper SW on duty, and the portion in which the lower SW 24 to 26 is on is called lower SW on duty. In the diagrams, on duty is abbreviated as "OD", and dead time is abbreviated as "DT".

Figure 6A:
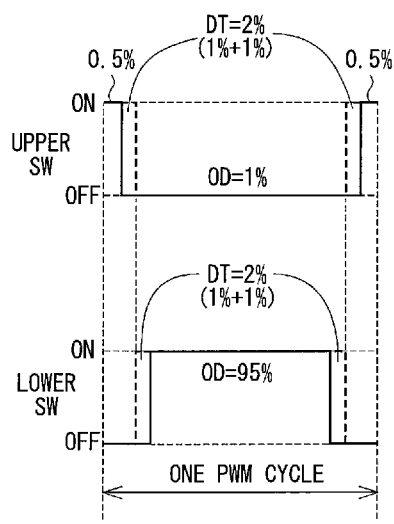
FIGS. 6A and 6B are explanatory diagrams for explaining a duty instruction and on/off operations of switching elements in the first embodiment of the disclosure.
Figure 6B:
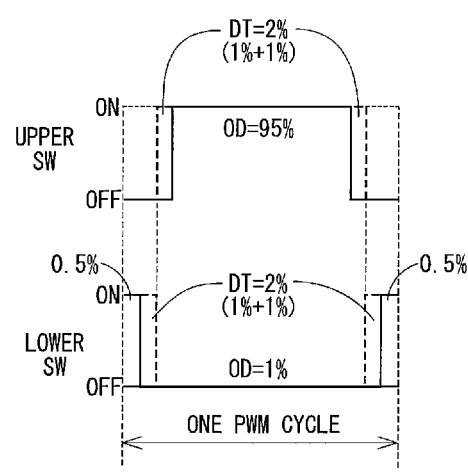

FIGS. 6A and 6B illustrate an example of the case where the dead time becomes the set dead time. For example, when the duty is 3%, the upper SW on duty becomes 1% obtained by subtracting 2% as the dead time amount on the upper SW side from 3%. The lower SW on duty becomes 95% obtained by subtracting 2% as the dead time amount on the lower SW side from 97% (=100%−3%).) That is, since the upper SW on duty is 1% and the lower SW on duty is 95% when the duty is 3%, the dead time becomes 4% as the set dead time.

As illustrated in FIG. 6B, also in the case where the duty is 97%, the dead time is similar to the above.

Figure 7A:
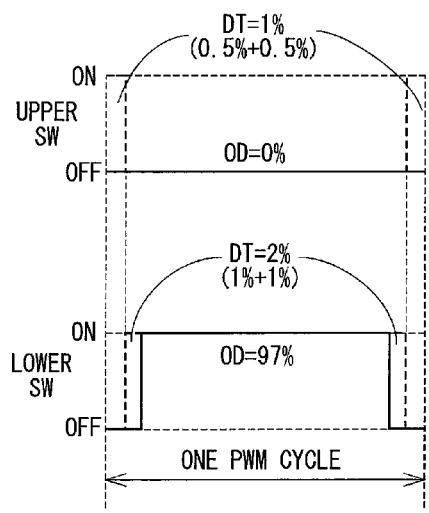
FIGS. 7A and 7B are explanatory diagrams for explaining the duty instruction value and the on/off operations of the switching elements in the first embodiment of the disclosure.
Figure 7B:
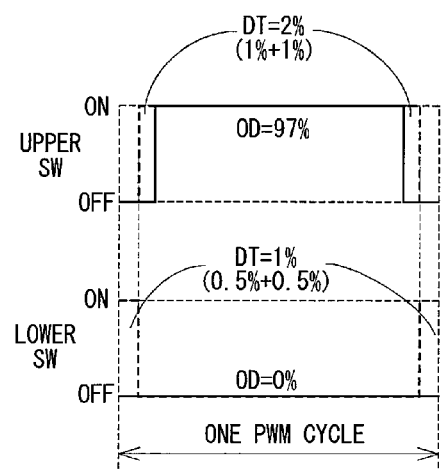

FIGS. 7A and 7B illustrate an example of the case where the dead time does not become the set dead time. When the duty is 2% or higher, the upper SW on duty is calculated by subtracting 2% as the dead time amount on the upper SW side from the duty. On the other hand, when the duty is less than 2%, the upper SW on duty cannot be made smaller than 0%. Consequently, for example, when the duty is 1%, the dead time on the upper SW side is set to 1%, and the upper SW on duty when the duty is 1% is set to 0%, so that the upper SW are not turned on. The lower SW on duty becomes 97% obtained by subtracting 2% as the dead time amount on the lower SW side from 99% (=100%−1%). That is, since the upper SW on duty is 0% and the lower SW on duty is 97% when the duty is 1%, the dead time becomes 3% which is different from 4% as the set value.

As illustrated in FIG. 7B, also in the case where the duty is 99%, the dead time is similar to the above.

That is, in the range where the duty is 2% to 98%, the dead time is 4% as the set value. However, when the duty is −2% to 2% as the predetermined range from the lower limit of the duty and when the duty is to 98% to 102% as the predetermined range from the upper limit of the duty, the dead time is smaller than the set value. The length of the dead time changes according to the duty. Consequently, in the case of uniformly performing dead time compensation of the amount 4% by the dead time compensating unit 71, the compensation is performed more than the amount in which the compensation has to be originally performed. In the range of the duty of −2% to 2% and the range of the duty of 98% to 102%, distortion occurs in line voltage.

Figure 8A:
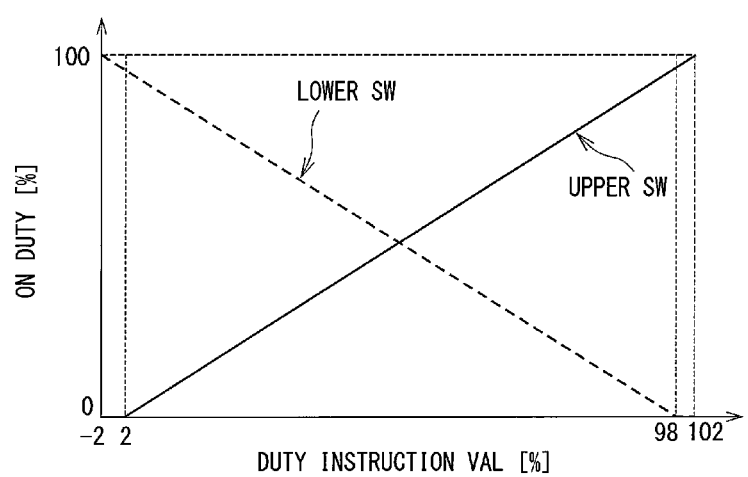
FIGS. 8A and 8B are explanatory diagrams illustrating the relation between the duty instruction value and a duty at which the switching elements are turned on and the relation between the duty instruction value and application voltage, respectively.
Figure 8B:
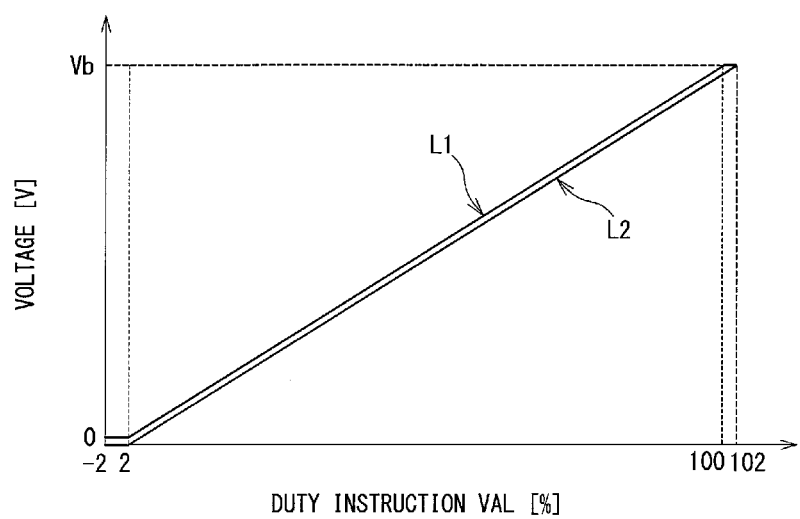

FIG. 8A illustrates the relations of the duty instruction values D_U, D_V, and D_W and the upper SW on duty and the lower SW on duty, and FIG. 8B illustrates the relations of the duty instruction values D_U, D_V, and D_W and application voltages.

In the embodiment, the PWM reference signal P1 for upper SW related to the on/off control on the upper SW 21 to 23 is shifted upward only by the amount of 2%. Consequently, as illustrated by the solid line in FIG. 8A, 0% to 100% in the upper SW on duty corresponds to 2% to 102% of the duty instruction values D_U, D_V, and D_W. Since the PWM reference signal P2 for lower SW related to the on/off control on the lower SW 24 to 26 is shifted downward only by the amount of 2%, as illustrated by the broken line in FIG. 8A, 0% to 100% in the lower SW on duty corresponds to 98% to −2% of the duty instruction.

As illustrated in FIG. 8B, when the phase current is negative, as illustrated by the solid line L1, the terminal voltage of each phase becomes a predetermined value at the duty instruction value of 2% or less and becomes battery voltage Vb at the duty instruction value of 100% or higher. When the phase current is positive, as illustrated by the solid line L2, the terminal voltage of each phase becomes zero at the duty instruction value of 2% or less and becomes the battery voltage Vb at the duty instruction value of 102%.

As described above, in the case of switching the on/off operation of the SW 21 to 26 by the triangular wave comparing method, when the duty within the predetermined range from the upper limit of the duty or within the predetermined range from the lower limit of the duty is output, the instruction voltage and the duty do not match, and the current waveform is distorted.

In the embodiment, therefore, the duties in the range where the instruction voltage and the duty do not match due to the influence of the dead time, that is, in the predetermined range from −2% as the lower limit of the duty or the predetermined range from 102% as the upper limit of the duty is set as an output avoidance duty, and the PWM control is performed without using a duty in the range.

When the output avoidance duty is provided, the period corresponding to the output avoidance duty including the lower or upper end of the PWM reference signals P1 and P2 becomes a "zero voltage vector" in which all of the upper SW 21 to 23 or all of the lower SW 24 to 26 are on. It is also possible to provide a zero voltage vector interval twice in each of the first-half period and the second-half period of the PWM reference signal.

The case of changing the duty in one cycle of the PWM cycle in the triangular wave comparing method will be explained with reference to FIG. 9. Although the U phase will be described as an example in FIG. 9, description of the other phases is similar. In the embodiment, a cycle starting from the lower end of the PWM reference signal to the next lower end is set as a "PWM cycle", the period from the starting lower end to the upper end is called the "first-half period", and the period from the upper end to the next lower end is called the "second-half period".

As illustrated in FIG. 9, when the duty of one PWM cycle is set to 50%, the dead time as the set value can be assured.

Even when the duty is switched between the first-half period and the second-half period, is set to, for example, 102% in the first-half period and is set to −2% in the second-half period, in one PWM cycle, a voltage equivalent to that in the case of performing a control with the duty of 50% is theoretically applied.

However, in the case of switching the duty over the PWM reference signals P1 and P2 in such a manner that 102% is set in the first-half period and −2% is set in the second-half period, a drive signal which simultaneously switching the upper and lower SW is output in association with the switching of the duty. In this case, by forcedly delaying the turn-on timing of the SW which is switched from the off state to the on state by another process, the dead time is assured, and a short circuit caused when the upper and lower SW are turned on simultaneously is avoided. Consequently, the pulse of the drive signal for the SW which is switched from the off state to the on state is reduced by the amount of the dead time.

Concretely, in the case of switching the duty from 102% to −2%, the drive signal for the lower SW 24 is reduced. In the case of switching the duty from −2% to 102%, the drive signal for the upper SW 21 is reduced.

Therefore, when the duty is switched over the PWM reference signals P1 and P2, an output as the set value cannot be output, and distortion occurs in the line voltage.

For example, in the case of switching the duty from 50% to 100% on the upper side of the PWM reference signal P1 for upper SW, switching of the on/off state accompanying the switching of the duty does not occur, and there is no influence on the pulse of the drive signal.

Similarly, for example, in the case of switching the duty from 50% to 0% on the lower side of the PWM reference signal P2 for lower SW, no switching of the on/off state accompanying the switching of the duty occurs, and there is no influence on the pulse of the drive signal.

Next, the voltage vector pattern will be described.

As illustrated in FIG. 10, combinations of the on/off state of the SW 21 to 26 are eight kinds of voltage vectors V0 to V7. The voltage vector V0 in which all of the lower SW 24 to 26 are on and the voltage vector V7 in which all of the upper SW 21 to 23 are on are "zero voltage vectors". At the time of the zero voltage vector, the line-to-line voltage is zero, and no voltage is applied to the coils 11 to 13.

The voltage vectors V1 to V6 are "active voltage vectors". In the valid voltage vectors, voltage is generated between the phase in which the upper SW is on and the phase in which the lower SW is on, and voltage is applied to the coils 11 to 13.

In odd-numbered voltage vectors as the voltage vectors V1, V3, and V5, one upper SW is on and two lower SW are on.

In even-numbered voltage vectors as the voltage vectors V2, V4, and V6, two upper SW are on and one lower SW is on.

Figure 11A:
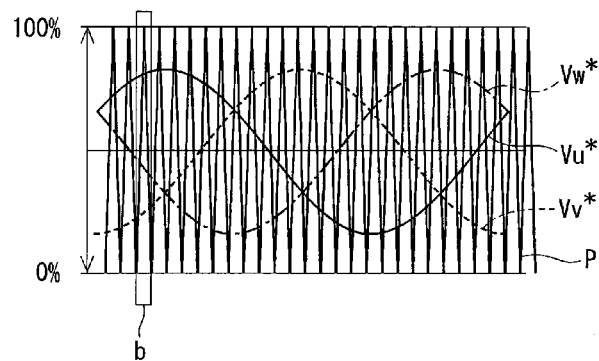
FIGS. 11A and 11B are explanatory diagrams for explaining the relation between the voltage instruction values and the voltage vector patterns in the first embodiment of the disclosure.
Figure 11B:
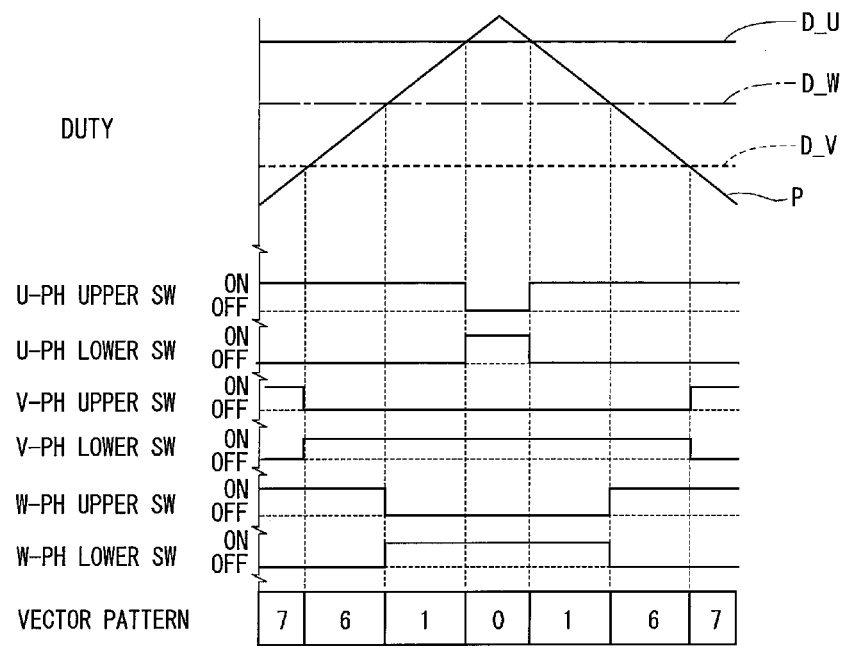

Subsequently, a voltage vector pattern in the triangular wave comparing method will be described with reference to FIGS. 11A and 11B. FIG. 11B is a diagram of duties obtained by converting the voltage instruction values Vu*, Vv*, and Vw* with respect to a region "b" in FIG. 11A.

As illustrated in FIG. 11B, each of the voltage instruction values Vu*, Vv*, and Vw* of the different phases is converted to a duty on the basis of a capacitor voltage Vcon. To simplify explanation, an example of controlling the on/off state of the SW 21 to 26 on the basis of duty conversion values Vu_r, Vv_r, and Vw_r before a correcting process and an adjusting process and a PWM reference signal P before a shift in which dead time is not considered will be described. In the following drawings, the example will be similar.

In one PWM cycle illustrated in FIG. 11B, the voltage vector switches in order of V7→V6→V1→V0→V1→V6→V7. In such a manner, in one PWM cycle, the voltage vector switches in order of voltage vector V7→even-numbered voltage vector→odd-numbered voltage vector→voltage vector V0→odd-numbered voltage vector→even-numbered voltage vector→voltage vector V7.

The interval of the voltage vector V1 as an odd-numbered voltage vector corresponds to the difference between a U-phase duty as the largest duty in the period and a W-phase duty as an intermediate duty.

The interval of the voltage vector V6 as an even-numbered voltage vector corresponds the difference between a W-phase duty as the intermediate duty in the period and a V-phase duty as the smallest duty.

The sum of the interval of the voltage vector V1 and the interval of the voltage vector V6 as active voltage vectors corresponds to the difference between a U-phase duty as the largest duty and a V-phase duty as the smallest duty.

That is, each of the odd-numbered voltage vector interval, the even-numbered voltage vector interval, and the active voltage vector interval has length according to the difference of corresponding duties. Hereinafter, the difference of duties corresponding to an odd-numbered voltage vector interval will be called "odd-numbered voltage duty Do", the difference of duties corresponding to an even-numbered voltage vector interval will be called "even-numbered voltage duty De", and the difference of duties corresponding to an active voltage vector interval will be called "active voltage duty Da".

In the embodiment, current is detected in the shunt resistor 40 provided for the DC bus. In this case, current is detected in the active voltage vector interval. The current detection value Ic detected in the active voltage vector interval corresponds to current of a phase different from the other two phases of the arm of a SW which is on.

That is, the current detection value Ic detected in the voltage vector V1 corresponds to a U-phase current Iu, the current detection value detected in the voltage vector V2 corresponds to a W-phase current Iw, and the current detection value Ic detected in the voltage vector V3 corresponds to a V-phase current Iv. The current detection value Ic detected in the voltage vector V4 corresponds to the U-phase current Iu, the current detection value Ic detected in the voltage vector V5 corresponds to the W-phase current Iw, and the current detection value Ic detected in the voltage vector V6 corresponds to the V-phase current Iv.

In the embodiment, in one PWM cycle, the current detection value Ic is detected at timings of two active voltage vectors at which currents of different phases can be detected. The phase current computing unit 61 computes the currents Iu, Iv, and Iw of the respective phases on the basis of a current detection value Ic and the voltage vector at the time of detecting the current detection value Ic.

The example illustrated in FIG. 11B will be described. For example, the current detection value Ic of the first time is detected at the timing of the voltage vector V6 in the first-half period, and the current detection value Ic of the first time is detected at the timing of the voltage vector V1 in the second-half period. The phase current computing unit 61 computes the V-phase current Iv on the basis of the current detection value Ic of the first time, and computes the U-phase current Iu on the basis of the current detection value Ic of the second time. Since the sum of three phases=0, the W-phase current Iw is computed.

In the case of detecting the current detection value Ic in the shunt resistor 40, time (for example, 4.5µseconds) in which ringing converges and hold time in which the on/off state of the SW 21 to 26 is not switched has to be assured. Since the current detection is performed in the active voltage vector in the embodiment, the length of the active voltage vector interval in which current detection is performed has to be set to equal to or longer than a predetermined period.

For example, in the case where the voltage instruction values Vu*, Vv*, and Vw* are relatively apart from one another as illustrated in FIG. 11B, the active voltage vector intervals are long. Consequently, the current can be detected at the timings of the active voltage vectors.

Figure 12A:
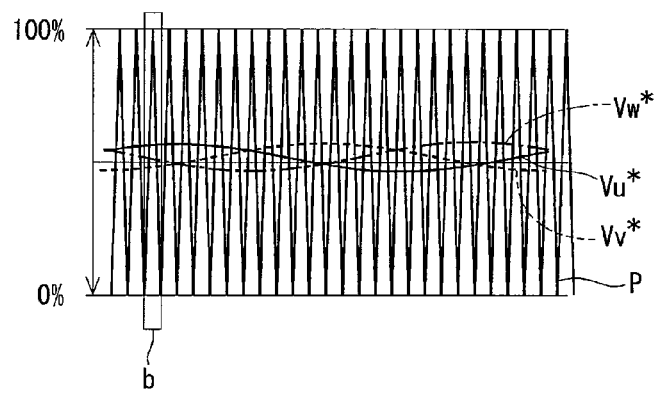
FIGS. 12A and 12B are explanatory diagrams for explaining the relation between the voltage instruction values and the voltage vector patterns in the first embodiment of the disclosure.
Figure 12B:
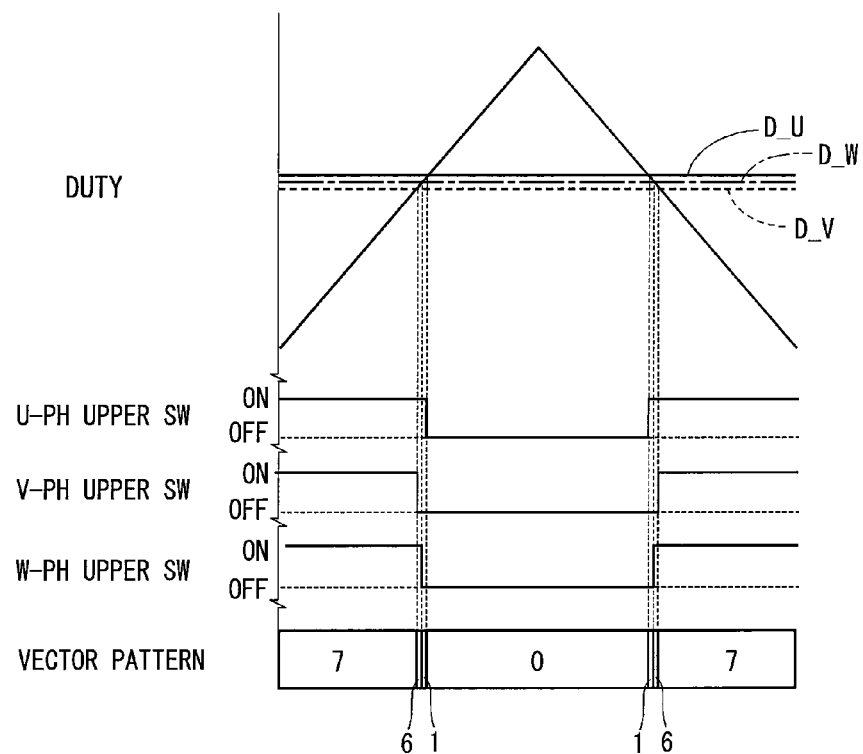

On the other hand, when the amplitudes of the voltage instruction values Vu*, Vv*, and Vw* are small as illustrated in FIG. 12A, the active voltage vector intervals are short, so that the current cannot be detected.

Figure 13A:
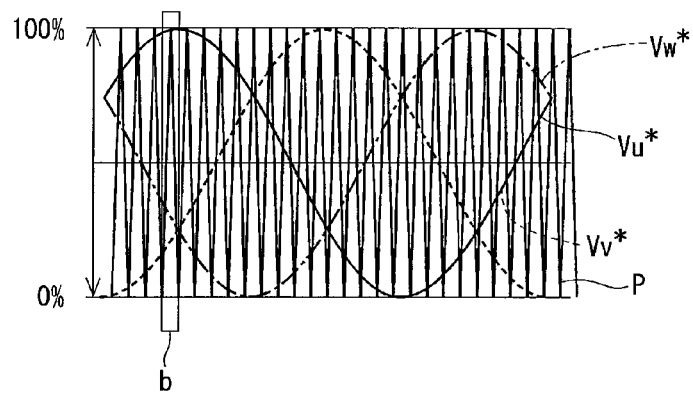
FIGS. 13A and 13B are explanatory diagrams for explaining the relation between the voltage instruction values and the voltage vector patterns in the first embodiment of the disclosure.
Figure 13B:
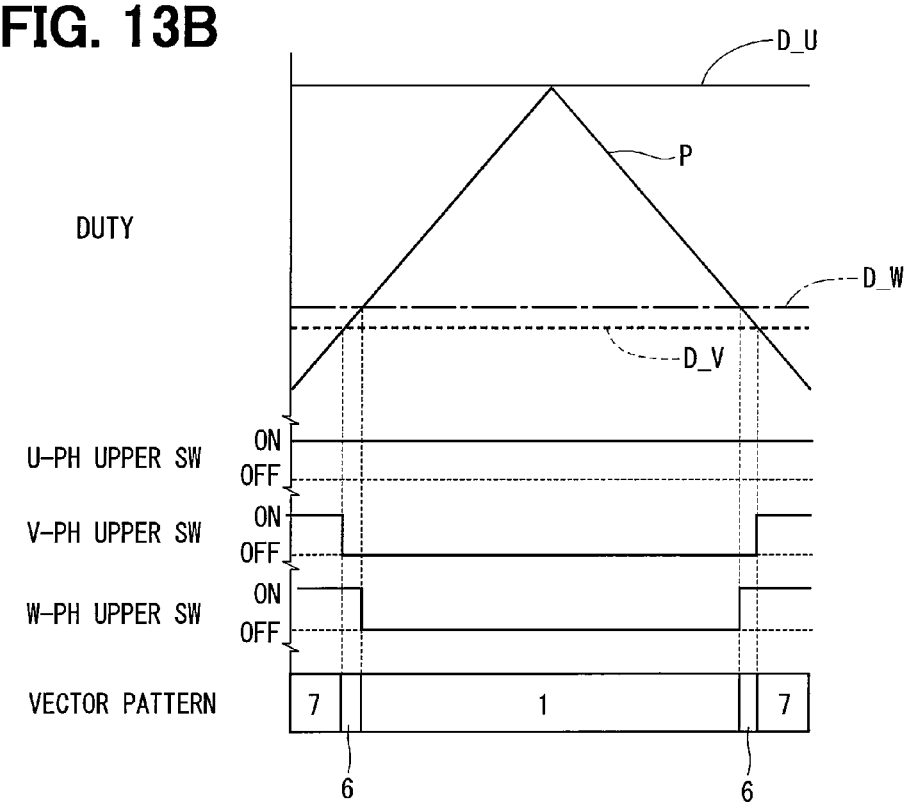

As illustrated in FIG. 13A, in the case where voltage instruction values of two phases are close to each other even though the amplitudes of the voltage instruction values Vu*, Vv*, and Vw* are large, only the current of one phase can be detected, and the currents Iu, Iv, and Iw of the respective phases cannot be computed. In FIGS. 12A and 12B and FIGS. 13A and 13B, on/off signals of the lower SW 24 to 26 are not illustrated.

As described above, each of the intervals of the active voltage vectors has length according to the difference of corresponding duties. In the embodiment, therefore, by correcting the duty conversion values Du_r, Dv_r, and Dw_r by the current detection period assurance computing unit 73, the active voltage vector interval of the current detection timing becomes equal to or longer than a predetermined period. Concretely, the duty conversion values Du_r, Dv_r, and Dw_r are corrected so that the difference of duties corresponding to an active voltage vector interval for performing current detection becomes a duty lower-limit value Dm corresponding to the predetermined time. In other words, when the difference of duties is equal to or larger than the current detection duty lower-limit value Dm, current can be detected in the active voltage interval corresponding to the difference of the duties.

The correcting process in the current detection period assurance computing unit 73 will be described with reference to FIGS. 14 to 19.

The correcting process in the current detection period assurance computing unit 73 will be described with reference to the flowcharts of FIGS. 14 and 15.

In the first step S101 (hereinbelow, "step" will be simply indicated by reference character "S"), the magnitude relations of the duty conversion values Du_r, Dv_r, and Dw_r are determined. On the basis of the duty conversion values Du_r, Dv_r, and Dw_r, the odd-numbered voltage duty Do, the even-numbered voltage duty De, and the active voltage duty Da before correction are specified.

When the largest duty in the duty conversion values Du_r, Dv_r, and Dw_r before the correcting process is expressed as a first duty D1, the second largest duty is expressed as a second duty D2, and the smallest duty is expressed as a third duty D3, the odd-numbered voltage duty Do, the even-numbered voltage duty De, and the active voltage duty Da are expressed by the following equations (1), (2), and (3), respectively.

$$Do = D1 - D2 \tag{1}$$

$$De = D2 - D3 \tag{2}$$

$$Da = D1 - D3 \tag{3}$$

In S102, whether the amplitude of the voltage instruction values Vu*, Vv*, and Vw* is less than a predetermined value THa or not is determined. In the case where the amplitude of the voltage instruction values Vu*, Vv*, and Vw* is equal to or larger than the predetermined value THa (NO in S102), the routine advances to S110 in FIG. 15. In the case where it is determined that the amplitude of the voltage instruction values Vu*, Vv*, and Vw* is less than the predetermined value THa (YES in S102), the routine shifts to S103.

In S103, a first duty correction value C11 as the correction value for the first duty D1 is set to zero. That is, the first duty correction value C11 is expressed by the equation (4).

$$C11 = 0 \tag{4}$$

In S104, whether or not the odd-numbered voltage duty Do is less than a value obtained by subtracting the odd-numbered voltage duty Do from the current detection duty lower-limit value Dm is determined. In the case where it is determined that the odd-numbered voltage duty Do is less than the value obtained by subtracting the odd-numbered voltage duty Do from the current detection duty lower-limit value Dm (YES in S104), the routine advances to S105. In the case where it is determined that the odd-numbered voltage duty Do is equal to or larger than the value obtained by subtracting the odd-numbered voltage duty Do from the current detection duty lower-limit value Dm (NO in S104), the routine shifts to S106.

In S105, a second duty correction value C12 as a correction value for the second duty D2 is expressed by the equation (5-1).

$$C12 = Dm - Do \tag{5-1}$$

In S106, the second duty correction value C12 is set to the odd-numbered voltage duty Do (equation (5-2)).

$$C2 = Do \tag{5-2}$$

In the embodiment, the odd-numbered voltage duty Do and the value obtained by subtracting the odd-numbered voltage duty Do from the current detection duty lower-limit value Dm are compared, and the larger value is set as the second duty correction value C12.

In S107 following S105 or S106, whether the active voltage duty Da is less than a value obtained by subtracting the active voltage duty Da from the current detection duty lower-limit value Dm or not is determined. In the case where it is determined that the active voltage duty Da is less than the value obtained by subtracting the active voltage duty Da from the current detection duty lower-limit value Dm (YES in S107), the routine shifts to S108. In the case where it is determined that the active voltage duty Da is equal to or larger than the value obtained by subtracting the active voltage duty Da from the current detection duty lower-limit value Dm (NO in S107), the routine shifts to S109.

In S108, a third duty correction value C13 as a correction value for the third duty D3 is expressed by the equation (6-1).

$$C13 = -(Dm - Da) \tag{6-1}$$

In S109, the third duty correction value C13 is expressed by the equation (6-2).

$$C13 = -Da \tag{6-2}$$

In the embodiment, the active voltage duty Da and the value obtained by subtracting the active voltage duty Da from the current detection duty lower-limit value Dm are compared, and a value obtained by multiplying the larger value with −1 is set as the third duty correction value C13.

Figure 15:
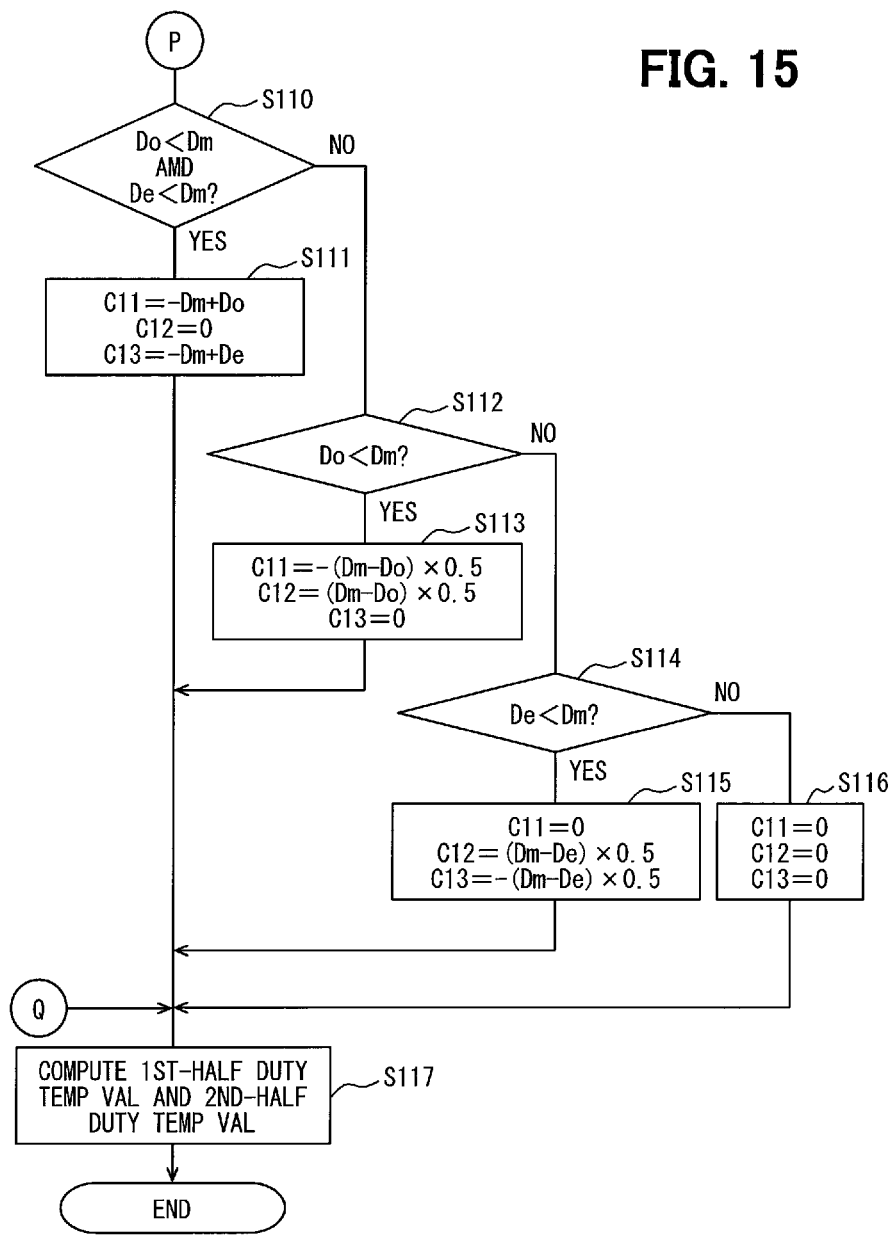
FIG. 15 is a flowchart for explaining the correcting process according to the first embodiment of the disclosure.

After the process in S108 or S109, the routine shifts to S117 in FIG. 15.

In S110 in FIG. 15 to which the routine shifts in the case where it is determined that the amplitude of the voltage instruction values Vu*, Vv*, and Vw* is equal to or larger than the predetermined value THa (NO in S102), whether both of the odd-numbered voltage duty Do and the even-numbered voltage duty De are less than the current detection duty lower-limit value Dm or not is determined. In the case where at least one of the odd-numbered voltage duty Do and the even-numbered voltage duty De is equal to or larger than the current detection duty lower-limit value Dm (NO in S110), the routine shifts to S112. In the case where both of the odd-numbered voltage duty Do and the even-numbered voltage duty De are less than the current detection duty lower-limit value Dm (YES in S110), the routine shifts to S111.

In S111, the first duty correction value C11 is expressed by the equation (7), the second duty correction value C12 is expressed by the equation (8), and the third duty correction value C13 is expressed by the equation (9).

$$C11 = -Dm + Do \tag{7}$$

$$C12 = 0 \tag{8}$$

$$C13 = -Dm + De \tag{9}$$

In S112 to which the routine shifts in the case where it is determined that the odd-numbered voltage duty Do or the even-numbered voltage duty De is equal to or larger than the current detection duty lower-limit value Dm (NO in S110), whether the odd-numbered voltage duty Do is less than the current detection duty lower-limit value Dm or not is determined. In the case where it is determined that the odd-numbered voltage duty Do is equal to or larger than the current detection duty lower-limit value Dm (NO in S112), the routine shifts to S114. In the case where it is determined that the odd-numbered voltage duty Do is less than the current detection duty lower-limit value Dm (YES in S112), the routine shifts to S113.

In S113, the first duty correction value C11 is expressed by the equation (10), the second duty correction value C12 is expressed by the equation (11), and the third duty correction value C13 is expressed by the equation (12).

$$C11=-(Dm-Do)\times 0.5 \tag{10}$$

$$C12=(Dm-Do)\times 0.5 \tag{11}$$

$$C13=0 \tag{12}$$

In S114 to which the routine shifts in the case where it is determined that the odd-numbered voltage duty Do is equal to or larger than the current detection duty lower-limit value Dm (NO in S112), whether the even-numbered voltage duty De is less than the current detection duty lower-limit value Dm or not is determined. In the case where it is determined that the even-numbered voltage duty De is equal to or larger than the current detection duty lower-limit value Dm (NO in S114), the routine shifts to S116. In the case where it is determined that the even-numbered voltage duty De is less than the current detection duty lower-limit value Dm (YES in S114), the routine shifts to S115.

In S115, the first duty correction value C11 is expressed by the equation (13), the second duty correction value C12 is expressed by the equation (14), and the third duty correction value C13 is expressed by the equation (15).

$$C11=0 \tag{13}$$

$$C12=(Dm-De)\times 0.5 \tag{14}$$

$$C13=-(Dm-De)\times 0.5 \tag{15}$$

In S116 to which the routine shifts in the case where both the odd-numbered voltage duty Do and the even-numbered voltage duty De are equal to or larger than the current detection duty lower-limit value Dm (NO in S112 and NO in S114), the first duty correction value C11, the second duty correction value C12, and the third duty correction value C13 are set to zero (equation (16)).

$$C11=C12=C13=0 \tag{16}$$

Figure 14:
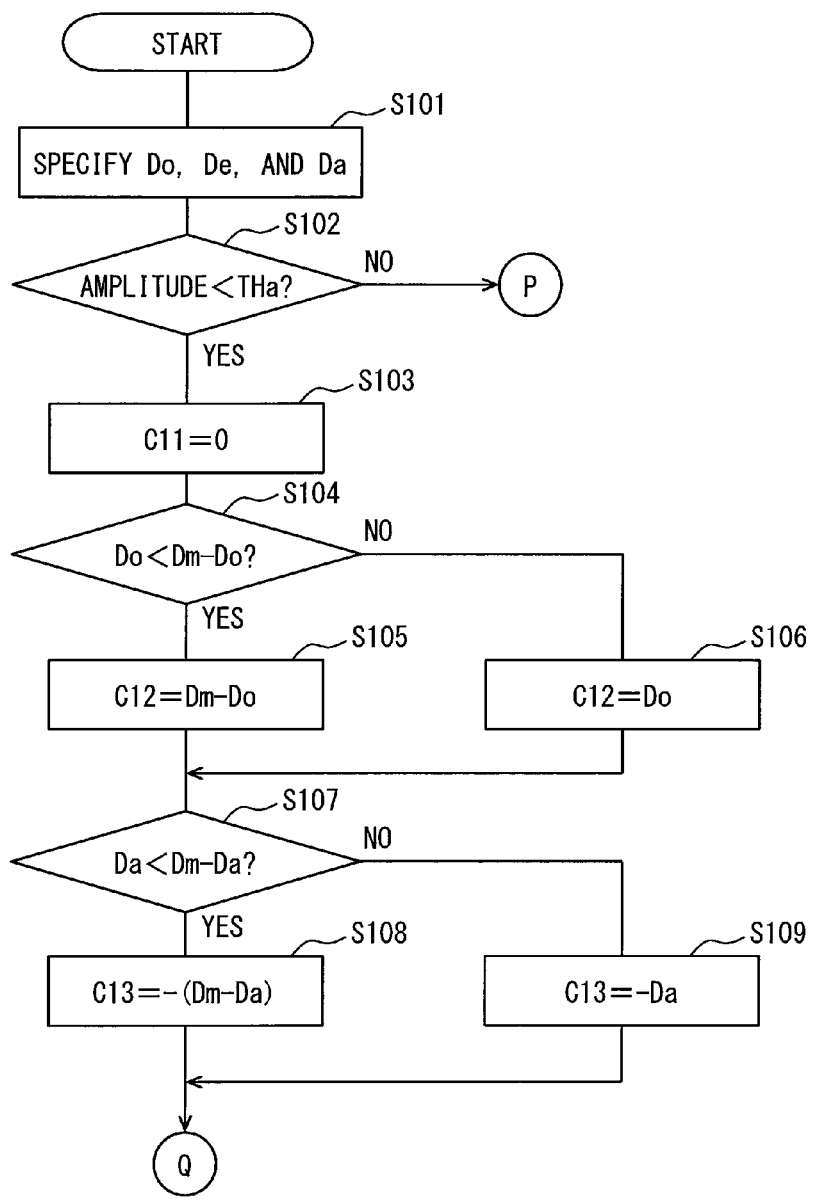
FIG. 14 is a flowchart for explaining a correcting process according to the first embodiment of the disclosure.

In S117 following S108 or S109 in FIG. 14 and S111, S113, S115, or S116 in FIG. 15, on the basis of the first duty correction value C11, the second duty correction value C12, and the third duty correction value C13, the first, second, and third duties D1, D2, and D3 are corrected to compute first-half duty temporary values D1_at, D2_at, and D3_at (equations (17), (18), and (19)) and second-half duty temporary values D1_bt, D2_bt, and D3_bt (equations (20), (21), and (22)).

$$D1\_at=D1+C11 \tag{17}$$

$$D2\_at=D2+C12 \tag{18}$$

$$D3\_at=D3+C13 \tag{19}$$

$$D1\_bt=D1-C11 \tag{20}$$

$$D2\_bt=D2-C12 \tag{21}$$

$$D3\_bt=D3-C13 \tag{22}$$

For example, when the duty conversion values Du_r, Dv_r, and Dw_r satisfy the relation Du_r>Dv_r>Dw_r, the first-half duty temporary values Du_at, Dv_at, and Dw_at and the second-half duty temporary values Du_bt, Dv_bt, and Dw_bt are expressed as equations (23) to (28), respectively.

$$Du\_at=Du\_r+C11 \tag{23}$$

$$Dv\_at=Dv\_r+C12 \tag{24}$$

$$Dw\_at=Dw\_r+C13 \tag{25}$$

$$Du\_bt=Du\_r-C11 \tag{26}$$

$$Dv\_bt=Dv\_r-C12 \tag{27}$$

$$Dw\_bt=Dw\_r-C13 \tag{28}$$

By the above, the active voltage vector interval for performing current detection becomes equal to or longer than the predetermined period. In the embodiment, the correction values C11 to C13 are added in the first-half period and the correction values C11 to C13 are subtracted in the second-half period, so that the correction values are cancelled out in one PWM cycle.

The details of the correcting process will be described with reference to FIGS. 16 to 19. In FIGS. 16 to 19, the first duty D1 is expressed by the solid line, the second duty D2 is expressed by the broken line, and the third duty D3 is indicated by an alternate long and short dash line. In FIGS. 16 to 19, (i) corresponds to "before correction", (ii) corresponds to the first-half period, and (iii) corresponds to the second-half period.

Figure 16:
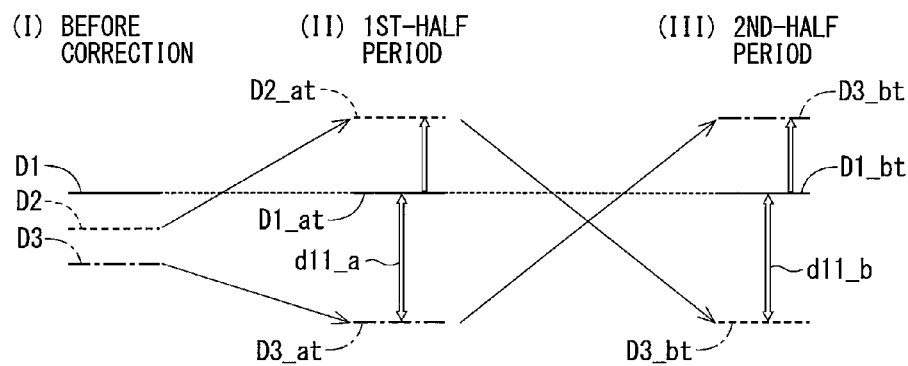
FIG. 16 is an explanatory diagram for explaining a correcting process (1-1) according to the first embodiment of the disclosure.

A process (1-1) in the case where the amplitude of the voltage instruction values Vu*, Vv*, and Vw* is less than the predetermined value THa (YES in S102) will be described with reference to FIG. 16. Correction values in the process (1-1) are values determined in S103 and S105, S106 and S108, or S109.

In the process (1-1), in the first-half period, to detect the phase current of the third duty D3, the third duty D3 is corrected downward so that the difference d11_a between the third duty D3 and the first duty D1 becomes equal to or larger than the current detection duty lower-limit value Dm, and the second duty D2 is corrected upward so that the second duty D2 becomes larger than the first duty D1.

In the second-half period, to detect the phase current of the second duty D2, the second duty D2 is corrected downward so that the difference d11_b between the second duty D2 and the first duty D1 becomes equal to or larger than the current detection duty lower-limit value Dm, and the third duty D3 is corrected upward so that the third duty D3 becomes larger than the first duty D1.

In the process (1-1), the correction values C12 and C13 by which the second duty D2 becomes larger than the first duty D1 in the first-half period and the third duty D3 becomes larger than the first duty D1 in the second-half period are used so that the active voltage vector interval for performing the current detection does not become shorter than the predetermined period.

Figure 17:
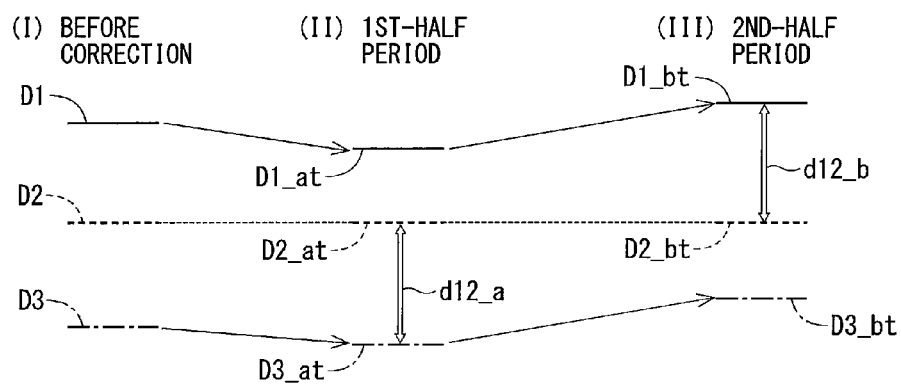
FIG. 17 is an explanatory diagram for explaining a correcting process (1-2) according to the first embodiment of the disclosure.

A process (1-2) in the case where the amplitude of the voltage instruction values Vu*, Vv*, and Vw* is equal to or larger than the predetermined value THa (NO in S102) and both of the odd-numbered voltage duty Do and the even-numbered voltage duty De are less than the current detection duty lower-limit value Dm (YES in S110) will be described with reference to FIG. 17. Correction values in the process (1-2) are values determined in S111.

In the process (1-2), in the first-half period, to detect the phase current of the third duty D3, the third duty D3 is corrected downward so that the difference d12_a between the third duty D3 and the second duty D2 becomes the current detection duty lower-limit value Dm.

In the second-half period, to detect the phase current of the first duty D1, the first duty D1 is corrected upward so that the difference d12_b between the first duty D1 and the second duty D2 becomes the current detection duty lower-limit value Dm.

To cancel out the correction amounts, the first duty D1 is corrected downward in the first-half period, and the third duty D3 is corrected upward in the second-half period.

Figure 18:
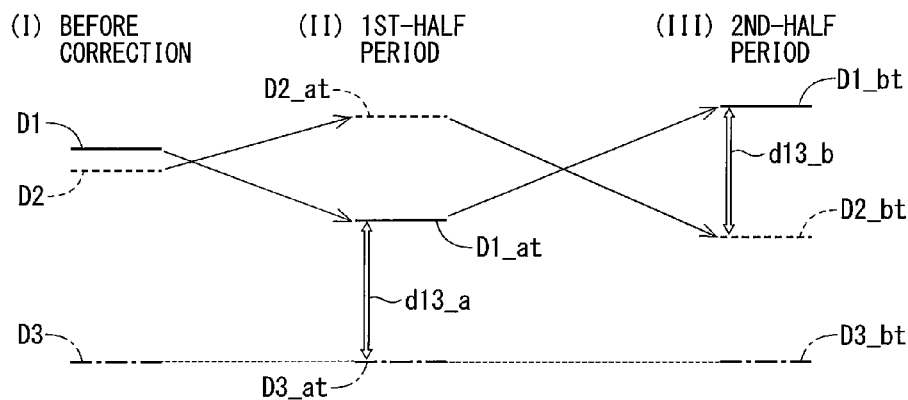
FIG. 18 is an explanatory diagram for explaining a correcting process (1-3) according to the first embodiment of the disclosure.

A process (1-3) in the case where the amplitude of the voltage instruction values Vu*, Vv*, and Vw* is equal to or larger than the predetermined value THa (NO in S102) and the odd-number voltage duty Do is less than the current detection duty lower-limit value Dm (YES in S112) will be described with reference to FIG. 18.

In the process (1-3), in the second-half period, to detect the phase current of the first duty D1, the first duty D1 is corrected upward and the second duty D2 is corrected downward so that the difference d13_b between the first duty D1 and the second duty D2 becomes the current detection duty lower-limit value Dm.

In the first-half period, to cancel out the correction amounts, the first duty D1 is corrected downward and the second duty D2 is corrected upward. In the process (1-3), since the even-numbered voltage duty De as the difference between the second duty D2 and the third duty D3 is equal to or larger than the current detection duty lower-limit value Dm and the duty which can detect the phase current of the third duty D3 is assured, in the first-half period, the phase current of the third duty D3 is detected. That is, in the example of FIG. 18, the difference d13_a of the first and third duties D1 and D3 is equal to or larger than the current detection duty lower-limit value Dm. Depending on the first and second duties D1 and D2 and the correction values C11 and C12, there is a case that the second duty D2 is smaller than the first duty D1. In this case, the difference between the second and third duties D2 and D3 is equal to or larger than the current detection duty lower-limit value Dm, and the phase current of the third duty D3 can be detected.

Figure 19:
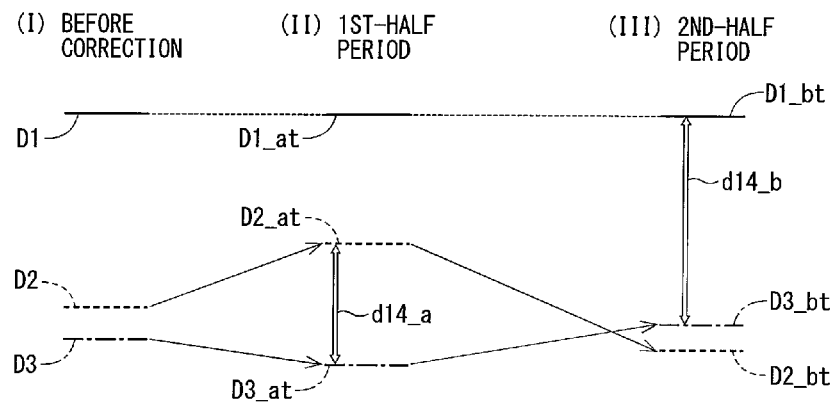
FIG. 19 is an explanatory diagram for explaining a correcting process (1-4) according to the first embodiment of the disclosure.

A process (1-4) in the case where the amplitude of the voltage instruction values Vu*, Vv*, and Vw* is equal to or larger than the predetermined value THa (NO in S102) and the even-number voltage duty De is less than the current detection duty lower-limit value Dm (YES in S114) will be described with reference to FIG. 19.

In the process (1-4), in the first-half period, to detect the phase current of the third duty D3, the second duty D2 is corrected upward and the third duty D3 is corrected downward so that the difference d14_a between the third duty D3 and the second duty D2 becomes the current detection duty lower-limit value Dm.

In the second-half period, to cancel out the correction amounts, the second duty D2 is corrected downward and the third duty D3 is corrected upward. In the process (1-4), since the odd-numbered voltage duty Do as the difference between the first duty D1 and the second duty D2 is equal to or larger than the current detection duty lower-limit value Dm and the duty which can detect the phase current of the first duty D1 is assured, in the second-half period, the phase current of the first duty D1 is detected. That is, in the example of FIG. 19, the difference d14_b of the first and third duties D1 and D3 is equal to or larger than the current detection duty lower-limit value Dm. Depending on the second and third duties D2 and D3 and the correction values C12 and C13, there is a case that the second duty D2 is larger than the third duty D3. In this case, the difference between the first and second duties D1 and D2 is equal to or larger than the current detection duty lower-limit value Dm, and the phase current of the first duty D1 can be detected.

In the case where the amplitude of the voltage instruction values Vu*, Vv*, and Vw* is equal to or larger than the predetermined value THa (NO in S102) and both of the odd-numbered voltage duty Do and the even-number voltage duty De are equal to or larger than the current detection duty lower-limit value Dm (NO in S110, NO in S112, and NO in S114), without correcting the duty, the phase current of the first and third duties D1 and D3 can be detected.

Next, an adjusting process in the current detection timing adjustment computing unit 74 will be described.

In the embodiment, the timing at which the active voltage vector is generated by the current detection timing adjustment computing unit 74 is adjusted so that timings of detecting the current detection value Ic by the AD converter 42 become at predetermined intervals. It is assumed that the timing of detecting the current detection value Ic by the AD converter 42 lies in the active voltage vector interval and is a timing after time for converging ringing elapses.

The AD converter 42 samples the voltage between both ends of the shunt resistor 40 four times at predetermined intervals in one PWM cycle. The sampling timings in the AD converter 42 include timings after the center (lower and upper ends) of the PWM reference signal P by detection shift time t1 (for example, a few μs) and a timing which is intermediate of the timings. The first sampling timing in one PWM cycle is set as t11, the second sampling timing is set as t12, the third sampling timing is set as t13, and the fourth sampling timing is set as t14.

The current detection timing adjustment computing unit 74 adjusts the timing at which an active current vector for performing current detection is generated by changing the neutral voltage as an average value of voltages applied to the coils 11 to 13 so that at least one of t11 and t12 and at least one of t13 and t14 become timings after lapse of the time for converging ringing in the active voltage vector interval. Even when the neutral voltage is changed, the line voltage applied to the coils 11, 12, and 13 does not change.

The adjusting process in the current detection timing adjustment computing unit 74 will be described with reference to the flowchart illustrated in FIG. 20.

In S151, whether the amplitude of the voltage instruction values Vu*, Vv*, and Vw* is less than the predetermined value THa or not is determined. This process is similar to the process of S102 in FIG. 14. In the case where it is determined that the amplitude of the voltage instruction values Vu*, Vv*, and Vw* is less than the predetermined value THa (YES in S151), the routine shifts to S152. In the case where it is determined that the amplitude of the voltage instruction values Vu*, Vv*, and Vw* is equal to or larger than the predetermined value THa (NO in S151), the routine shifts to S153.

In S152, in the first-half period, modulation is performed so that the duty of the smallest phase becomes a duty lower-limit value x11. In the second-half period, modulation is performed so that the duty of the smallest phase becomes a lower-side duty setting value x12. Hereinafter, a modulating method of performing modulation so that the duty of the smallest phase becomes a predetermined value will be called "flatbed modulation". The duty lower-limit value x11 is a value according to dead time and, in the embodiment, is set to 4%. Accordingly, the voltage vector interval V7 as the zero voltage vector becomes the minimum time Tm determined from the dead time. The lower-side duty setting value x12 is a value larger than the duty lower-limit value x11 and is properly set so that the active voltage vector interval for performing current detection becomes a desired timing. In the embodiment, for example, the lower-side duty setting value x12 is set to 30%. In this process, it is sufficient that the current detection timing becomes a desired timing in the active voltage vector interval. Consequently, in the second-half period, in place of the flatbed modulation by which the duty of the smallest phase becomes the lower-side duty setting value x12, for example, modulation may be performed so that the duty in the middle becomes the intermediate duty setting value x13 (for example, 46%).

In S152, the amplitude of the voltage instruction values Vu*, Vv*, and Vw* is less than the predetermined value THa and the flatbed modulation is performed through one PWM cycle, so that the voltage vector interval V0 of the minimum time Tm or longer is assured at the upper end of the PWM reference signal P.

For example, in the first-half period, when the first-half duty temporary values Du_at, Dv_at, and Dw_at satisfy the relation of Du_at >Dv_at >Dw_at, the first-half duty instruction values Du_a, Dv_a, and Dw_a are expressed by equations (31), (32), and (33), respectively.

$$Du\_a[\%]=Du\_at-Dw\_at+x11 \quad (31)$$

$$Dv\_a[\%]=Dv\_at-Dw\_at+x11 \quad (32)$$

$$Dw\_a[\%]=Dw\_at-Dw\_at+x11 \quad (33)$$

In the second-half period, when the second-half duty temporary values Du_bt, Dv_bt, and Dw_bt satisfy the relation of Du_bt>Dv_bt>Dw_bt, the second-half duty instruction values Du_b, Dv_b, and Dw_b are expressed by equations (34-1), (35-1), and (36-1), respectively.

$$Du\_b[\%]=Du\_bt-Dw\_bt+x12 \quad (34\text{-}1)$$

$$Dv\_b[\%]=Dv\_bt-Dw\_bt+x12 \quad (35\text{-}1)$$

$$Dw\_b[\%]=Dw\_bt-Dw\_bt+x12 \quad (36\text{-}1)$$

For example, in the second-half period, the second-half duty instruction values Du_b, Dv_b, and Dw_b in the case where the second-half duty temporary values Du_bt, Dv_bt, and Dw_bt satisfy the relation of Du_bt>Dv_bt>Dw_bt and modulation is performed so that the duty in the middle becomes the intermediate duty setting value x13 are expressed by equations (34-2), (35-2), and (36-2), respectively.

$$Du\_b[\%]=Du\_bt-Dv\_bt+x13 \quad (34\text{-}2)$$

$$Dv\_b[\%]=Dv\_bt-Dv\_bt+x13 \quad (35\text{-}2)$$

$$Dw\_b[\%]=Dw\_bt-Dv\_bt+x13 \quad (36\text{-}2)$$

In S153 to which the routine shifts in the case where it is determined that the amplitude of the voltage instruction values Vu*, Vv*, and Vw* is equal to or larger than the predetermined value THa (NO in S151), in the first-half period, the flatbed modulation is performed so that the duty of the smallest phase becomes the duty lower-limit value x11. In the second-half period, modulation is performed so that the duty of the largest phase becomes a duty upper-limit value x21. Hereinafter, a modulating method of performing modulation so that the duty of the largest phase becomes a predetermined value will be called "flattop modulation". The duty upper-limit value x21 is a value according to dead time and, in the embodiment, is set to 96%. Accordingly, the voltage vector interval V7 in the first-half period and the voltage vector interval V0 in the second-half period become the minimum time Tm. The voltage vector interval V0 in the first-half period and the voltage vector interval V7 in the second-half period become the minimum time Tm or longer.

For example, in the second-half period, when the second-half duty temporary values Du_bt, Dv_bt, and Dw_bt satisfy the relation of Du_bt>Dv_bt>Dw_bt, the second-half duty instruction values Du_b, Dv_b, and Dw_b are expressed by equations (37), (38), and (39), respectively. The first-half duty instruction values Du_a, Dv_a, and Dw_a are expressed by the above-described equations (31), (32), and (33), respectively, in S152.

$$Du\_b[\%]=Du\_bt-Du\_bt+x21 \quad (37)$$

$$Dv\_b[\%]=Dv\_bt-Du\_bt+x21 \quad (38)$$

$$Dw\_b[\%]=Dw\_bt-Du\_bt+x21 \quad (39)$$

The first-half duty instruction values Du_a, Dv_a, and Dw_a and the second-half duty instruction values Du_b, Dv_b, and Dw_b construct the duty instruction values D_U, D_V, and D_W.

Figure 21A:
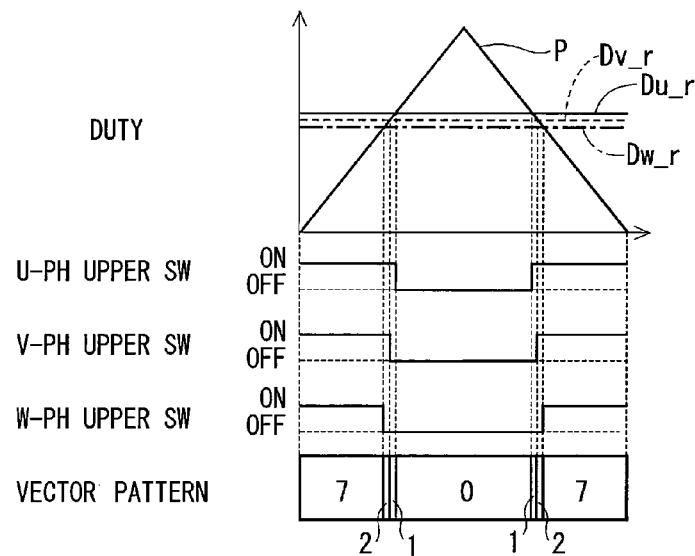
FIGS. 21A to 21C are explanatory diagrams for explaining a correcting process and an adjusting process in the case where the amplitude of a voltage instruction value is less than a predetermined value in the first embodiment of the disclosure.
Figure 21B:
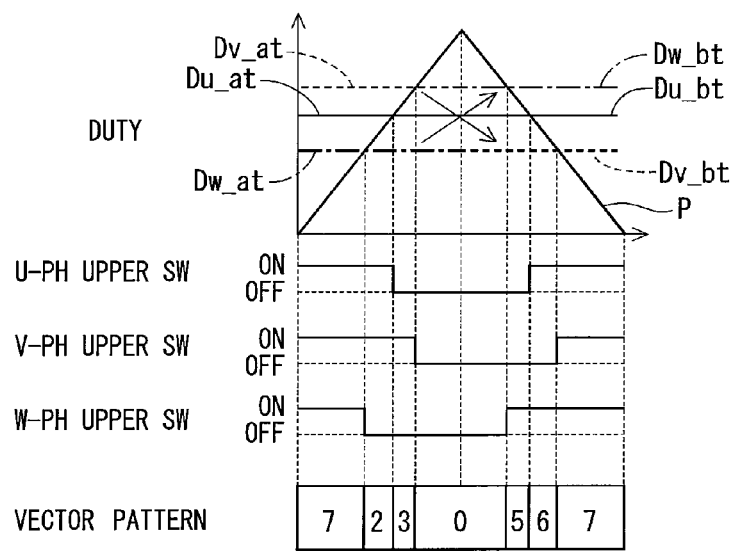
Figure 21C:
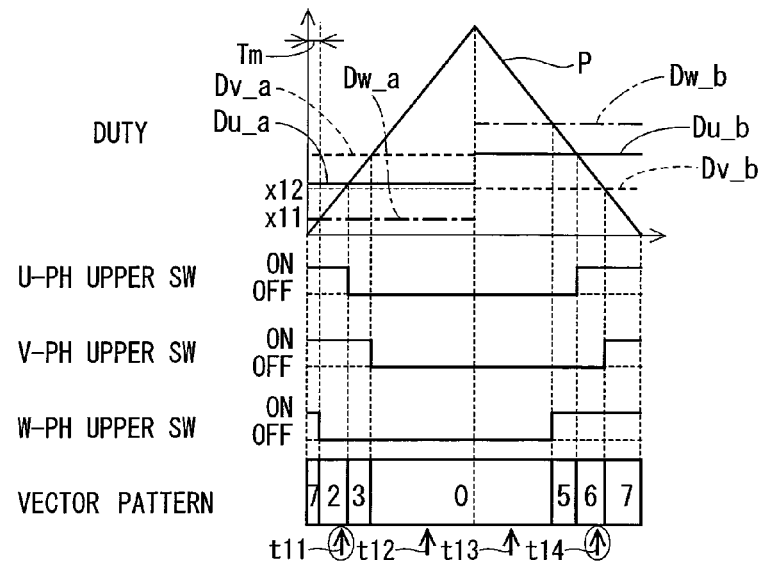
Figure 22A:
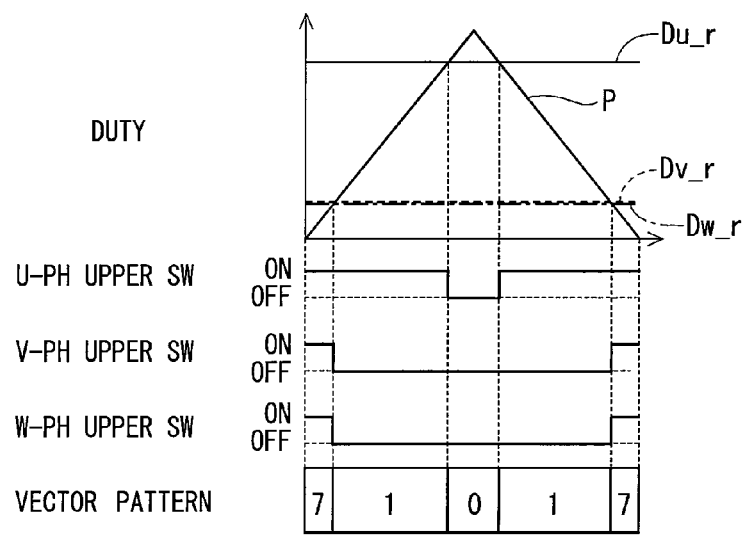
FIGS. 22A to 22C are explanatory diagrams for explaining a correcting process and an adjusting process in the case where the amplitude of the voltage instruction value is equal to or larger than the predetermined value in the first embodiment of the disclosure.
Figure 22B:
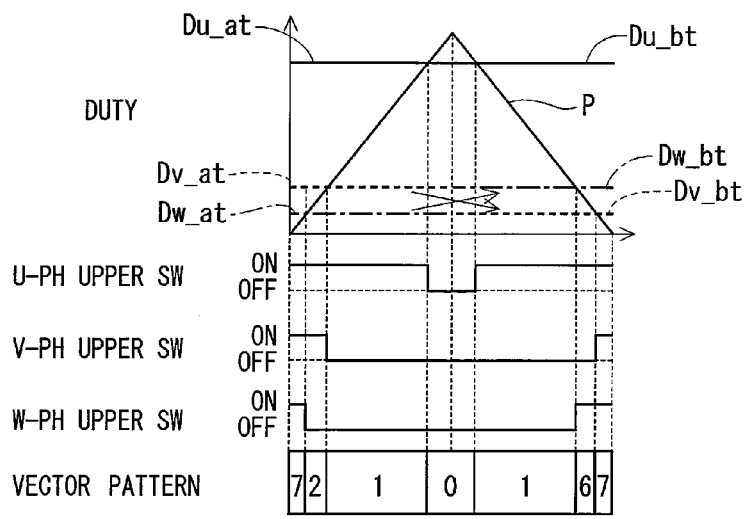
Figure 22C:
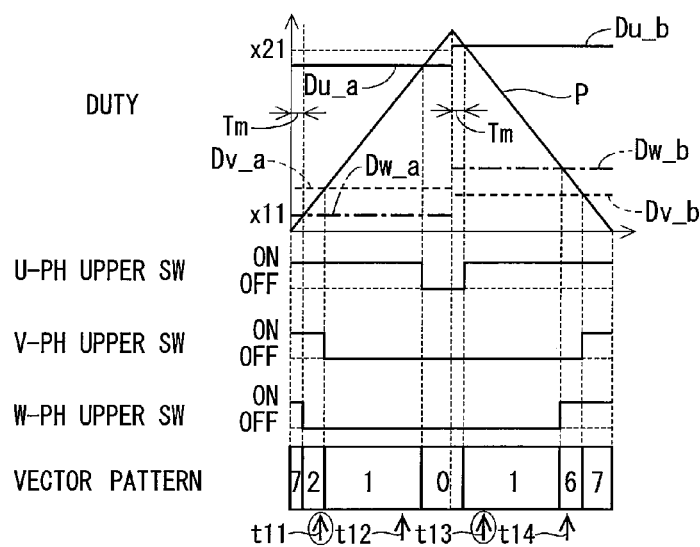

A concrete example of the correcting process and the adjusting process of the embodiment will be described with reference to FIGS. 21A to 21C and FIGS. 22A to 22C. FIGS. 21A to 21C illustrate an example in the case where the amplitude of the voltage instruction values Vu*, Vv*, and Vw* is less than the predetermined value THa. FIGS. 22A to 22C illustrate an example in the case where the amplitude of the voltage instruction values Vu*, Vv*, and Vw* is equal to or larger than the predetermined value THa. FIGS. 21A to 21C and FIGS. 22A to 22C will be described on assumption that Vu*>Vv*>Vw*. In the following drawings, the on/off operation of the upper SW 21 to 23 will be mainly described. To simplify the description, it is assumed that the PWM reference signal is the PWM reference signal P prior to shift illustrated in FIG. 5 and the range of the duty is 0% to 100%.

As illustrated in FIG. 21A, in the case where the amplitude of the voltage instruction values Vu*, Vv*, and Vw* is less than the predetermined value THa, when the on/off state of the SW 21 to 26 is controlled on the basis of the duty conversion values Du_r, Dv_r, and Dw_r prior to correction, the active voltage vector interval is short, and the currents Iu, Iv, and Iw of the respective phases cannot be detected.

In the embodiment, as illustrated in FIG. 21B, to assure the active voltage vector interval in which current can be detected, the duty conversion values Du_r, Dv_r, and Dw_r are corrected. Specifically, in the first-half period, the duty of the W phase in which the duty conversion value is the smallest is corrected downward so as to be the first-half duty temporary value Dw_at of the W phase so that the period becomes a period in which the voltage vector V2 for current detection can detect current. At this time, the duty of the V phase is corrected upward so that the voltage vector interval V2 for performing current detection does not become shorter and the first-half duty temporary value Dv_at of the V phase does not become larger than the first-half duty temporary value Du_at of the U phase.

In the second-half period, the duty of the V phase in which the duty conversion value is the middle is corrected downward to become the second-half duty temporary value Dv_at so that the period becomes equal to or longer than a period in which current can be detected by the voltage vector V6 for current detection. At this time, the duty conversion value Dw_r is corrected upward so as not shorten the voltage vector interval V6 for performing current detection and so that the second-half duty temporary value Dw_bt of the W phase does not become larger than the second-half duty temporary value Du_bt of the U phase.

In the case where the amplitude of the voltage instruction values Vu*, Vv*, and Vw* is less than the predetermined value THa, the duty of the U phase as the phase in which the duty conversion value is the largest is not corrected. Consequently, the first-half duty conversion value Du_at and the second-half duty conversion value Du_bt of the U phase are equal to the duty conversion value Du_r.

By the above operation, the timing of switching the V upper SW 22 from the on state to the off state and the timing of switching it from the off state to the on state are shifted backward. The timing of switching the W upper SW 23 from the on state to the off state and the timing of switching it from the off state to the on state are shifted forward. At this time, the period in which the V upper SW 22 and the W upper SW 23 are on does not change before and after the correction.

The duties of the V phase and the W phase are corrected so that their magnitude are equal and the correction directions are opposite between the first-half period and the second-half period. Since a change in the application voltage by the correction in the first-half period and that in the second-half period cancel out each other, in one PWM cycle, there is no change in the application voltage before and after correction.

As illustrated in FIG. 21C, the adjusting process is performed so that the currents Iu, Iv, and Iw of the respective phases can be computed on the basis of values sampled and held at the sampling timings t11, t12, t13, and t14 at predetermined intervals by the AD converter 42 regardless of the amplitudes of the voltage instruction values Vu*, Vv*, and Vw*. Specifically, in the first-half period, the flatbed modulation is performed so that the first-half duty instruction value Dw_a of the W phase as the smallest duty becomes the duty lower-limit value x11. In the second-half period, the flatbed modulation is performed so that the second-half duty instruction value Dv_b of the V phase as the duty of the smallest phase becomes the lower-side duty setting value x12. As a result, the voltage vector interval V7 in the first-half period becomes the minimum time Tm. Each of the voltage vector interval V0 in the first-half period and the voltage vector interval V0 and the voltage vector interval V7 in the second-half period is the minimum time Tm or longer.

As described above, the sampling timings in one PWM cycle are t11 to t14, the current detection value sampled at t11 is Ic11, the current detection value sampled at t12 is Ic12, the current detection value sampled at t13 is Ic13, and the current detection value sampled at t14 is Ic14.

In FIG. 21C, the current detection value Ic11 detected at the first sampling timing t11 is a value detected in the voltage vector interval V2, so that the W-phase current Iw is computed on the basis of the current detection value Ic11 in the phase current computing unit 61. Since the current detection value Ic14 detected at the fourth sampling timing t14 is a value detected in the voltage vector interval V6, the V-phase current Iv is computed on the basis of the current detection value Ic14 in the phase current computing unit 61. The U-phase current Iu is computed on the basis of the V-phase current Iv and the W-phase current Iw.

The current detection value Ic12 detected at the second sampling timing t12 and the current detection value Ic13 detected at the third sampling timing t13 are used for offset correction.

In FIG. 21C and the other drawings, the arrows indicating the sampling timings used for computation of the currents Iu, Iv, and Iw of the respective phases are surrounded by circles.

FIGS. 22A to 22C illustrate an example of a process (1-4) in which the amplitude of the voltage instruction values Vu*, Vv*, and Vw* is equal to or larger than the predetermined value THa, the U-phase duty conversion value Du_r is the largest, the V-phase duty conversion value Dv_r and the W-phase duty conversion value Dw_r are almost equal, and the even-numbered voltage duty De is equal to or less than the current detection duty lower-limit value Dm.

As illustrated in FIG. 22A, in the case of controlling the on/off state of the SW 21 to 26 on the basis of the duty conversion values Du_r, Dv_r, and Dw_r prior to correction, although the U-phase current Iu can be detected in the voltage vector interval V1, the V-phase current Iv and the W-phase current Iw cannot be detected.

In the embodiment, therefore, as illustrated in FIG. 22B, to assure the active voltage vector interval in which current can be detected, the duty conversion values Du_r, Dv_r, and Dw_r are corrected. Specifically, in the first-half period, the duty of the V phase in which the duty conversion value is in the middle is corrected upward to become the first-half duty temporary value Dv_at of the V phase so that the period becomes a period in which the voltage vector V2 for current detection can detect current. The duty of the W phase as a phase of the smallest duty conversion value is corrected downward to the first-half duty temporary value Dw_at of the W phase.

In the second-half period, to cancel out the correction amounts of the second-half period, the duty of the V phase is corrected downward to the second-half duty temporary value Dv_bt of the V phase. The duty of the W phase is corrected upward to the second-half duty temporary value Dw_bt of the W phase.

In the example, the duty of the U phase of the largest duty conversion value is not corrected. Consequently, the first-half duty conversion value Du_at and the second-half duty conversion value Du_bt of the U phase are equal to the duty conversion value Du_r.

By the above operation, the timing of switching the V upper SW 22 from the on state to the off state and the timing of switching it from the off state to the on state are shifted backward. The timing of switching the W upper SW 23 from the on state to the off state and the timing of switching it from the off state to the on state are shifted forward. At this time, the period in which the V upper SW 22 and the W upper SW 23 are on does not change before and after the correction.

The duties of the V phase and the W phase are corrected so that their magnitude are equal and the correction directions are opposite between the first-half period and the second-half period. Since a change in the application voltage by the correction in the first-half period and that in the second-half period cancel out each other, in one PWM cycle, there is no change in the application voltage before and after correction.

As illustrated in FIG. 22C, the adjusting process is performed so that the currents Iu, Iv, and Iw of the respective phases can be computed on the basis of values sampled and held at the sampling timings t11, t12, t13, and t14 at predetermined intervals by the AD converter 42 regardless of the amplitudes of the voltage instruction values Vu*, Vv*, and Vw*. Specifically, in the first-half period, the flatbed modulation is performed so that the first-half duty instruction value Dw_a of the W phase as the smallest duty becomes the duty lower-limit value x11. In the second-half period, the flattop modulation is performed so that the second-half duty instruction value Du_b of the U phase as the duty of the largest phase becomes the duty upper-limit value x21. As a result, the voltage vector interval V7 in the first-half period and the voltage vector interval V0 in the second-half period become the minimum time Tm. The voltage vector interval V0 in the first-half period and the voltage vector interval V7 in the second-half period become the minimum time Tm or longer.

In FIG. 22C, the current detection value Ic11 detected at the first sampling timing t11 is a value detected in the voltage vector interval V2, so that the W-phase current Iw is computed on the basis of the current detection value Ic11 in the phase current computing unit 61. Since the current detection value Ic13 detected at the third sampling timing t13 is a value detected in the voltage vector interval V1, the U-phase current Iu is computed on the basis of the current detection value Ic13 in the phase current computing unit 61. The V-phase current Iv is computed on the basis of the U-phase current Iu and the W-phase current Iw.

The current detection value Ic12 detected at the second sampling timing t12 and the current detection value Ic14 detected at the fourth sampling timing t14 are used for offset correction.

The relation between the current detection values used for computation of the currents Iu, Iv, and Iw of respective phases and the amplitudes of the voltage instruction values Vu*, Vv*, and Vw* will be described.

In the embodiment, regardless of the amplitudes of the voltage instruction values Vu*, Vv*, and Vw*, on the basis of the current detection values detected without changing the sampling timings t11, t12, t13, and t14 by the AD converter 42, the currents Iu, Iv, and Iw of the respective phases can be computed.

As described with reference to FIG. 21C, in the case where the amplitude of the voltage instruction values Vu*, Vv*, and Vw* is less than the predetermined value THa, the phase current computing unit 61 computes the currents Iu, Iv, and Iw of the respective phases on the basis of the current detection value Ic11 detected at the first sampling timing t11 and the current detection value Ic14 detected at the fourth sampling timing t14.

As described with reference to FIG. 22C, in the case where the amplitude of the voltage instruction values Vu*, Vv*, and Vw* is equal to or larger than the predetermined value THa, the phase current computing unit 61 computes the currents Iu, Iv, and Iw of the respective phases on the basis of the current detection value Ic11 detected at the first sampling timing t11 and the current detection value Ic13 detected at the third sampling timing t13.

That is, in the embodiment, the values used for computation of the currents Iu, Iv, and Iw of the respective phases in the current detection values Ic11 to Ic14 detected at the sampling timings of the predetermined intervals are switched according to the amplitudes of the voltage instruction values Vu*, Vv*, and Vw*.

In the embodiment, a predetermined range including the upper limit or the lower limit of the duty by which the length of the dead time changes is called an output avoidance duty. Concretely, duties less than the duty lower-limit value x11 (for example, 4%) and duties larger than the duty upper-limit value x21 (for example, 96%) are set as output avoidance duties. Consequently, in periods corresponding to the output avoidance duties including the upper and lower ends of the PWM reference signal P, the adjusting process is performed so as to realize a zero voltage vector in which all of the upper SW 21 to 23 are on or all of the lower SW 24 to 26 are on. In other words, the zero voltage vector interval is provided twice in each of the first-half period and the second-half period. Therefore, the output avoidance duty by which the length of the dead time changes is not output, so that distortion of current accompanying a change in the length of the dead time can be prevented, and torque ripple, sound, and vibration can be reduced.

As described specifically above, the power conversion apparatus 1 of the embodiment has the inverter unit 20, the shunt resistor 40, and the control unit 60.

The inverter unit 20 includes the upper SW 21 to 23 corresponding to the phases of the winding 15 of the motor 10 and disposed on the high potential side and the lower SW 24 to 26 disposed on the low potential side. The shunt resistor 40 is connected between the inverter unit 20 and the negative side of the battery 80.

The control unit 60 controls the on/off operations of the upper SW 21 to 23 and the lower SW 24 to 26 on the basis of the PWM reference signal P and the duty instruction values Du_a, Dv_a, Dw_a, Du_b, Dv_b, and Dw_b.

The control unit 60 has the phase current computing unit 61, the controller 63, and the two-phase to three-phase converting unit 64.

The phase current computing unit 61 computes the currents Iu, Iv, and Iw of the respective phases passed to the phases of the winding 15 on the basis of the current detection value Ic detected by the shunt resistor 40.

The controller 63 computes the d-axis voltage instruction value Vd* and the q-axis voltage instruction value Vq* on the basis of the currents Iu, Iv, and Iw of the respective phases. The two-phase to three-phase converting unit 64 computes the voltage instruction value Vu*, Vv*, and Vw* according to the voltages applied to the U-phase coil 11, the V-phase coil 12, and the W-phase coil 13 on the basis of the d-axis voltage instruction value Vd* and the q-axis voltage instruction value Vq*.

The control unit 60 computes the first-half duty instruction values Du_a, Dv_a, and Dw_a and second-half duty instruction values Du_b, Dv_b, and Dw_b so that, in the first-half period and the second-half period in one or more predetermined times of cycles of the PWM reference signal P, the active voltage vector interval for detecting the current detection value Ic becomes equal to or longer than a predetermined period, the voltage vector interval V0 in which the lower SW 24 to 26 of all of the phases are on and the voltage vector interval V7 in which the upper SW 21 to 23 of all of the phases are on become equal to or longer than the minimum time Tm determined from the dead time in which the upper SW 21 to 23 and the lower SW 24 to 26 provided in correspondence with the upper SW 21 to 23 are off, and the voltage vector intervals V0 and V7 are included in at least one of the first-half period and the second-half period.

In the embodiment, in the first-half and second-half periods in one cycle of the PWM reference signal, the active voltage vector interval for detecting the current detection value Ic becomes predetermined time or longer.

In the embodiment, the voltage vector intervals V0 and V7 as zero voltage vectors are adjusted to become equal to or longer than the minimum time determined from the dead time period. That is, in the embodiment, the PWM control is performed without using a duty in the range where instruction voltage and duty do not match due to the influence of dead time.

The duty is adjusted so that both of the voltage vector intervals V0 and V7 which are equal to or longer than the minimum time are included in at least one of the first-half period and the second-half period. Consequently, even when the duty is changed in the first-half period and the second-half period of one PWM cycle, a pulse is not reduced in association with the switching of the duty.

In the case where the duty of the largest duty is less than the upper limit (for example, 102%) of the duty at the upper end of the PWM reference signal P and the duty of the smallest phase is larger than the lower limit (for example, −2%) of the duty at the lower end of the PWM reference signal P, both of the voltage vector intervals V0 and V7 are included in the first-half period and the second-half period. In particular, in the embodiment, the duty lower-limit value x11 and the duty upper-limit value x21 are set so that the voltage vector intervals V0 and V7 become equal to or longer than the minimum time.

By the above operation, mismatch between the voltage instruction and the duty due to the influence of dead time does not occur and the distortion of the current waveform can be reduced, so that a torque ripple, sound, and vibration can be reduced.

Since the duty conversion values Du_r, Dv_r, and Dw_r are corrected so that the active voltage vector interval for performing current detection becomes the predetermined period or longer, the current detection value Ic can be properly detected.

The control unit 60 has the duty converting unit 72, the current detection period assurance computing unit 73, and the current detection timing adjustment computing unit 74.

The duty converting unit 72 converts the voltage instruction values Vu*, Vv*, and Vw* to the duty conversion values Du_r, Dv_r, and Dw_r.

The current detection period assurance computing unit 73 computes the first-half duty temporary values Du_at, Dv_at, and Dw_at and second-half duty temporary values Du_bt, Dv_bt, and Dw_bt on the basis of the duty conversion values Du_r, Dv_r, and Dw_r so that the active voltage vector interval for detecting the current detection value Ic becomes equal to or longer than the predetermined period.

The current detection timing adjustment computing unit 74 adjusts the first-half duty temporary values Du_at, Dv_at, and Dw_at and second-half duty temporary values Du_bt, Dv_bt, and Dw_bt so that the voltage vector intervals V7 and V0 equal to or longer than the minimum time Tm are included in at least one of the first-half period and the second-half period, and computes the first-half duty instruction values Du_a, Dv_a, and Dw_a and the second-half duty instruction values Du_b, Dv_b, and Dw_b.

In such a manner, the first-half duty instruction values Du_a, Dv_a, and Dw_a and the second-half duty instruction values Du_b, Dv_b, and Dw_b can be properly computed.

The power converting apparatus 1 further includes the AD converter 42 for sampling and holding the current detection values Ic11, Ic12, Ic13, and Ic14 at the sampling timings t11, t12, t13, and t14 as predetermined intervals. In the embodiment, the sampling is performed four times at equal intervals, in one PWM cycle.

The current detection timing adjustment computing unit 74 of the control unit 60 adjusts the first-half duty instruction values Du_a, Dv_a, and Dw_a and the second-half duty instruction values Du_b, Dv_b, and Dw_b so that the current detection value can be detected at the sampling timings t11, t12, t13, and t14.

Consequently, the current detection value can be sampled at predetermined intervals in the AD converter 42, so that the configuration can be simplified.

In the embodiment, the values used for computation of the phase currents Iu, Iv, and Iw in the current detection values sampled by the AD converter 42 are switched according to the amplitudes of the voltage instruction values Vu*, Vv*, and Vw*. As a result, the currents Iu, Iv, and Iw of the respective phases can be computed on the basis of the current detection values detected at the proper timings in accordance with the amplitudes of the voltage instruction values Vu*, Vv*, and Vw*.

The electric power steering apparatus 100 has the power converting apparatus 1 and the motor 10 for outputting the auxiliary torque which supports steering of the driver. In the power converting apparatus 1, no mismatch occurs between the voltage instruction and the duty due to the influence of the dead time, and distortion in the current waveform can be reduced, so that the torque ripple, sound, and vibration can be reduced.

In the embodiment, the phase current computing unit 61 corresponds to "phase current computing device", the controller 63 and the two-phase to three-phase converting unit 64 corresponds to "voltage instruction value computing device", the duty converting unit 72 corresponds to "duty converting device", the current detection period assurance computing unit 73 corresponds to "correcting device", and the current detection timing adjustment computing unit 74 corresponds to "adjusting device".

Second Embodiment

A power conversion apparatus according to a second embodiment of the present disclosure will be described with reference to FIGS. 23 to 31.

The second embodiment is different from the first embodiment with respect to the correcting process and the adjusting process. The different point will be mainly described and description of the configuration and the like will not be repeated.

A correcting process in the current detection period assurance computing unit 73 will be described with reference to FIGS. 23 and 24.

Processes in S201 and S202 are similar to those in S101 and S102 in FIG. 14.

Figure 24:
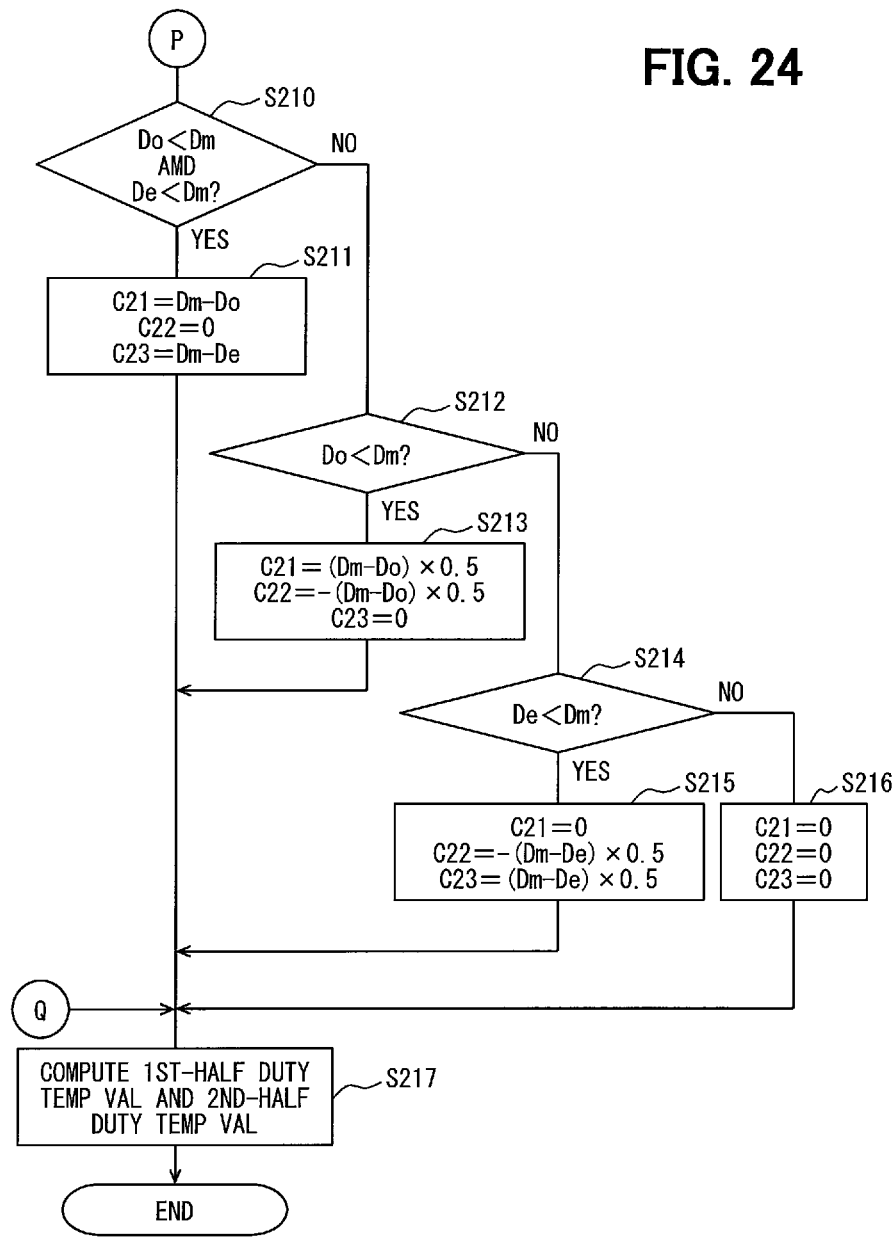
FIG. 24 is a flowchart for explaining the correcting process according to the second embodiment of the disclosure.

In the case where it is determined that the amplitude of the voltage instruction values Vu*, Vv*, and Vw* is equal to or larger than the predetermined value THa (NO in S202), the routine shifts to S210 in FIG. 24. In the case where it is determined that the amplitude of the voltage instruction values Vu*, Vv*, and Vw* is less than the predetermined value THa (YES in S202), the routine shifts to S203.

In S203, the third duty correction value C23 as the correction value for the third duty D3 is set to zero. That is, the third duty correction value C23 is expressed by equation (41).

$$C23=0 \tag{41}$$

In S204, whether or not the even-numbered voltage duty De is less than a value obtained by subtracting the even-numbered voltage duty De from the current detection duty lower-limit value Dm is determined. In the case where it is determined that the even-numbered voltage duty De is less than the value obtained by subtracting the even-numbered voltage duty De from the current detection duty lower-limit value Dm (YES in S204), the routine advances to S205. In the case where it is determined that the even-numbered voltage duty De is equal to or larger than the value obtained by subtracting the even-numbered voltage duty De from the current detection duty lower-limit value Dm (NO in S204), the routine shifts to S206.

In S205, a second duty correction value C22 as a correction value for the second duty D2 is expressed by the equation (42-1).

$$C22=-(Dm-De) \quad (42\text{-}1)$$

In S206, the second duty correction value C22 is set to the even-numbered voltage duty De (equation (42-2)).

$$C22=-De \quad (42\text{-}2)$$

In the embodiment, the even-numbered voltage duty De and the value obtained by subtracting the even-numbered voltage duty De from the current detection duty lower-limit value Dm are compared, and a value obtained by multiplying the larger value is set as the second duty correction value C22.

The process in S207 following S205 or S206 is similar to the process in S107 in FIG. 14. In the case where it is determined that the active voltage duty Da is less than the value obtained by subtracting the active voltage duty Da from the current detection duty lower-limit value Dm (YES in S207), the routine shifts to S208. In the case where it is determined that the active voltage duty Da is equal to or larger than the value obtained by subtracting the active voltage duty Da from the current detection duty lower-limit value Dm (NO in S207), the routine shifts to S209.

In S208, a first duty correction value C21 as a correction value for the first duty D1 is expressed by the equation (43-1).

$$C21=Dm-Da \quad (43\text{-}1)$$

In S209, the first duty correction value C21 is set to the active voltage duty Da (equation (43-2).

$$C21=Da \quad (43\text{-}2)$$

In the embodiment, the active voltage duty Da and the value obtained by subtracting the active voltage duty Da from the current detection duty lower-limit value Dm are compared, and a larger value is set as the first duty correction value C21.

After the process in S208 or S209, the routine shifts to S217 in FIG. 24.

The process in S210 in FIG. 24 to which the routine shifts in the case where it is determined that the amplitude of the voltage instruction values Vu*, Vv*, and Vw* is equal to or larger than the predetermined value THa (NO in S202) is similar to that in S110 in FIG. 15. In the case where at least one of the odd-numbered voltage duty Do and the even-numbered voltage duty De is equal to or larger than the current detection duty lower-limit value Dm (NO in S210), the routine shifts to S212. In the case where it is determined that both of the odd-numbered voltage duty Do and the even-numbered voltage duty De are less than the current detection duty lower-limit value Dm (YES in S210), the routine shifts to S211.

In S211, the first duty correction value C21 is expressed by the equation (44), the second duty correction value C22 is expressed by the equation (45), and the third duty correction value C23 is expressed by the equation (46).

$$C21=Dm-Do \quad (44)$$

$$C22=0 \quad (45)$$

$$C23=Dm-De \quad (46)$$

The process of S212 to which the routine shifts in the case where it is determined that the odd-numbered voltage duty Do or the even-numbered voltage duty De is equal to or larger than the current detection duty lower-limit value Dm (NO in S210) is similar to that of S112 in FIG. 15. In the case where it is determined that the odd-numbered voltage duty Do is equal to or larger than the current detection duty lower-limit value Dm (NO in S212), the routine shifts to S214. In the case where it is determined that the odd-numbered voltage duty Do is less than the current detection duty lower-limit value Dm (YES in S212), the routine shifts to S213.

In S213, the first duty correction value C21 is expressed by the equation (47), the second duty correction value C22 is expressed by the equation (48), and the third duty correction value C23 is expressed by the equation (49).

$$C21=(Dm-Do)\times0.5 \quad (47)$$

$$C22=-(Dm-Do)\times0.5 \quad (48)$$

$$C23=0 \quad (49)$$

The process of S214 to which the routine shifts in the case where it is determined that the odd-numbered voltage duty Do is equal to or larger than the current detection duty lower-limit value Dm (NO in S212) is similar to that of S114 in FIG. 15. In the case where it is determined that the even-numbered voltage duty De is equal to or larger than the current detection duty lower-limit value Dm (NO in S214), the routine shifts to S216. In the case where it is determined that the even-numbered voltage duty De is less than the current detection duty lower-limit value Dm (YES in S214), the routine shifts to S215.

In S215, the first duty correction value C21 is expressed by the equation (50), the second duty correction value C22 is expressed by the equation (51), and the third duty correction value C23 is expressed by the equation (52).

$$C21=0 \quad (50)$$

$$C22=-(Dm-De)\times0.5 \quad (51)$$

$$C23=(Dm-De)\times0.5 \quad (52)$$

The process of S216 to which the routine shifts in the case where both the odd-numbered voltage duty Do and the even-numbered voltage duty De are equal to or larger than the current detection duty lower-limit value Dm (YES in S112 and YES in S114) is similar to that of S116 in FIG. 15. The first duty correction value C21, the second duty correction value C22, and the third duty correction value C23 are set to zero (equation (53)).

$$C21=C22=C23=0 \quad (53)$$

Figure 23:
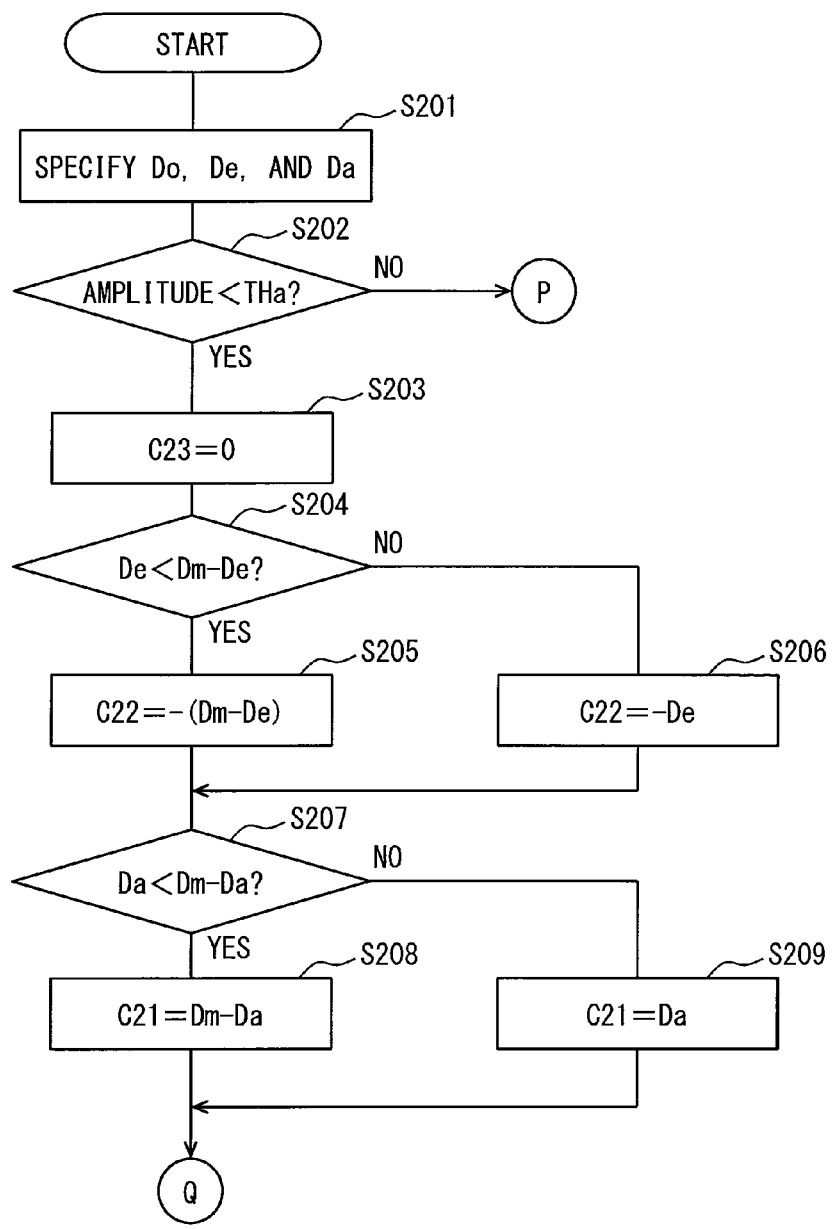
FIG. 23 is a flowchart for explaining a correcting process according to a second embodiment of the present disclosure.

The process of S217 following S208 or S209 in FIG. 23 and S211, S213, S215, or S216 in FIG. 24 is similar to that of S117 in FIG. 15. On the basis of the first duty correction value C21, the second duty correction value C22, and the third duty correction value C23, the first, second, and third duties D1, D2, and D3 are corrected to compute the first-half duty temporary values D1_at, D2_at, and D3_at (equations (54), (55), and (56)) and second-half duty temporary values D1_bt, D2_bt, and D3_bt (equations (57), (58), and (59)).

$$D1\_at=D1+C21 \quad (54)$$

$$D2\_at=D2+C22 \quad (55)$$

$$D3\_at = D3 + C23 \quad (56)$$

$$D1\_bt = D1 - C21 \quad (57)$$

$$D2\_bt = D2 - C22 \quad (58)$$

$$D3\_bt = D3 - C23 \quad (59)$$

The details of the correcting process will be described with reference to FIGS. 25 to 28. In FIGS. 25 to 29, like in FIG. 16 and the like, the first duty D1 is expressed by the solid line, the second duty D2 is expressed by the broken line, and the third duty D3 is indicated by an alternate long and short dash line.

Figure 25:
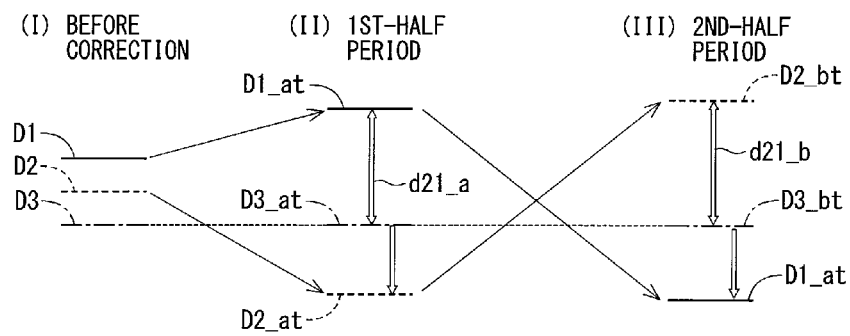
FIG. 25 is an explanatory diagram for explaining a correcting process (2-1) according to the second embodiment of the disclosure.

A process (2-1) in the case where the amplitude of the voltage instruction values Vu*, Vv*, and Vw* is less than the predetermined value THa (YES in S202) will be described with reference to FIG. 25. Correction values in the process (2-1) are values determined in S203 and S205, S206 and S208, or S209.

In the process (2-1), in the first-half period, to detect the phase current of the first duty D1, the first duty D1 is corrected upward so that the difference d21_a between the first duty D1 and the third duty D3 becomes equal to or larger than the current detection duty lower-limit value Dm, and the second duty D2 is corrected downward so that the second duty D2 becomes smaller than the first duty D1.

In the second-half period, to detect the phase current of the second duty D2, the second duty D2 is corrected upward so that the difference d21_b between the second duty D2 and the third duty D3 becomes equal to or larger than the current detection duty lower-limit value Dm, and the first duty D1 is corrected downward so that the first duty D1 becomes smaller than the third duty D3.

In the process (2-1), the correction values C21 and C22 by which the second duty D2 becomes smaller than the third duty D3 in the first-half period and the first duty D1 becomes smaller than the third duty D3 in the second-half period are used so that the active voltage vector interval for performing the current detection does not become shorter than the predetermined period.

Figure 26:
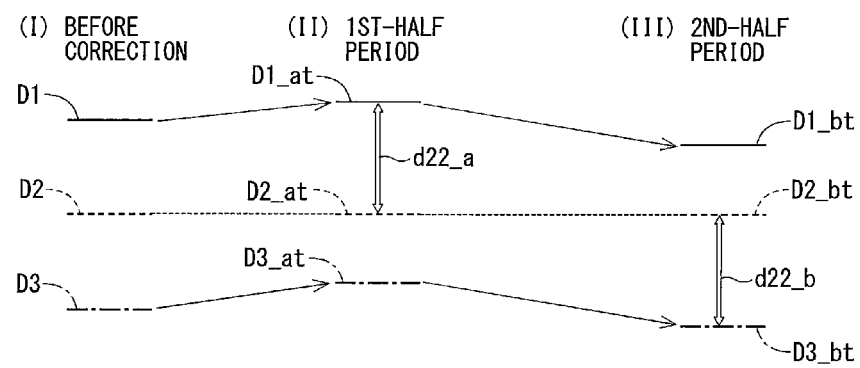
FIG. 26 is an explanatory diagram for explaining a correcting process (2-2) according to the second embodiment of the disclosure.

A process (2-2) in the case where the amplitude of the voltage instruction values Vu*, Vv*, and Vw* is equal to or larger than the predetermined value THa (NO in S202) and both of the odd-numbered voltage duty Do and the even-numbered voltage duty De are less than the current detection duty lower-limit value Dm (YES in S210) will be described with reference to FIG. 26. Correction values in the process (2-2) are values determined in S211.

In the process (2-2), in the first-half period, to detect the phase current of the first duty D1, the first duty D1 is corrected upward so that the difference d22_a between the first duty D1 and the second duty D2 becomes the current detection duty lower-limit value Dm.

In the second-half period, to detect the phase current of the third duty D3, the third duty D3 is corrected downward so that the difference d22_b between the third duty D3 and the second duty D2 becomes the current detection duty lower-limit value Dm.

To cancel out the correction amounts, the third duty D3 is corrected upward in the first-half period, and the first duty D1 is corrected downward in the second-half period.

Figure 27:
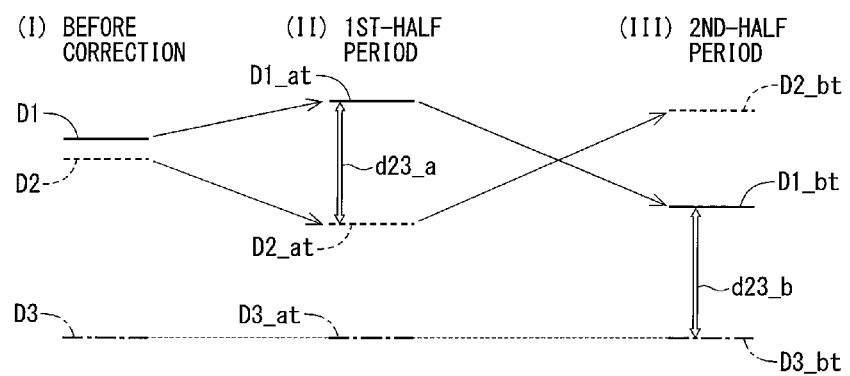
FIG. 27 is an explanatory diagram for explaining a correcting process (2-3) according to the second embodiment of the disclosure.

A process (2-3) in the case where the amplitude of the voltage instruction values Vu*, Vv*, and Vw* is equal to or larger than the predetermined value THa (NO in S202) and the odd-number voltage duty Do is less than the current detection duty lower-limit value Dm (YES in S212) will be described with reference to FIG. 27.

In the process (2-3), in the first-half period, to detect the phase current of the first duty D1, the first duty D1 is corrected upward and the second duty D2 is corrected downward so that the difference d23_a between the first duty D1 and the second duty D2 becomes the current detection duty lower-limit value Dm.

In the second-half period, to cancel out the correction amounts, the first duty D1 is corrected downward and the second duty D2 is corrected upward. In the process (2-3), since the even-numbered voltage duty De as the difference between the second duty D2 and the third duty D3 is equal to or larger than the current detection duty lower-limit value Dm and the duty which can detect the phase current of the third duty D3 is assured, in the second-half period, the phase current of the third duty D3 is detected. That is, in the example of FIG. 27, the difference d23_b of the first and third duties D1 and D3 is equal to or larger than the current detection duty lower-limit value Dm. Depending on the first and second duties D1 and D2 and the correction values C21 and C22, there is a case that the second duty D2 is smaller than the first duty D1. In this case, the difference between the second and third duties D2 and D3 is equal to or larger than the current detection duty lower-limit value Dm, and the phase current of the third duty D3 can be detected.

Figure 28:
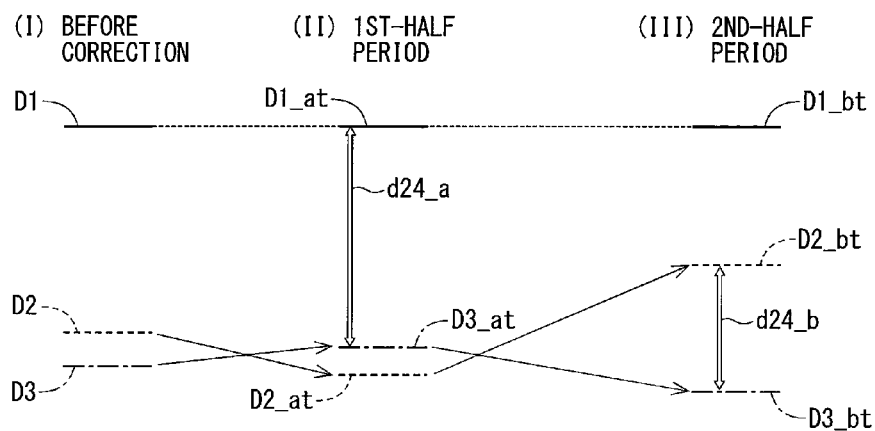
FIG. 28 is an explanatory diagram for explaining a correcting process (2-4) according to the second embodiment of the disclosure.

A process (2-4) in the case where the amplitude of the voltage instruction values Vu*, Vv*, and Vw* is equal to or larger than the predetermined value THa (NO in S202) and the even-number voltage duty De is less than the current detection duty lower-limit value Dm (YES in S214) will be described with reference to FIG. 28.

In the process (2-4), in the second-half period, to detect the phase current of the third duty D3, the second duty D2 is corrected upward and the third duty D3 is corrected downward so that the difference d24_b between the third duty D3 and the second duty D2 becomes the current detection duty lower-limit value Dm.

In the first-half period, to cancel out the correction amounts, the second duty D2 is corrected downward and the third duty D3 is corrected upward. In the process (2-4), since the odd-numbered voltage duty Do as the difference between the first duty D1 and the second duty D2 is equal to or larger than the current detection duty lower-limit value Dm and the duty which can detect the phase current of the first duty D1 is assured, in the first-half period, the phase current of the first duty D1 is detected. That is, in the example of FIG. 28, the difference d24_a of the first and third duties D1 and D3 is equal to or larger than the current detection duty lower-limit value Dm. Depending on the second and third duties D2 and D3 and the correction values C22 and C23, there is a case that the second duty D2 is larger than the third duty D3. In this case, the difference between the first and second duties D1 and D2 is equal to or larger than the current detection duty lower-limit value Dm, and the phase current of the first duty D1 can be detected.

In the case where the amplitude of the voltage instruction values Vu*, Vv*, and Vw* is equal to or larger than the predetermined value THa (NO in S202) and both of the odd-numbered voltage duty Do and the even-number voltage duty De are equal to or larger than the current detection duty lower-limit value Dm (NO in S210, NO in S212, and NO in S214), without correcting the duty, the phase current of the first and third duties D1 and D3 can be detected.

Next, an adjusting process in the current detection timing adjustment computing unit 74 will be described.

In the embodiment, the sampling timings in the AD converter 42 are a timing before detection shift time t2 (for example, a few μs) from the center (lower end, upper end)

of the PWM reference signal P and an intermediate timing. The first sampling timing in one PWM cycle is set as t21, the second sampling timing is set as t22, the third sampling timing is set as t23, and the fourth sampling timing is set as t24. The detection shift time t2 may be equal to or different from the detection shift time t1 of the first embodiment.

The current detection timing adjustment computing unit 74 adjusts the timing at which an active current vector for performing current detection is generated by changing the neutral voltage as an average value of voltages applied to the coils 11 to 13 so that at least one of t21 and t22 and at least one of t23 and t24 become timings after lapse of the time for converging ringing in the active voltage vector interval.

Figure 29:
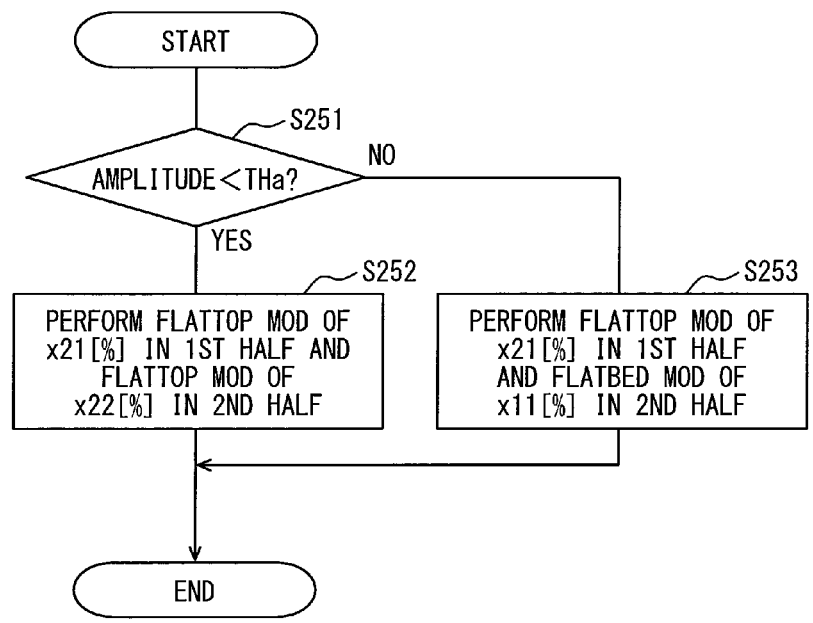
FIG. 29 is a flowchart for explaining an adjusting process according to the second embodiment of the disclosure.

The adjusting process in the current detection timing adjustment computing unit 74 will be described with reference to the flowchart illustrated in FIG. 29.

Figure 20:
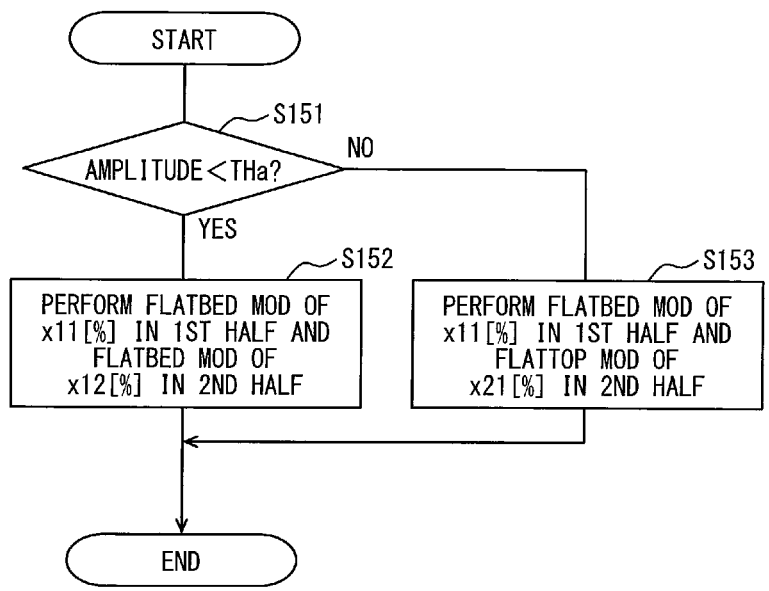
FIG. 20 is a flowchart for explaining an adjusting process according to the first embodiment of the disclosure.

The process of S251 is similar to that of S151 in FIG. 20. In the case where it is determined that the amplitude of the voltage instruction values Vu*, Vv*, and Vw* is less than the predetermined value THa (YES in S251), the routine shifts to S252. In the case where it is determined that the amplitude of the voltage instruction values Vu*, Vv*, and Vw* is equal to or larger than the predetermined value THa (NO in S251), the routine shifts to S253.

In S252, in the first-half period, the flattop modulation is performed so that the duty of the largest phase becomes a duty upper-limit value x21. Also in the second-half period, the flattop modulation is performed so that the duty of the largest phase becomes an upper-side duty setting value x22. The duty upper-limit value x21 is a value according to dead time and, in the embodiment, is set to 96%. Accordingly, the voltage vector interval V0 becomes the minimum time Tm determined from the dead time. The upper-side duty setting value x22 is a value smaller than the duty upper-limit value x21 and is properly set so that the active voltage vector interval for performing current detection becomes a desired timing. In the embodiment, for example, the upper-side duty setting value x22 is set to 70%. In this process, it is sufficient that the current detection timing becomes a desired timing in the active voltage vector interval. Consequently, in the second-half period, in place of the flattop modulation by which the duty of the largest phase becomes the upper-side duty setting value x22, for example, modulation may be performed so that the duty in the middle becomes an intermediate duty setting value x23 (for example, 54%).

In S252, the amplitude of the voltage instruction values Vu*, Vv*, and Vw* is less than the predetermined value THa and the flattop modulation is performed through one PWM cycle, so that the voltage vector interval V7 of the minimum time Tm or longer is assured at the lower end of the PWM reference signal P.

For example, in the first-half period, when the first-half duty temporary values Du_at, Dv_at, and Dw_at satisfy the relation of Du_at >Dv_at >Dw_at, the first-half duty instruction values Du_a, Dv_a, and Dw_a are expressed by equations (61), (62), and (63), respectively.

$$Du\_a[\%]=Du\_at-Du\_at+x21 \qquad (61)$$

$$Dv\_a[\%]=Dv\_at-Du\_at+x21 \qquad (62)$$

$$Dw\_a[\%]=Dw\_at-Du\_at+x21 \qquad (63)$$

In the second-half period, when the second-half duty temporary values Du_bt, Dv_bt, and Dw_bt satisfy the relation of Du_bt>Dv_bt>Dw_bt, the second-half duty instruction values Du_b, Dv_b, and Dw_b are expressed by equations (64-1), (65-1), and (66-1), respectively.

$$Du\_b[\%]=Du\_bt-Du\_bt+x22 \qquad (64-1)$$

$$Dv\_b[\%]=Dv\_bt-Du\_bt+x22 \qquad (65-1)$$

$$Dw\_b[\%]=Dw\_bt-Du\_bt+x22 \qquad (66-1)$$

For example, in the second-half period, the second-half duty instruction values Du_b, Dv_b, and Dw_b in the case where the second-half duty temporary values Du_bt, Dv_bt, and Dw_bt satisfy the relation of Du_bt>Dv_bt>Dw_bt and modulation is performed so that the duty in the middle becomes the intermediate duty setting value x23 are expressed by equations (64-2), (65-2), and (66-2), respectively.

$$Du\_b[\%]=Du\_bt-Dv\_bt+x23 \qquad (64-2)$$

$$Dv\_b[\%]=Dv\_bt-Dv\_bt+x23 \qquad (65-2)$$

$$Dw\_b[\%]=Dw\_bt-Dv\_bt+x23 \qquad (66-2)$$

In S253 to which the routine shifts in the case where it is determined that the amplitude of the voltage instruction values Vu*, Vv*, and Vw* is equal to or larger than the predetermined value THa (NO in S251), in the first-half period, the flattop modulation is performed so that the duty of the largest phase becomes the duty upper-limit value x21. In the second-half period, flatbed modulation is performed so that the duty of the smallest phase becomes a duty lower-limit value x11. By the modulation, the voltage vector interval V0 in the first-half period and the voltage vector interval V7 in the second-half period become the minimum time Tm. The voltage vector interval V7 in the first-half period and the voltage vector interval V0 in the second-half period become the minimum time Tm or longer.

For example, in the second-half period, when the second-half duty temporary values Du_bt, Dv_bt, and Dw_bt satisfy the relation of Du_bt>Dv_bt>Dw_bt and the flatbed modulation of 4% is performed, the second-half duty instruction values Du_b, Dv_b, and Dw_b are expressed by equations (67), (68), and (69), respectively. The first-half duty instruction values Du_a, Dv_a, and Dw_a are similar to the equations (61), (62), and (63), respectively, in S252.

$$Du\_b[\%]=Du\_bt-Dw\_bt+4 \qquad (67)$$

$$Dv\_b[\%]=Dv\_bt-Dw\_bt+4 \qquad (68)$$

$$Dw\_b[\%]=Dw\_bt-Dw\_bt+4 \qquad (69)$$

Figure 30A:
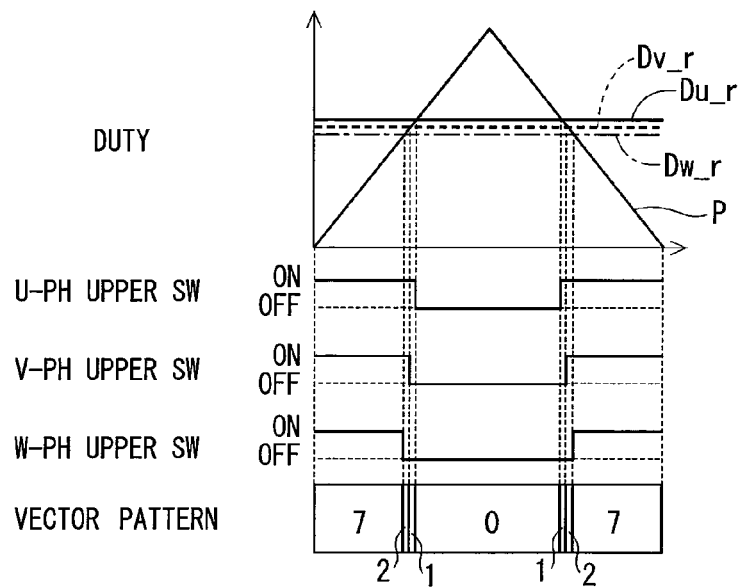
FIGS. 30A to 30C are explanatory diagrams for explaining a correcting process and an adjusting process in the case where the amplitude of the voltage instruction value is less than a predetermined value in the second embodiment of the disclosure.
Figure 30B:
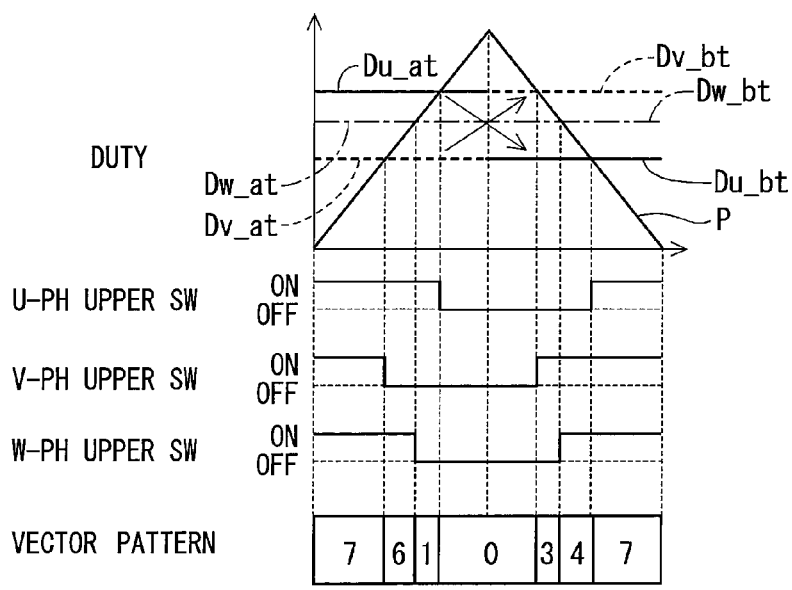
Figure 30C:
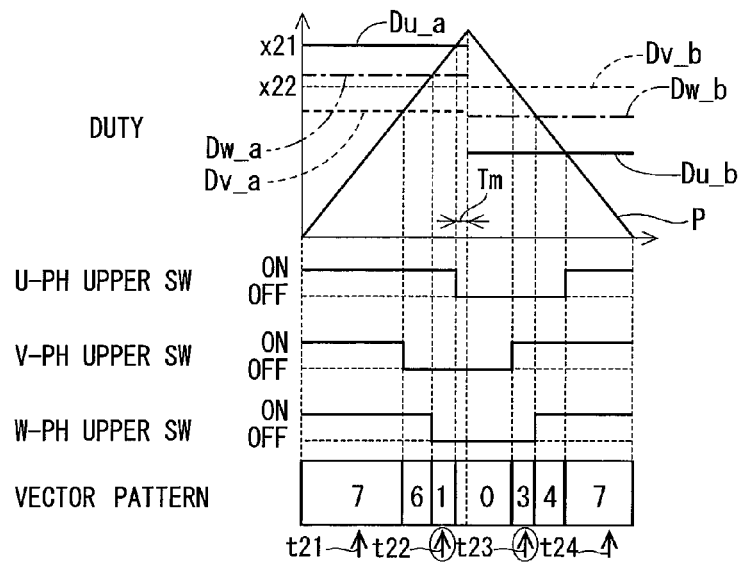
Figure 31A:
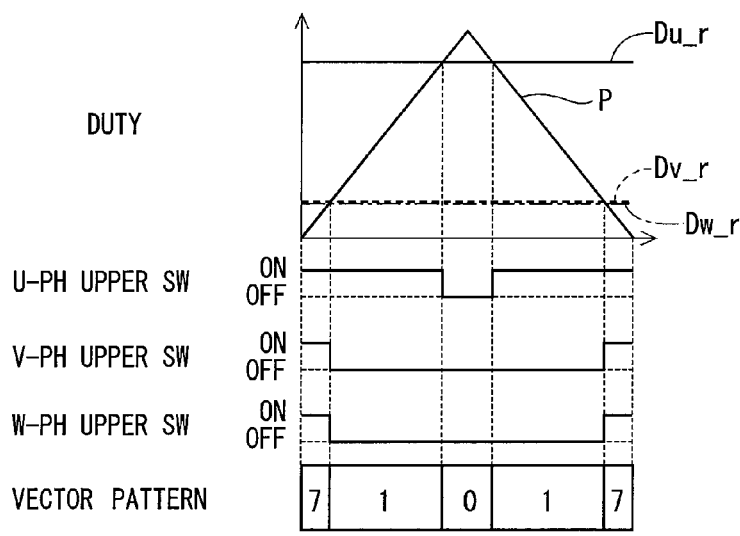
FIGS. 31A to 31C are explanatory diagrams for explaining a correcting process and an adjusting process in the case where the amplitude of the voltage instruction value is equal to or larger than the predetermined value in the second embodiment of the disclosure.
Figure 31B:
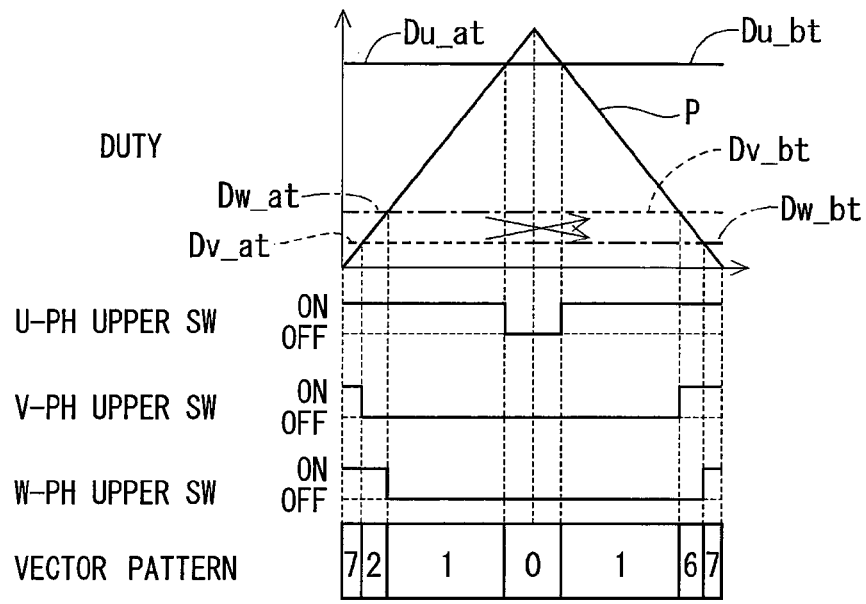
Figure 31C:
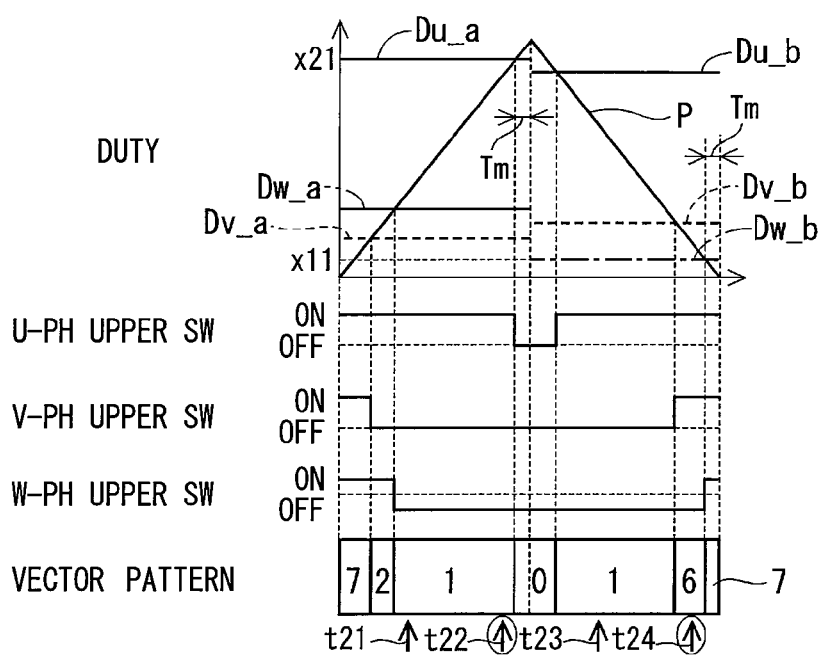

A concrete example of the correcting process and the modulating process of the embodiment will be described with reference to FIGS. 30A to 30C and FIGS. 31A to 31C. FIGS. 30A to 30C illustrate an example in the case where the amplitude of the voltage instruction values Vu*, Vv*, and Vw* is less than the predetermined value THa. FIGS. 31A to 31C illustrate an example in the case where the amplitude of the voltage instruction values Vu*, Vv*, and Vw* is equal to or larger than the predetermined value THa. FIGS. 30A to 30C and FIGS. 31A to 31C will be described on assumption that Vu*>Vv*>Vw*.

FIG. 30A is similar to FIG. 21A. In the case of controlling the on/off operation of the SW 21 to 26 on the basis of the duty conversion values Du_r, Dv_r, and Dw_r prior to correction, the active vector voltage interval is short, and the currents Iu, Iv, and Iw of the respective phases cannot be detected.

In the embodiment, as illustrated in FIG. 30B, to assure the active voltage vector interval in which current can be detected, the duty conversion values Du_r, Dv_r, and Dw_r are corrected. Specifically, in the first-half period, the duty of the U phase as a phase of the largest duty conversion value is corrected upward to become the first-half duty temporary value Du_at of the U phase so that the voltage vector V1 for performing current detection becomes equal to or longer than a period in which current can be detected. At this time, the duty of the V phase is corrected downward so that the voltage vector interval V1 for performing current detection does not become shorter and the first-half duty temporary value Dv_at of the V phase becomes smaller than the first-half duty temporary value Dw_at of the W phase.

In the second-half period, the duty of the V phase having the middle duty conversion value is corrected upward so that the voltage vector V3 for performing current detection becomes equal to or longer than the period in which current can be detected. At this time, the duty conversion value Du_r is corrected downward so that the voltage vector interval V3 for performing current detection does not become shorter and the second-half duty temporary value Du_bt of the U phase becomes smaller than the second-half duty temporary value Dw_bt of the W phase.

In the case where the amplitude of the voltage instruction values Vu*, Vv*, and Vw* is less than the predetermined value THa, the duty of the W phase as the phase of the smallest duty conversion value is not corrected. Consequently, the first-half duty conversion value Dw_at and the second-half duty conversion value Dw_bt of the W phase are equal to the duty conversion value Dw_r.

By the above operation, the timing of switching the U upper SW 21 from the on state to the off state and the timing of switching it from the off state to the on state are shifted backward. The timing of switching the V upper SW 22 from the on state to the off state and the timing of switching it from the off state to the on state are shifted forward. At this time, the period in which the U upper SW 21 and the W upper SW 23 are on does not change before and after the correction.

The duties of the U phase and the V phase are corrected so that their magnitude are equal and the correction directions are opposite between the first-half period and the second-half period. Since a change in the application voltage by the correction in the first-half period and that in the second-half period cancel out each other, in one PWM cycle, there is no change in the application voltage before and after correction.

As illustrated in FIG. 30C, the adjusting process is performed so that the currents Iu, Iv, and Iw of the respective phases can be computed on the basis of values sampled and held at the sampling timings t21, t22, t23, and t24 at predetermined intervals by the AD converter 42 regardless of the amplitudes of the voltage instruction values Vu*, Vv*, and Vw*. Specifically, in the first-half period, the flattop modulation is performed so that the first-half duty instruction value Du_a of the U phase as the largest duty becomes the duty upper-limit value x21. In the second-half period, the flattop modulation is performed so that the second-half duty instruction value Dv_b of the V phase as the duty of the largest phase becomes the upper-side duty setting value x22. As a result, the voltage vector interval V0 in the first-half period becomes the minimum time Tm. Each of the voltage vector interval V7 in the first-half period and the voltage vector interval V0 and the voltage vector interval V7 in the second-half period becomes the minimum time Tm or longer.

As described above, the sampling timings in one PWM cycle are t21 to t24, the current detection value sampled at t21 is Ic21. The current detection value sampled at t22 is Ic22, the current detection value sampled at t23 is Ic23, and the current detection value sampled at t24 is Ic24.

In FIG. 30C, the current detection value Ic22 detected at the second sampling timing t22 is a value detected in the voltage vector interval V1, so that the U-phase current Iu is computed on the basis of the current detection value Ic22 in the phase current computing unit 61. Since the current detection value Ic23 detected at the third sampling timing t23 is a value detected in the voltage vector interval V3, the V-phase current Iv is computed on the basis of the current detection value Ic23 in the phase current computing unit 61. The W-phase current Iw is computed on the basis of the U-phase current Iu and the V-phase current Iv.

The current detection value Ic21 detected at the first sampling timing t21 and the current detection value Ic24 detected at the fourth sampling timing t24 are used for offset correction.

FIGS. 31A to 31C illustrate an example of a process (2-4) in which the amplitude of the voltage instruction values Vu*, Vv*, and Vw* is equal to or larger than the predetermined value THa, the U-phase duty conversion value Du_r is the largest, the V-phase duty conversion value Dv_r and the W-phase duty conversion value Dw_r are almost equal, and the even-numbered voltage duty De is equal to or less than the current detection duty lower-limit value Dm.

As illustrated in FIG. 31A, in the case of controlling the on/off state of the SW 21 to 26 on the basis of the duty conversion values Du_r, Dv_r, and Dw_r prior to correction, like FIG. 22A, although the U-phase current Iu can be detected in the voltage vector interval V1, the V-phase current Iv and the W-phase current Iw cannot be detected.

In the embodiment, therefore, as illustrated in FIG. 31B, to assure the active voltage vector interval in which current can be detected, the duty conversion values Du_r, Dv_r, and Dw_r are corrected. Specifically, in the second-half period, the duty of the V phase which is in the middle is corrected upward to become the second-half duty temporary value Dv_bt of the V phase so that the voltage vector V6 for performing current detection becomes a period in which current can be detected. The duty of the W phase as a phase of the smallest duty conversion value is corrected downward to the second-half duty temporary value Dw_bt of the W phase.

In the first-half period, to cancel out the correction amounts of the second-half period, the duty of the V phase is corrected downward to become the first-half duty temporary value Dv_at of the V phase. The duty of the W phase is corrected upward to become the first-half duty temporary value Dw_at of the W phase.

In the example, the duty of the U phase of the largest duty conversion value is not corrected. Consequently, the first-half duty conversion value Du_at and the second-half duty conversion value Du_bt of the U phase are equal to the duty conversion value Du_r.

By the above operation, the timing of switching the V upper SW 22 from the on state to the off state and the timing of switching it from the off state to the on state are shifted forward. The timing of switching the W upper SW 23 from the on state to the off state and the timing of switching it from the off state to the on state are shifted backward. At this time, the period in which the V upper SW 22 and the W upper SW 23 are on does not change before and after the correction.

The duties of the V phase and the W phase are corrected so that their magnitude are equal and the correction directions are opposite between the first-half period and the second-half period. Since a change in the application voltage by the correction in the first-half period and that in the second-half period cancel out each other, in one PWM cycle, there is no change in the application voltage before and after correction.

As illustrated in FIG. 31C, the adjusting process is performed so that the currents Iu, Iv, and Iw of the respective phases can be computed on the basis of values sampled and held at the sampling timings t21, t22, t23, and t24 at predetermined intervals by the AD converter 42 regardless of the amplitudes of the voltage instruction values Vu*, Vv*, and Vw*. Specifically, in the first-half period, the flattop modulation is performed so that the first-half duty instruction value Du_a of the U phase as the largest duty becomes the duty upper-limit value x21. In the second-half period, the flatbed modulation is performed so that the second-half duty instruction value Dw_b of the W phase as the duty of the smallest phase becomes the duty lower-limit value x11. As a result, the voltage vector interval V0 in the first-half period and the voltage vector interval V7 in the second-half period become the minimum time Tm. The voltage vector interval V7 in the first-half period and the voltage vector interval V0 in the second-half period become the minimum time Tm or longer.

In FIG. 31C, the current detection value Ic22 detected at the second sampling timing t22 is a value detected in the voltage vector interval V1, so that the U-phase current Iu is computed on the basis of the current detection value Ic22 in the phase current computing unit 61. Since the current detection value Ic24 detected at the fourth sampling timing t24 is a value detected in the voltage vector interval V6, the V-phase current Iv is computed on the basis of the current detection value Ic24 in the phase current computing unit 61. The W-phase current Iw is computed on the basis of the U-phase current Iu and the V-phase current Iv.

The current detection value Ic21 detected at the first sampling timing and the current detection value Ic23 detected at the third sampling timing are used for offset correction.

The relation between the current detection values used for computation of the currents Iu, Iv, and Iw of respective phases and the amplitudes of the voltage instruction values Vu*, Vv*, and Vw* will be described.

In the embodiment, regardless of the amplitudes of the voltage instruction values Vu*, Vv*, and Vw*, on the basis of the current detection values detected without changing the sampling timings t21, t22, t23, and t24 by the AD converter 42, the currents Iu, Iv, and Iw of the respective phases can be computed.

In the embodiment, as described with reference to FIG. 30C, in the case where the amplitude of the voltage instruction values Vu*, Vv*, and Vw* is less than the predetermined value THa, the phase current computing unit 61 computes the currents Iu, Iv, and Iw of the respective phases on the basis of the current detection value Ic22 detected at the second sampling timing t22 and the current detection value Ic23 detected at the third sampling timing t23.

As described with reference to FIG. 31C, in the case where the amplitude of the voltage instruction values Vu*, Vv*, and Vw* is equal to or larger than the predetermined value THa, the phase current computing unit 61 computes the currents Iu, Iv, and Iw of the respective phases on the basis of the current detection value Ic22 detected at the second sampling timing t22 and the current detection value Ic24 detected at the fourth sampling timing t24.

That is, also in the second embodiment, like the foregoing embodiment, the values used for computation of the currents Iu, Iv, and Iw of the respective phases in the current detection values Ic21 to Ic24 detected at the predetermined sampling intervals are switched according to the amplitudes of the voltage instruction values Vu*, Vv*, and Vw*.

Also with the configuration, effects similar to those of the foregoing embodiment are produced.

Third Embodiment

Figure 32:
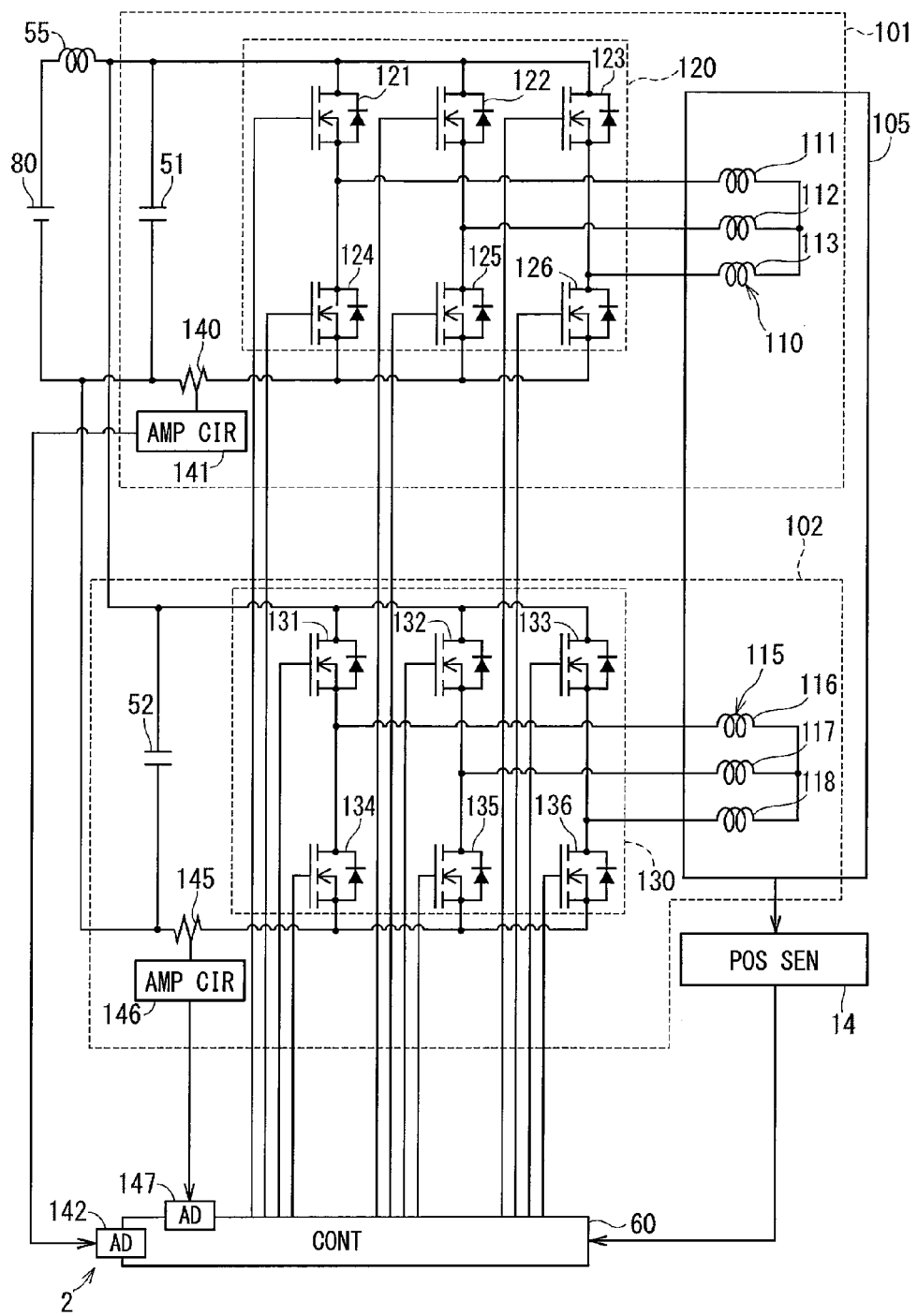
FIG. 32 is a schematic diagram illustrating the configuration of a power converting apparatus according to a third embodiment of the present disclosure.

FIGS. 32 and 33 illustrate a power conversion apparatus according to a third embodiment of the present disclosure.

A power conversion apparatus 2 of the embodiment drives and controls a motor 105.

The motor 105 is a three-phase brushless motor and has two sets of windings 110 and 115. The winding 110 is constructed by a U1 coil 111, a V1 coil 112, and a W1 coil 113. The winding 115 is constructed by a U2 coil 116, a V2 coil 117, and a W2 coil 118.

The power conversion apparatus 2 includes a first inverter unit 120, a second inverter unit 130, a first shunt resistor 140 as a first current detecting unit, a second shunt resistor 145 as a second current detecting unit, a first AD converter 142 as a first current obtaining unit, a second AD converter 147 as a second current obtaining unit, capacitors 51 and 52, the choke coil 55, the control unit 60, and the battery 80.

In the embodiment, the first inverter unit 120, the first shunt resistor 140, the capacitor 51, and the like are provided for the winding 110 to construct a first system 101. The second inverter unit 130, the second shunt resistor 145, the capacitor 52, and the like are provided for the winding 115 to construct a second system 102.

The first inverter unit 120 is a three-phase inverter, and six switching elements 121 to 126 are bridge-connected to switch current passage to the U1 coil 111, the V1 coil 112, and the W1 coil 113.

The second inverter unit 130 is a three-phase inverter, and six switching elements 131 to 136 are bridge-connected to switch current passage to the U2 coil 116, the V2 coil 117, and the W2 coil 118.

The configuration of the first and second inverter units 120 and 130 is similar to that of the inverter unit 20. In the embodiment, the switching elements 121 to 123 and 131 to 133 correspond to the "high-potential-side switching elements", and the switching elements 124 to 126 and 134 to 136 correspond to the "low-potential-side switching elements".

The first shunt resistor 140 is provided between the low potential side of the first inverter unit 120 and the negative electrode side of the battery 80 and, by detecting bus current of the first inverter unit 120, detects current passed to the winding 110. The voltage between both ends of the first shunt resistor 140 is amplified by the amplification circuit 141 and the amplified voltage is output to the first AD converter 142. The first AD converter 142 samples and holds the voltage at predetermined sampling intervals and outputs an AD-converted first current detection value Ic31 to the control unit 60.

The second shunt resistor 145 is provided between the low potential side of the second inverter unit 130 and the negative electrode side of the battery 80 and, by detecting bus current of the second inverter unit 130, detects current passed to the winding 115. The voltage between both ends of the second shunt resistor 145 is amplified by the amplification circuit 146 and the amplified voltage is output to the second AD converter 147. The second AD converter 147 samples and holds the voltage at predetermined sampling intervals and outputs an AD-converted second current detection value Ic32 to the control unit 60.

The capacitor 51 is provided between the battery 80 and the first inverter unit 120 and constructs a power filter in cooperation with the choke coil 55. The capacitor 52 is provided between the battery 80 and the second inverter unit 130 and constructs a power filter in cooperation with the choke coil 55.

In the current detection timing adjustment computing unit 74 in the control unit 60 of the embodiment, different adjusting processes are performed in the first and second inverter units 120 and 130. The adjusting process in the embodiment will be described with reference to FIGS. 33A and 33B. The correcting process of the embodiment is similar to that of the first embodiment.

Figure 33A:
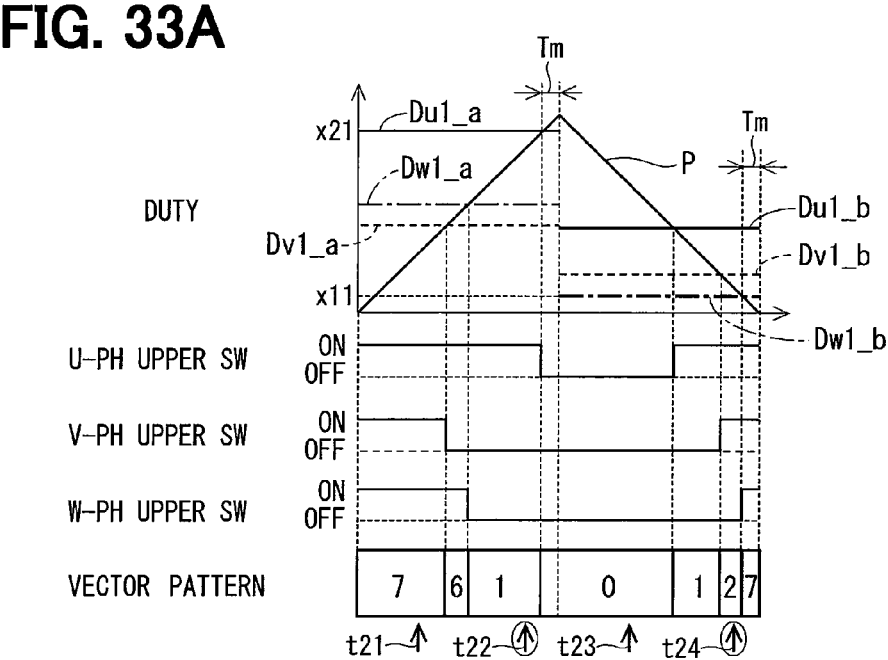
FIGS. 33A to 33B are explanatory diagrams for explaining an adjusting process according to the third embodiment of the disclosure.
Figure 33B:
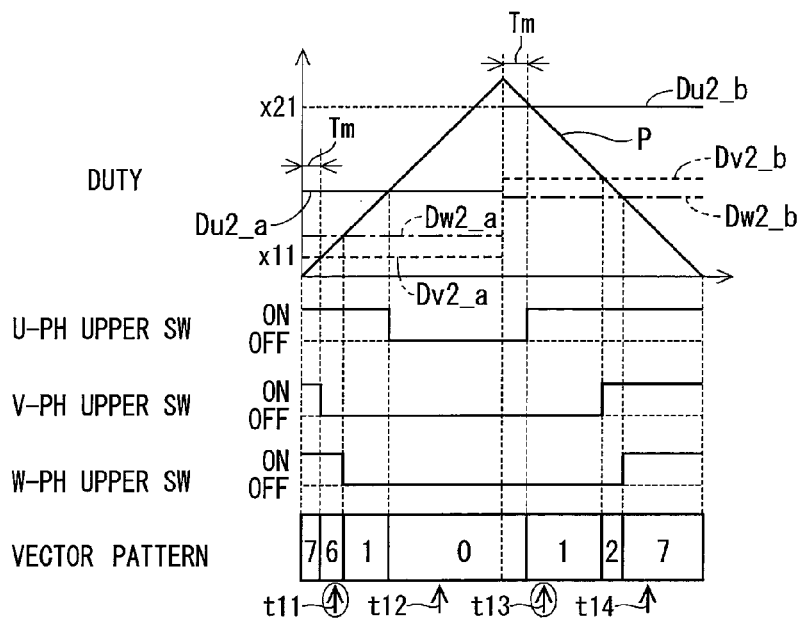

FIG. 33A illustrates first-half duty instruction values Du1_a, Dv1_a, and Dw1_a and second-half duty instruction values Du1_b, Dv1_b, and Dw1_b related to driving of the first inverter unit 120. FIG. 33B illustrates first-half duty instruction values Du2_a, Dv2_a, and Dw2_a and second-half duty instruction values Du2_b, Dv2_b, and Dw2_b related to driving of the second inverter unit 130.

In this case, the first-half duties after correction are of the U phase, the W phase, and the V phase in descending order, and the second-half duties after correction are of the U phase, the W phase, and the V phase in descending order.

As illustrated in FIG. 33A, the current detection timing adjustment computing unit 74 performs the flattop modulation so that, for the duty related to driving of the first inverter unit 120, the first-half duty instruction value Du1_a of the U phase as the duty of the largest phase becomes the duty upper-limit value x21 in the first-half period, and performs the flatbed modulation so that the second-half duty instruction value Dw1_b of the W phase as the duty of the smallest phase becomes the duty lower-limit value x11 in the second-half period.

By the modulation, the voltage vector interval V0 in the first-half period and the voltage vector interval V7 in the second-half period become the minimum time Tm. The voltage vector interval V7 in the first-half period and the voltage vector interval V0 in the second-half period become equal to or longer than the minimum time Tm. That is, in the embodiment, the PWM control is performed without using a duty in a range in which an instruction voltage and a duty do not match due to the influence of the dead time.

In addition, the duty is adjusted so that both of the voltage vector intervals V0 and V7 are included in the first-half period and the second-half period. Consequently, even when the duty is changed between the first-half period and the second-half period of one PWM cycle, a pulse is not reduced in association with the switching of the duty.

The first AD converter 142 samples the voltage between both ends of the first shunt resistor 140 four times at predetermined intervals in one PWM cycle. Like in the second embodiment, the sampling timings t21, t22, t23, and t24 in the first AD converter 142 include timings before the center (lower and upper ends) of the PWM reference signal P by detection shift time t2 and a timing which is intermediate of the timings.

In the example of FIG. 33A, on the basis of the current detection value Ic22 detected at the second sampling timing t22 and the current detection value Ic24 detected at the fourth sampling timing t24, the currents Iu, Iv, and Iw of the respective phases are computed. The current detection values used for computation of the currents Iu, Iv, and Iw of the respective phases are changed according to the amplitudes of the voltage instruction values Vu*, Vv*, and Vw* like in the foregoing embodiment.

As illustrated in FIG. 33B, the current detection timing adjustment computing unit 74 performs the flatbed modulation on the duty related to driving of the second inverter unit 130 so that the first-half duty instruction value Dw2_a of the W phase as the duty of the smallest phase becomes the duty lower-limit value x11 in the first-half period. The current detection timing adjustment computing unit 74 also performs the flattop modulation so that the second-half duty instruction value Du2_b of the U phase as the duty of the largest phase becomes the duty upper-limit value x21.

By the modulation, the voltage vector interval V7 in the first-half period and the voltage vector interval V0 in the second-half period become the minimum time Tm. The voltage vector interval V0 in the first-half period and the voltage vector interval V7 in the second-half period become equal to or longer than the minimum time Tm. That is, in the embodiment, the PWM control is performed without using a duty in a range in which an instruction voltage and a duty do not match due to the influence of the dead time.

In addition, the duty is adjusted so that both of the voltage vector intervals V0 and V7 are included in the first-half period and the second-half period. Consequently, even when the duty is changed between the first-half period and the second-half period of one PWM cycle, a pulse is not reduced in association with the switching of the duty.

The second AD converter 147 samples the voltage between both ends of the second shunt resistor 145 four times at predetermined intervals in one PWM cycle. Like in the first embodiment, the sampling timings t11, t12, t13, and t14 in the second AD converter 147 include timings after the center (lower and upper ends) of the PWM reference signal P by detection shift time t1 and a timing which is intermediate of the timings.

In the example of FIG. 33B, on the basis of the current detection value Ic11 detected at the first sampling timing t11 and the current detection value Ic13 detected at the third sampling timing t13, the currents Iu, Iv, and Iw of the respective phases are computed. The current detection values used for computation of the currents Iu, Iv, and Iw of the respective phases are changed according to the amplitudes of the voltage instruction values Vu*, Vv*, and Vw* like in the foregoing embodiment.

In the embodiment, the duty related to the driving of the first inverter unit 120 is flattop-modulated in the first-half period and is flatbed-modulated in the second-half period. On the other hand, the duty related to the driving of the second inverter unit 130 is flatbed-modulated in the first-half period and is flattop-modulated in the second-half period.

Accordingly, the timing of taking charges from the capacitors 51 and 52 in the first inverter unit 120 and that in the second inverter unit 130 are deviated, so that heat generation and loss in the capacitors 51 and 52 can be reduced, the life can be increased, and the size of the capacitors 51 and 52 can be decreased.

In the embodiment, the inverter unit is constructed by the first and second inverter units 120 and 130. The current detecting unit is constructed by the first shunt resistor 140 connected between the first inverter unit 120 and the negative electrode of the battery 80, and the second shunt resistor 145 connected between the second inverter unit 130 and the negative electrode of the battery 80.

The current detection timing adjustment computing unit 74 in the control unit 60 computes the first-half duty instruction values Du1_a, Dv1_a, and Dw1_a and the second-half duty instruction values Du1_b, Dv1_b, and Dw1_b related to driving of the first inverter unit 120 so that the voltage vector interval V0 in the first-half period and the voltage vector interval V7 in the second-half period become the minimum time.

The current detection timing adjustment computing unit 74 also computes the first-half duty instruction values Du2_a, Dv2_a, and Dw2_a and the second-half duty instruction values Du2_b, Dv2_b, and Dw2_b related to driving of the second inverter unit 130 so that the voltage vector interval V7 in the first-half period and the voltage vector interval V0 in the second-half period become the minimum time.

By the computation, the timings of taking charges from the capacitors 51 and 52 in the two inverter units 120 and 130 are deviated, so that heat generation and loss in the capacitors 51 and 52 can be reduced. Accordingly, the size of the capacitor 51 can be decreased, and the life can be increased.

The power conversion apparatus 2 includes the first AD converter 142 for sampling and holding the first current detection value Ic31 as a current detection value of the first shunt resistor 140 at sampling timings as predetermined intervals, and the second AD converter 147 for sampling and holding the second current detection value Ic32 as a current detection value of the second shunt resistor 145 at sampling timings as predetermined intervals. In the embodiment, the sampling timing in the first AD converter 142 and that in the second AD converter 147 are different from each other.

With the configuration, the current detection value can be detected at proper timings in each of the systems.

Fourth Embodiment

A power conversion apparatus according to a fourth embodiment of the present disclosure will be described with reference to FIGS. 34A and 34B.

The configurations and the like of the fourth embodiment are similar to those of the third embodiment. Since an adjusting process is different, this point will be mainly described.

Figure 34A:
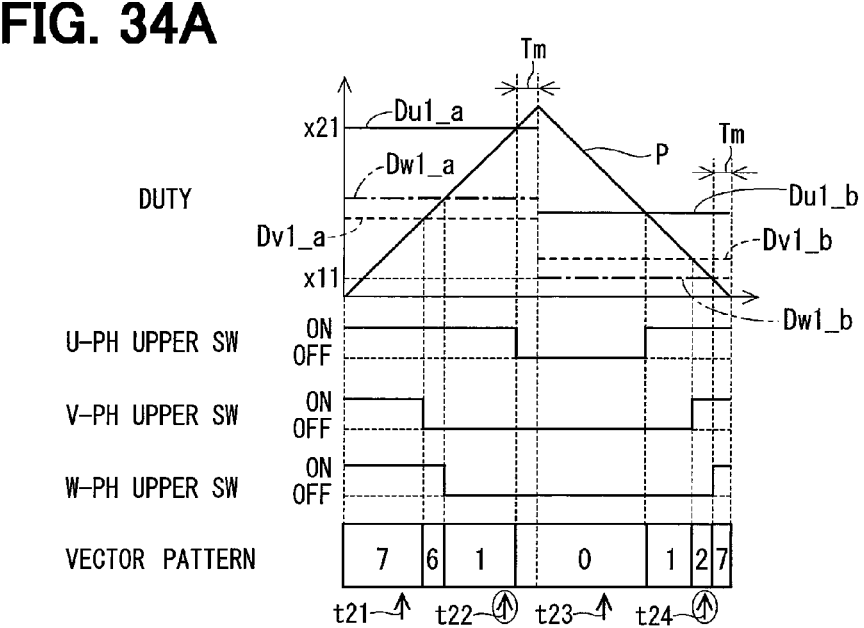
FIGS. 34A to 34B explanatory diagrams for explaining an adjusting process according to the fourth embodiment of the disclosure.

FIG. 34A illustrates the first-half duty instruction values Du1_a, Dv1_a, and Dw1_a and the second-half duty instruction values Du1_b, Dv1_b, and Dw1_b related to driving of the first inverter unit 120. FIG. 34B illustrates the first-half duty instruction values Du2_a, Dv2_a, and Dw2_a and the second-half duty instruction values Du2_b, Dv2_b, and Dw2_b related to driving of the second inverter unit 130.

The first-half duties are of the U phase, the V phase, and the W phase in descending order, and the second-half duties are of the U phase, the W phase, and the V phase in descending order.

As illustrated in FIG. 34A, the duty and the PWM reference signal P related to the driving of the first inverter unit 120 of the embodiment are similar to those of the third embodiment. In the first-half period, the flattop modulation is performed so that the first-half duty instruction value Du1_a of the U phase as the duty of the largest phase becomes the duty upper-limit value x21. In the second-half period, the flatbed modulation is performed so that the second-half duty instruction value Dw1_b of the W phase as the duty of the smallest phase becomes the duty lower-limit value x11.

Figure 34B:
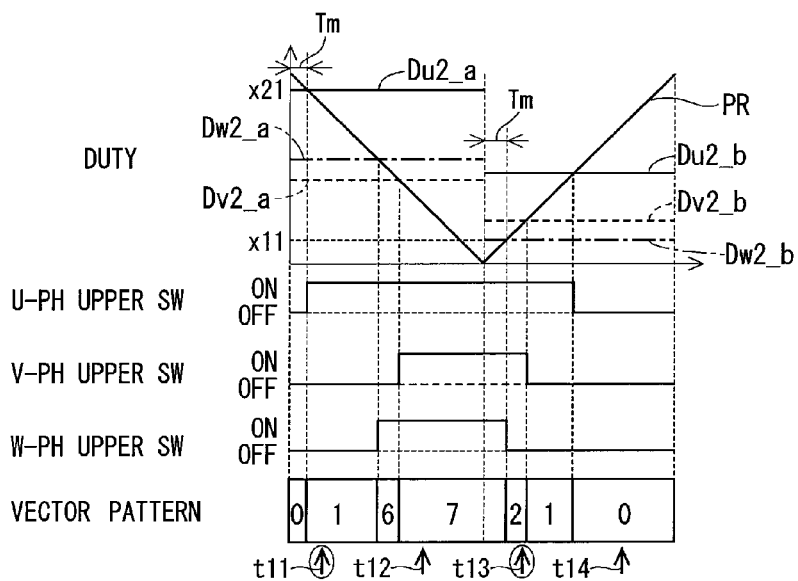

As illustrated in FIG. 34B, the duty related to the driving of the second inverter unit 130 is similar to that related to the driving of the first inverter unit 120. In the first-half period, the flattop modulation is performed so that the first-half duty instruction value Du1_a of the U phase as the duty of the largest phase becomes the duty upper-limit value x21. In the second-half period, the flatbed modulation is performed so that the second-half duty instruction value Dw1_b of the W phase as the duty of the smallest phase becomes the duty lower-limit value x11.

In the embodiment, the phase of a PWM reference signal PR related to the driving of the second inverter unit 130 and that of the PWM reference signal P related to the driving of the first inverter unit 120 are shifted by 180 degrees. In other words, the phase of the PWM reference signal P and that of the PWM reference signal PR are inverted.

The sampling timings in the first AD converter 142 and computation of the currents Iu, Iv, and Iw of the respective phases based on the current detection values detected in the first AD converter 142 are similar to those in the third embodiment. The sampling timings in the second AD converter 147 and computation of the currents Iu, Iv, and Iw of the respective phases based on the current detection values detected in the second AD converter 147 are similar to those in the third embodiment.

Also with the configuration, in the first and second inverter units 120 and 130, the voltage vector interval V0 in the first-half period and the voltage vector interval V7 in the second-half period become the minimum time Tm. The voltage vector interval V7 in the first-half period and the voltage vector interval V0 in the second-half period become equal to or longer than the minimum time Tm. That is, in the embodiment, the PWM control is performed without using a duty in a range in which an instruction voltage and a duty do not match due to the influence of the dead time.

In addition, in the first and second inverter units 120 and 130, the duty is adjusted so that both of the voltage vector intervals V0 and V7 are included in the first-half period and the second-half period. Consequently, even when the duty is changed between the first-half period and the second-half period of one PWM cycle, a pulse is not reduced in association with the switching of the duty.

Further, the active voltage vector interval in the first inverter unit 120 and that in the second inverter unit 130 are shifted.

In the embodiment, in the first system 101, the period from the lower end to the upper end of the PWM reference signal P in one cycle of the PWM reference signal P is set as the first-half period, and the period from the upper end to the lower end is set as the second-half period. In the second system 102, the period from the upper end to the lower end of the PWM reference signal PR in one cycle of the PWM reference signal PR is set as the first-half period, and the period from the lower end to the upper end is set as the second-half period.

In the embodiment, the phase of the PWM reference signal PR related to the driving of the second inverter unit 130 is inverted from the phase of the PWM reference signal P related to the driving of the first inverter unit 120.

The current detection timing adjustment computing unit 74 in the control unit 60 computes the first-half duty instruction values Du1_a, Dv1_a, Dw1_a, Du2_a, Dv2_a, and Dw2_a and the second-half duty instruction values Du1_b, Dv1_b, Dw1_b, Du2_b, Dv2_b, and Dw2_2b related to driving of the first and second inverter units 120 and 130 so that the voltage vector interval V0 in the first-half period or the voltage vector interval V0 or the voltage vector interval V7 in the second-half period becomes the minimum time.

In the embodiment, the duty instruction values Du1_a, Dv1_a, Dw1_a, Du1_b, Dv1_b, and Dw1_b related to the driving of the first inverter unit 120 and the duty instruction values Du2_a, Dv2_a, Dw2_a, Du2_b, Dv2_b, and Dw2_2b related to the driving of the second inverter unit 130 are equal, so that the computation load in the current detection timing adjustment computing unit 74 can be reduced.

Effects similar to those of the foregoing embodiments are produced.

Fifth Embodiment

A power conversion apparatus according to a fifth embodiment of the present disclosure will be described with reference to FIGS. 35A and 35B.

The configurations and the like of the fifth embodiment are similar to those of the third embodiment. Since a correcting process and an adjusting process are different, the different point will be mainly described.

The correcting process and the adjusting process described in the embodiment are applied to the case where the amplitude of the voltage instruction values Vu*, Vv*, and Vw* is less than the predetermined value THa. In the case where the amplitude of the voltage instruction values Vu*, Vv*, and Vw* is equal to or larger than the predetermined value THa, for example, the correcting process and the adjusting process described in the third embodiment are performed.

In the embodiment, the first and second systems 101 and 102 perform different correcting processes. In the first system 101, a correcting process similar to that of the second embodiment is performed (refer to the equations (54) to (59)).

In the second system 102, the correction values are similar to those of the first embodiment. For example, when the duty conversion values Du_r, Dv_r, and Dw_r satisfy Du_r>Dv_r>Dw_r, the first-half duty temporary values Du2_at, Dv2_at, and Dw2_at and the second-half duty temporary values Du2_bt, Dv2_bt, and Dw2_bt are expressed as equations (71) to (77).

$$Du2\_at = Du\_r - C11 \quad (71)$$

$$Dv2\_at = Dv\_r - C12 \quad (72)$$

$$Dw2\_at = Dw\_r - C13 \quad (73)$$

$$Du2\_bt = Du\_r + C11 \quad (74)$$

$$Dv2\_bt = Dv\_r + C12 \quad (75)$$

$$Dw2\_bt = Dw\_r + C13 \quad (76)$$

Specifically, in the embodiment, in the first system 101, the correction values C21, C22, and C23 are added in the first-half period, and the correction values C21, C22, and C23 are subtracted in the second-half period. On the other hand, in the second system 102, the correction values C11, C12, and C13 are subtracted in the first-half period, and the correction values C11, C12, and C13 are added in the second-half period. That is, in the embodiment, the addition and subtraction in the correction processes are performed in opposite order in the first and second systems 101 and 102.

The adjusting process of the embodiment will be described with reference to FIGS. 35A and 35B.

Figure 35A:
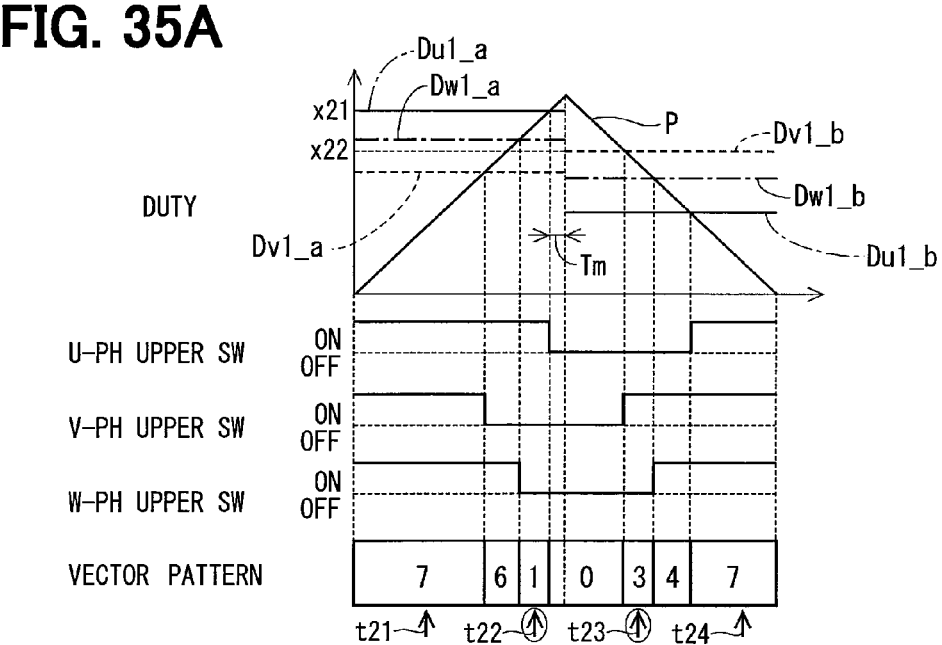
FIGS. 35A to 35B explanatory diagrams for explaining an adjusting process according to the fifth embodiment of the disclosure.

FIG. 35A illustrates the first-half duty instruction values Du1_a, Dv1_a, and Dw1_a and the second-half duty instruction values Du1_b, Dv1_b, and Dw1_b related to driving of the first inverter unit 120. FIG. 35B illustrates the first-half duty instruction values Du2_a, Dv2_a, and Dw2_a and the second-half duty instruction values Du2_b, Dv2_b, and Dw2_b related to driving of the second inverter unit 130.

In the embodiment, the duty instruction values Du1_a, Dv1_a, Dw1_a, Du1_b, Dv1_b, and Dw1_b related to driving of the first inverter unit 120 are similar to those of the second embodiment. That is, as illustrated in FIG. 35A, in the first-half period, the current detection timing adjustment computing unit 74 performs the flattop modulation so that the first-half duty instruction value Du1_a as the duty of the largest phase becomes the duty upper-limit value x21. In the second-half period, the current detection timing adjustment computing unit 74 performs the flattop modulation so that the second-half duty instruction value Dv1_b as the duty of the largest phase becomes the upper-side duty setting value.

The first-half duty instruction values Du2_a, Dv2_a, and Dw2_a related to driving of the second inverter unit 130 are similar to the second-half duty instruction values Du_b, Dv_b, and Dw_b of the first embodiment. The second-half duty instruction values Du2_b, Dv2_b, and Dw2_b related to driving of the second inverter unit 130 are similar to the first-half duty instruction values Du_a, Dv_a, and Dw_a of the first embodiment.

Figure 35B:
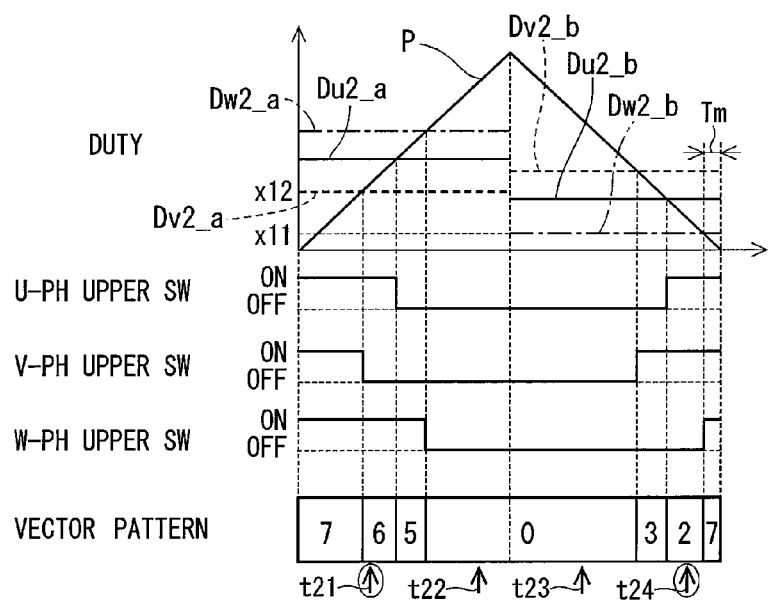

As illustrated in FIG. 35B, in the first-half period, the current detection timing adjustment computing unit 74 performs the flatbed modulation so that the first-half duty instruction value Dv2_a as the duty of the smallest phase becomes the low-side duty setting value x12. In the second-half period, the current detection timing adjustment computing unit 74 performs the flatbed modulation so that the second-half duty instruction value Dw2_b as the duty of the smallest phase becomes the duty lower-limit value x11.

The sampling timings in the first AD converter 142 and the second AD converter 147 are similar to those of the second embodiment. The first AD converter 142 computes the currents Iu, Iv, and Iw of the respective phases on the basis of the current detection value Ic22 detected at the second sampling timing t22 and the current detection value Ic23 detected at the third sampling timing t23. The second AD converter 147 computes the currents Iu, Iv, and Iw of the respective phases on the basis of the current detection value Ic24 detected at the fourth sampling timing t24.

In the embodiment, the sampling timing in the first AD converter 142 and that in the second AD converter 147 are the same.

Also with the configuration, the voltage vector interval V0 in the first-half period of the first inverter unit 120 and the voltage vector interval V7 in the second-half period of the second inverter unit 130 become the minimum time Tm. The other zero voltage vector intervals become equal to or longer than the minimum time. That is, in the embodiment, the PWM control is performed without using a duty in a range in which an instruction voltage and a duty do not match due to the influence of the dead time.

In addition, in the first and second inverter units 120 and 130, the duty is adjusted so that both of the voltage vector intervals V0 and V7 are included in the first-half period and the second-half period. Consequently, even when the duty is changed between the first-half period and the second-half period of one PWM cycle, a pulse is not reduced in association with the switching of the duty.

Further, the active voltage vector interval in the first inverter unit 120 and that in the second inverter unit 130 are shifted.

In the embodiment, the current detection timing adjustment computing unit 74 in the control unit 60 computes the first-half duty instruction values Du1_a, Dv1_a, and Dw1_a and the second-half duty instruction values Du1_b, Dv1_b, and Dw1_b related to driving of the first inverter unit 120 so that the amplitude of the voltage instruction values Vu*, Vv*, and Vw* becomes less than the predetermined value THa and one of the voltage vector intervals V0 and V7 in the first-half period becomes the minimum time Tm. The current detection timing adjustment computing unit 74 computes the first-half duty instruction values Du2_a, Dv2_a, and Dw2_a and the second-half duty instruction values Du2_b, Dv2_b, and Dw2_b related to driving of the second inverter unit 130 so that the other one of the voltage vector intervals V0 and V7 in the second-half period becomes the minimum time Tm.

Also with the configuration, effects similar to those of the foregoing embodiments are produced.

Since the addition and subtraction in the correcting process are performed in the opposite order, the frequency of sound generated by correction becomes higher and the sound is suppressed. Consequently, noise can be reduced.

Other Embodiments (A) In the foregoing embodiment, the voltage vectors V0 and V7 are included in both of the first-half period and the second-half period. By making the lower SW in which the duty has the smallest phase always on through the first-half period or the second-half period, the duty 0% can be output. By making the upper SW in which the duty has the largest phase always on through the first-half period or the second-half period, the duty 100% can be output. As the other embodiments, the duty lower-limit value x11 may be set to 0% or the duty upper-limit value x21 may be set to 100%. In this case, the voltage vector intervals V7 and V0 are included in one of the first-half period and the second-half period, and one of the voltage vector intervals V7 and V0 is included in the other one of the first-half period and the second-half period.

The duty lower-limit value x11 or the duty upper-limit value x21 may be changed according to the voltage instruction value. Concretely, in the case where the voltage instruction value is equal to or less than the predetermined value, by setting the duty lower-limit value x11 or the duty upper-limit value x21 to a value according to the dead time, the voltage vector intervals V0 and V7 are included in both of the first-half period and the second-half period. In the case where the voltage instruction value is equal to or larger than the predetermined value, by setting the duty lower-limit value x11 to 0% or setting the duty upper-limit value x21 to 100%, both the voltage vector intervals V0 and V7 are included in one of the first-half period and the second-half period, and one of the voltage vector intervals V0 and V7 is included in the other one of the first-half period and the second-half period. Accordingly, a voltage in a wider range can be applied.

In the case of applying the power conversion apparatus to an electric power steering apparatus, the duty lower-limit value x11 or the duty upper-limit value x21 is changed according to the steering speed in place of the voltage instruction value. In the case where the steering speed is equal to or less than predetermined speed, both of the voltage vector intervals V0 and V7 are made included in both of the first-half period and the second-half period. In the case where the steering speed is higher than the predetermined speed, both of the voltage vector intervals V0 and V7 may be made included in one of the first-half period and the second-half period, and one of the voltage vector intervals V0 and V7 may be included in the other one of the first-half period and the second-half period.

(B) In the foregoing embodiment, the correcting process and the adjusting process in the first-half period in one PWM cycle and those in the second-half period are different from each other. In another embodiment, the correcting device may perform any correction as long as the corrected duties in the first-half and second-half periods are cancelled out by, for example, exchanging the first-half period and the second-half period. The adjusting device may perform any adjustment as long as both of the voltage vector intervals V0 and V7 are included in at least one of the first-half period and the second-half period by, for example, exchanging the first-half period and the second-half period.

The first and second inverter units in the third to fifth embodiments may be exchanged.

(C) In the foregoing embodiment the current detection value is detected by the AD converter at predetermined intervals. In another embodiment, the sampling timings of the current detection value may not be predetermined intervals. The number of current detection times is not limited to four per PWM cycle but may be any number. The interval in the first AD converter and that in the second AD converter may be different from each other. The number of sampling times in the first AD converter and that in the second AD converter may be different from each other.

(D) In the foregoing embodiment, the current detecting unit is provided between the inverter unit and the negative side of the DC power supply. In another embodiment, the current detecting unit may be provided between the inverter unit and the positive side of the DC power supply.

(E) In the embodiment, the carrier wave as the PWM reference signal is a triangle wave. In another embodiment, the PWM reference signal is not limited to the triangular wave but may be, for example, a saw-tooth wave or the like. For example, in the case of using a saw-tooth wave as the carrier wave, by performing a process while regarding the first cycle in two PWM cycles as a first-half period and the second cycle as the second-half period, similar effects are obtained.

In the foregoing embodiment, one cycle of the PWM reference signal is divided into the first-half period and the second-half period, and the correcting process and the adjusting process are performed. In another embodiment, a predetermined multiple of cycles which is one or larger of the PWM reference signal may be divided into the first-half period and the second-half period, and the correcting process and the adjusting process may be performed.

(F) In the fifth embodiment, the addition and subtraction are performed in the opposite order between the first and second systems. Also in the third and fourth embodiments, similarly, the addition and subtraction may be performed in the opposite order between the first and second systems. By the operation, the frequency of sound by correction becomes higher, and sound is suppressed, so that noise can be reduced.

In the fifth embodiment, the addition and subtraction may not be performed in opposite order between the first and second systems.

(G) In the foregoing embodiment, the rotating electrical machine is applied to the electric power steering apparatus. In another embodiment, for example, an in-vehicle electric motor may be used for an electric fan, an oil pump, a water pump, or the like. The electric motor may not be limited to the use for a vehicle.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A power conversion apparatus comprising:
an inverter unit having a plurality of high-potential-side switching elements disposed on a high-potential side and a plurality of low-potential-side switching elements disposed on a low-potential side, each of the high-potential-side switching elements and the low-potential-side switching elements corresponding to one of a plurality of phases of a winding of a rotating electrical machine;
a current detecting unit connected between the inverter unit and a positive side or a negative side of a DC power supply; and
a control unit controlling an on-operation and an off-operation of the high-potential-side switching elements and the low-potential-side switching elements based on a PWM reference signal and a duty instruction value,
wherein the control unit includes:
a phase current computing device computing a phase current of each phase, which flows through one of phases of the winding, based on a current detection value detected by the current detecting unit; and
a voltage instruction value computing device computing a voltage instruction value, which relates to a voltage applied to the winding, based on the phase current of each phase,
wherein the control unit computes an active voltage vector interval in both a first-half period and a second half period of the PWM reference signal to be longer or equal to a predetermined period required to obtain the current detection value,
wherein the control unit computes a first-half duty instruction value and a second-half duty instruction value as a duty instruction value based on the voltage instruction value in such a manner that a first voltage vector interval and a second voltage vector interval are equal to or longer than minimum time, and the first voltage vector interval and the second voltage vector interval are included in at least one of the first-half period and the second-half period,
wherein, in the first voltage vector interval, the low-potential-side switching elements of all of the phases turn on,
wherein, in the second voltage vector interval, the high-potential-side switching elements of all of the phases turn on,
wherein the minimum time is equal to or longer than a dead time period,
wherein, in the dead time period, both one high-potential-side switching element and one low-potential-side switching element corresponding to a same phase of the winding are turned off, and
wherein the second voltage vector interval in the first-half period and the first voltage vector interval in the second-half period are equal to the minimum time.

2. The power conversion apparatus according to claim 1, wherein the active voltage vector interval is equal to or longer than the predetermined period required to obtain the current detection value in the first-half period and the second-half period of the one cycle of the PWM reference signal.

3. The power conversion apparatus according to claim 1, wherein the control unit includes:
a duty converting device for converting the voltage instruction value to a duty conversion value;
a correcting device for computing a first half duty temporary value and a second half duty temporary value in a manner that the active voltage vector interval for obtaining the current detection value is equal to or longer than the predetermined period required to obtain the current detection value; and
an adjusting device for computing the first-half duty instruction value and the second-half duty instruction value from the first-half duty temporary value and the second-half duty temporary value so that the first voltage vector interval and the second voltage vector interval, which are equal to or longer than the minimum time, are included in at least one of the first-half period and the second-half period.

4. The power conversion apparatus according to claim 1, further comprising:
a current obtaining unit for sampling and holding the current detection value with a fixed interval sampling timing,
wherein the control unit computes the first-half duty instruction value and the second-half duty instruction value so that phase current is obtained from the current detection value with the fixed interval sampling timing.

5. The power conversion apparatus according to claim 4, wherein a value for computing the phase current of each phase is switched in accordance with an amplitude of the voltage instruction value, and
wherein the value is selected from the current detection values obtained by the current obtaining unit.

6. The power conversion apparatus according to claim 1, wherein the inverter unit includes a first inverter unit and a second inverter unit, and
wherein the current detecting unit includes a first current detecting unit and a second current detecting unit,
wherein the first current detecting unit is connected between the first inverter unit and the positive side or the negative side of the DC power supply, and
wherein the second current detecting unit is connected between the second inverter unit and the positive side or the negative side of the DC power supply.

7. A power conversion apparatus comprising:
an inverter unit having a plurality of high-potential-side switching elements disposed on a high-potential side and a plurality of low-potential-side switching elements disposed on a low-potential side, each of the high-potential-side switching elements and the low-potential-side switching elements corresponding to one of a plurality of phases of a winding of a rotating electrical machine;
a current detecting unit connected between the inverter unit and a positive side or a negative side of a DC power supply; and
a control unit controlling an on-operation and an off-operation of the high-potential-side switching elements and the low-potential-side switching elements based on a PWM reference signal and a duty instruction value,
wherein the control unit includes:
a phase current computing device computing a phase current of each phase, which flows through one of phases of the winding, based on a current detection value detected by the current detecting unit; and
a voltage instruction value computing device computing a voltage instruction value, which relates to a voltage applied to the winding, based on the phase current of each phase,
wherein the control unit computes an active voltage vector interval in both a first-half period and a second half period of predetermined one cycle or multiple cycles of the PWM reference signal to be longer or equal to a predetermined period required to obtain the current detection value,
wherein the control unit computes a first-half duty instruction value and a second-half duty instruction value as a duty instruction value based on the voltage instruction value in such a manner that a first voltage vector interval and a second voltage vector interval are equal to or longer than minimum time, and the first voltage vector interval and the second voltage vector interval are included in at least one of the first-half period and the second-half period,
wherein, in the first voltage vector interval, the low-potential-side switching elements of all of the phases turn on,
wherein, in the second voltage vector interval, the high-potential-side switching elements of all of the phases turn on,
wherein the minimum time is equal to or longer than a dead time period,
wherein, in the dead time period, both one high-potential-side switching element and one low-potential-side switching element corresponding to a same phase of the winding are turned off,
wherein the inverter unit includes a first inverter unit and a second inverter unit,
wherein the current detecting unit includes a first current detecting unit and a second current detecting unit,
wherein the first current detecting unit is connected between the first inverter unit and the positive side or the negative side of the DC power supply,
wherein the second current detecting unit is connected between the second inverter unit and the positive side or the negative side of the DC power supply,
wherein the control unit computes the first-half duty instruction value and the second-half duty instruction value of the first inverter unit, so that the first voltage vector interval in the first-half period and the second voltage vector interval in the second-half period are equal to the minimum time, and
wherein the control unit computes the first-half duty instruction value and the second-half duty instruction value of the second inverter unit, so that the second voltage vector interval in the first-half period and the first voltage vector interval in the second-half period are equal to the minimum time.

8. A power conversion apparatus comprising:
an inverter unit having a plurality of high-potential-side switching elements disposed on a high-potential side and a plurality of low-potential-side switching elements disposed on a low-potential side, each of the high-potential-side switching elements and the low-potential-side switching elements corresponding to one of a plurality of phases of a winding of a rotating electrical machine;
a current detecting unit connected between the inverter unit and a positive side or a negative side of a DC power supply; and
a control unit controlling an on-operation and an off-operation of the high-potential-side switching elements and the low-potential-side switching elements based on a PWM reference signal and a duty instruction value,
wherein the control unit includes:
a phase current computing device computing a phase current of each phase, which flows through one of phases of the winding, based on a current detection value detected by the current detecting unit; and
a voltage instruction value computing device computing a voltage instruction value, which relates to a voltage applied to the winding, based on the phase current of each phase,
wherein the control unit computes an active voltage vector interval in both a first-half period and a second half period of predetermined one cycle or multiple cycles of the PWM reference signal to be longer or equal to a predetermined period required to obtain the current detection value,
wherein the control unit computes a first-half duty instruction value and a second-half duty instruction value as a duty instruction value based on the voltage instruction value in such a manner that a first voltage vector interval and a second voltage vector interval are equal to or longer than minimum time, and the first voltage vector interval and the second voltage vector interval are included in at least one of the first-half period and the second-half period,
wherein, in the first voltage vector interval, the low-potential-side switching elements of all of the phases turn on,
wherein, in the second voltage vector interval, the high-potential-side switching elements of all of the phases turn on,
wherein the minimum time is equal to or longer than a dead time period,
wherein, in the dead time period, both one high-potential-side switching element and one low-potential-side switching element corresponding to a same phase of the winding are turned off,
wherein the inverter unit includes a first inverter unit and a second inverter unit,
wherein the current detecting unit includes a first current detecting unit and a second current detecting unit,
wherein the first current detecting unit is connected between the first inverter unit and the positive side or the negative side of the DC power supply,
wherein the second current detecting unit is connected between the second inverter unit and the positive side or the negative side of the DC power supply,
wherein a phase of the PWM reference signal of the second inverter unit is opposite to a phase of the PWM reference signal of the first inverter unit, and
wherein the control unit computes the first-half duty instruction value and the second-half duty instruction value of the first inverter unit and the second inverter unit, so that one of the first voltage vector interval and the second voltage vector interval in the first-half period and the other of the first voltage vector interval and the second voltage vector interval in the second-half period are equal to the minimum time.

9. A power conversion apparatus comprising:
an inverter unit having a plurality of high-potential-side switching elements disposed on a high-potential side and a plurality of low-potential-side switching elements disposed on a low-potential side, each of the high-potential-side switching elements and the low-potential-side switching elements corresponding to one of a plurality of phases of a winding of a rotating electrical machine;
a current detecting unit connected between the inverter unit and a positive side or a negative side of a DC power supply; and
a control unit controlling an on-operation and an off-operation of the high-potential-side switching elements and the low-potential-side switching elements based on a PWM reference signal and a duty instruction value,
wherein the control unit includes:
  a phase current computing device computing a phase current of each phase, which flows through one of phases of the winding, based on a current detection value detected by the current detecting unit; and
  a voltage instruction value computing device computing a voltage instruction value, which relates to a voltage applied to the winding, based on the phase current of each phase,
wherein the control unit computes an active voltage vector interval in both a first-half period and a second half period of predetermined one cycle or multiple cycles of the PWM reference signal to be longer or equal to a predetermined period required to obtain the current detection value,
wherein the control unit computes a first-half duty instruction value and a second-half duty instruction value as a duty instruction value based on the voltage instruction value in such a manner that a first voltage vector interval and a second voltage vector interval are equal to or longer than minimum time, and the first voltage vector interval and the second voltage vector interval are included in at least one of the first-half period and the second-half period,
wherein, in the first voltage vector interval, the low-potential-side switching elements of all of the phases turn on,
wherein, in the second voltage vector interval, the high-potential-side switching elements of all of the phases turn on,
wherein the minimum time is equal to or longer than a dead time period,
wherein, in the dead time period, both one high-potential-side switching element and one low-potential-side switching element corresponding to a same phase of the winding are turned off,
wherein the inverter unit includes a first inverter unit and a second inverter unit,
wherein the current detecting unit includes a first current detecting unit and a second current detecting unit,
wherein the first current detecting unit is connected between the first inverter unit and the positive side or the negative side of the DC power supply,
wherein the second current detecting unit is connected between the second inverter unit and the positive side or the negative side of the DC power supply,
wherein, in a case where the amplitude of the voltage instruction value is less than a predetermined value, the control unit computes the first-half duty instruction value and the second-half duty instruction value of the first inverter unit, so that one of the first voltage vector interval and the second voltage vector interval in the first-half period is equal to the minimum time, and
wherein, in the case where the amplitude of the voltage instruction value is less than the predetermined value, the control unit computes the first-half duty instruction value and the second-half duty instruction value of the second inverter unit, so that the other of the first voltage vector interval and the second voltage vector interval in the second-half period is equal to the minimum time.

10. A power conversion apparatus comprising:
an inverter unit having a plurality of high-potential-side switching elements disposed on a high-potential side and a plurality of low-potential-side switching elements disposed on a low-potential side, each of the high-potential-side switching elements and the low-potential-side switching elements corresponding to one of a plurality of phases of a winding of a rotating electrical machine;
a current detecting unit connected between the inverter unit and a positive side or a negative side of a DC power supply; and
a control unit controlling an on-operation and an off-operation of the high-potential-side switching elements and the low-potential-side switching elements based on a PWM reference signal and a duty instruction value,
wherein the control unit includes:
  a phase current computing device computing a phase current of each phase, which flows through one of phases of the winding, based on a current detection value detected by the current detecting unit; and
  a voltage instruction value computing device computing a voltage instruction value, which relates to a voltage applied to the winding, based on the phase current of each phase,
wherein the control unit computes an active voltage vector interval in both a first-half period and a second half period of predetermined one cycle or multiple cycles of the PWM reference signal to be longer or equal to a predetermined period required to obtain the current detection value,
wherein the control unit computes a first-half duty instruction value and a second-half duty instruction value as a duty instruction value based on the voltage instruction value in such a manner that a first voltage vector interval and a second voltage vector interval are equal to or longer than minimum time, and the first voltage vector interval and the second voltage vector interval are included in at least one of the first-half period and the second-half period,
wherein, in the first voltage vector interval, the low-potential-side switching elements of all of the phases turn on,
wherein, in the second voltage vector interval, the high-potential-side switching elements of all of the phases turn on,
wherein the minimum time is equal to or longer than a dead time period,
wherein, in the dead time period, both one high-potential-side switching element and one low-potential-side switching element corresponding to a same phase of the winding are turned off,
wherein the inverter unit includes a first inverter unit and a second inverter unit, and
wherein the current detecting unit includes a first current detecting unit and a second current detecting unit, wherein the first current detecting unit is connected between the first inverter unit and the positive side or the negative side of the DC power supply, wherein the second current detecting unit is connected between the second inverter unit and the positive side or the negative side of the DC power supply, wherein the power conversion apparatus further comprises:
- a first current obtaining unit for sampling and holding a first current detection value as the current detection value of the first current detecting unit with the fixed interval sampling timing; and
- a second current obtaining unit for sampling and holding a second current detection value as the current detection value of the second current detecting unit with the fixed interval sampling timing.

11. The power conversion apparatus according to claim 10,
wherein the fixed interval sampling timing in the first current obtaining unit and the fixed interval sampling timing in the second current obtaining unit are different from each other.

12. The power conversion apparatus according to claim 1,
wherein, in a case where the voltage instruction value is equal to or less than a predetermined value, the control unit sets the first voltage vector interval and the second voltage vector interval to be in both of the first-half period and the second-half period, and
wherein, in a case where the voltage instruction value is larger than the predetermined value, the control unit sets both of the first voltage vector interval and the second voltage vector interval to be in one of the first-half period and the second-half period, and sets one of the first voltage vector interval and the second voltage vector interval to be in the other of the first-half period and the second-half period.

13. An electric power steering apparatus comprising:
a power conversion apparatus according to claim 1; and
the rotating electrical machine for outputting an auxiliary torque assisting a steering operation of a driver.

14. An electric power steering apparatus comprising:
a power conversion apparatus comprising:
- an inverter unit having a plurality of high-potential-side switching elements disposed on a high-potential side and a plurality of low-potential-side switching elements disposed on a low-potential side, each of the high-potential-side switching elements and the low-potential-side switching elements corresponding to one of a plurality of phases of a winding of a rotating electrical machine;
- a current detecting unit connected between the inverter unit and a positive side or a negative side of a DC power supply; and
- a control unit controlling an on-operation and an off-operation of the high-potential-side switching elements and the low-potential-side switching elements based on a PWM reference signal and a duty instruction value, wherein the control unit includes:
- a phase current computing device computing a phase current of each phase, which flows through one of phases of the winding, based on a current detection value detected by the current detecting unit; and
- a voltage instruction value computing device computing a voltage instruction value, which relates to a voltage applied to the winding, based on the phase current of each phase, wherein the control unit computes an active voltage vector interval in both a first-half period and a second half period of predetermined one cycle or multiple cycles of the PWM reference signal to be longer or equal to a predetermined period required to obtain the current detection value, wherein the control unit computes a first-half duty instruction value and a second-half duty instruction value as a duty instruction value based on the voltage instruction value in such a manner that a first voltage vector interval and a second voltage vector interval are equal to or longer than minimum time, and the first voltage vector interval and the second voltage vector interval are included in at least one of the first-half period and the second-half period, wherein, in the first voltage vector interval, the low-potential-side switching elements of all of the phases turn on, wherein, in the second voltage vector interval, the high-potential-side switching elements of all of the phases turn on, wherein the minimum time is equal to or longer than a dead time period, and wherein, in the dead time period, both one high-potential-side switching element and one low-potential-side switching element corresponding to a same phase of the winding are turned off, wherein the rotating electrical machine for outputting an auxiliary torque assisting a steering operation of a driver wherein, in a case where a steering speed is equal to or less than a predetermined speed, the control unit sets both the first voltage vector interval and the second voltage vector interval to be in both of the first-half period and the second-half period, and wherein, in a case where the steering speed is higher than the predetermined speed, the control unit sets both of the first voltage vector interval and the second voltage vector interval to be in one of the first-half period and the second-half period, and sets one of the first voltage vector interval and the second voltage vector interval to be in the other of the first-half period and the second-half period.

* * * * *